US010448014B2

(12) United States Patent
Possos et al.

(10) Patent No.: US 10,448,014 B2
(45) Date of Patent: Oct. 15, 2019

(54) CONTENT ADAPTIVE MOTION COMPENSATED TEMPORAL FILTERING FOR DENOISING OF NOISY VIDEO FOR EFFICIENT CODING

(71) Applicant: INTEL CORPORATION, Santa Clara, CA (US)

(72) Inventors: Sebastian Possos, Sammamish, WA (US); Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 15/603,147

(22) Filed: May 23, 2017

(65) Prior Publication Data

US 2018/0343448 A1 Nov. 29, 2018

(51) Int. Cl.
*H04N 19/583* (2014.01)
*H04N 19/117* (2014.01)
*H04N 19/159* (2014.01)
*H04N 19/176* (2014.01)
*H04N 19/137* (2014.01)
*H04N 19/86* (2014.01)

(52) U.S. Cl.
CPC ......... *H04N 19/117* (2014.11); *H04N 19/137* (2014.11); *H04N 19/159* (2014.11); *H04N 19/176* (2014.11); *H04N 19/583* (2014.11); *H04N 19/86* (2014.11)

(58) Field of Classification Search
None
See application file for complete search history.

(56) References Cited

U.S. PATENT DOCUMENTS

| | | | |
|---|---|---|---|
| 2010/0026897 A1* | 2/2010 | Sharlet | H04N 5/145 348/607 |
| 2015/0379693 A1* | 12/2015 | Novotny | H04N 5/142 348/625 |
| 2016/0198195 A1* | 7/2016 | Michelsen | H04N 19/146 375/240.12 |
| 2018/0054628 A1* | 2/2018 | Pettersson | H04N 19/172 |

OTHER PUBLICATIONS

Neat Video, "Best noise reduction for digital video", https://www.neatvideo.com/overview/what-is-it, last accessed Apr. 28, 2017.
Manao et al., "MVtools" Misc Plugins, version 2, http://www.avisynth.nl/users/fizick/mvtools/mvtools2.html, last accessed Apr. 28, 2017.

(Continued)

*Primary Examiner* — Jayanti K Patel
*Assistant Examiner* — Shadan E Haghani
(74) *Attorney, Agent, or Firm* — Green, Howard & Mughal LLP

(57) ABSTRACT

Techniques related to improved video denoising using content adaptive motion compensated temporal filtering are discussed. Such techniques may include determining whether a block of a video frame is motion compensable and, when the block is motion compensable, generating a denoised block corresponding to the block using the block itself and averaged reference blocks from two or more motion compensation reference frames.

13 Claims, 24 Drawing Sheets

(56) References Cited

OTHER PUBLICATIONS

CS MSU Graphics & Media Lab, "MSU Noise Reduction in Video Pictures, Algorithm Description", P3: An Image Processing tool for Intelligent Noise Reduction in Video Pictures, Moscow, Jun. 17, 2005.
Buades, A. et al., "On Image Denoising Methods", Technical Note, CMLA (Centre de Mathematiques et de Leurs Applications), 40 pages, 2004.
Chuang, Yung-Yu , "Bilateral Filters, Digital Visual Effects", Lecture Notes, DigiVFX, 2010.
Liu, C.et al., "A High-Quality Video Denoising Algorithm based on Reliable Motion Estimation", Proceedings of the 11th European Conference on Computer Vision (ECCV), Heraklion, Crete, Greece 2010.

* cited by examiner

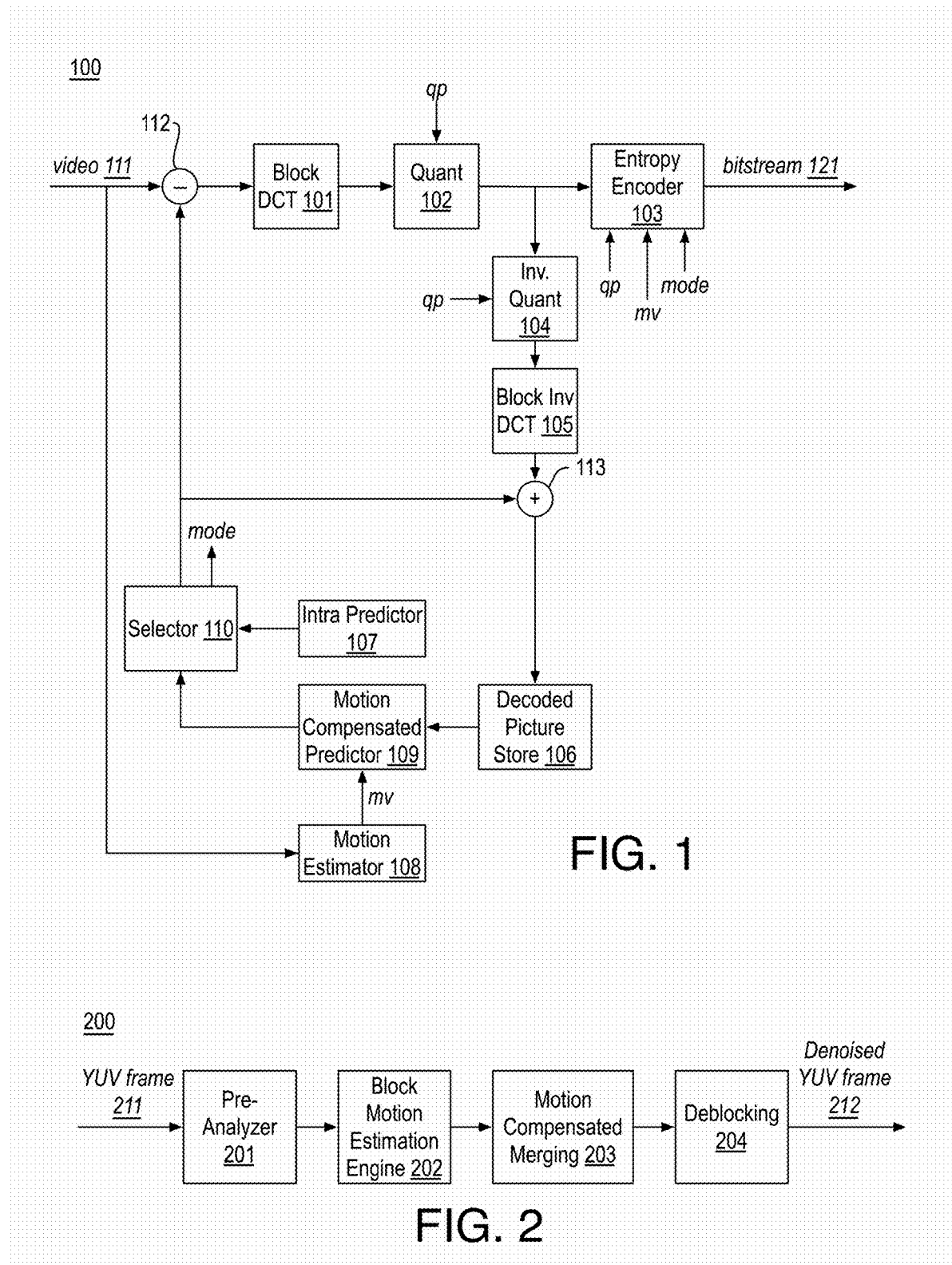

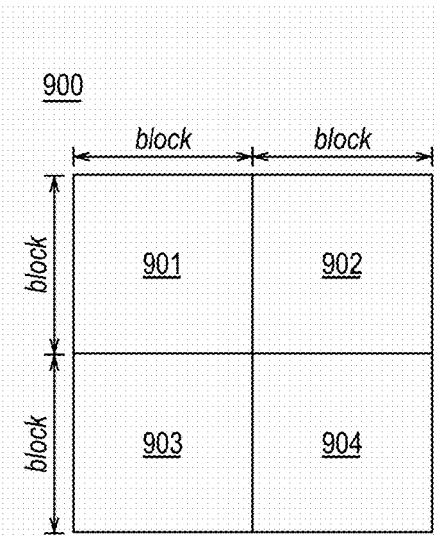
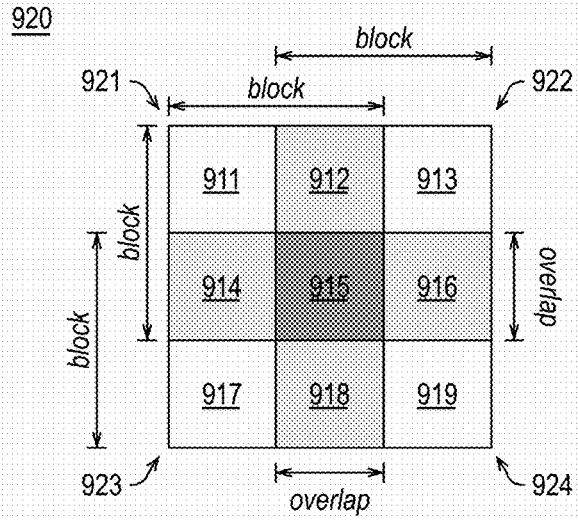
FIG. 9A
FIG. 9B
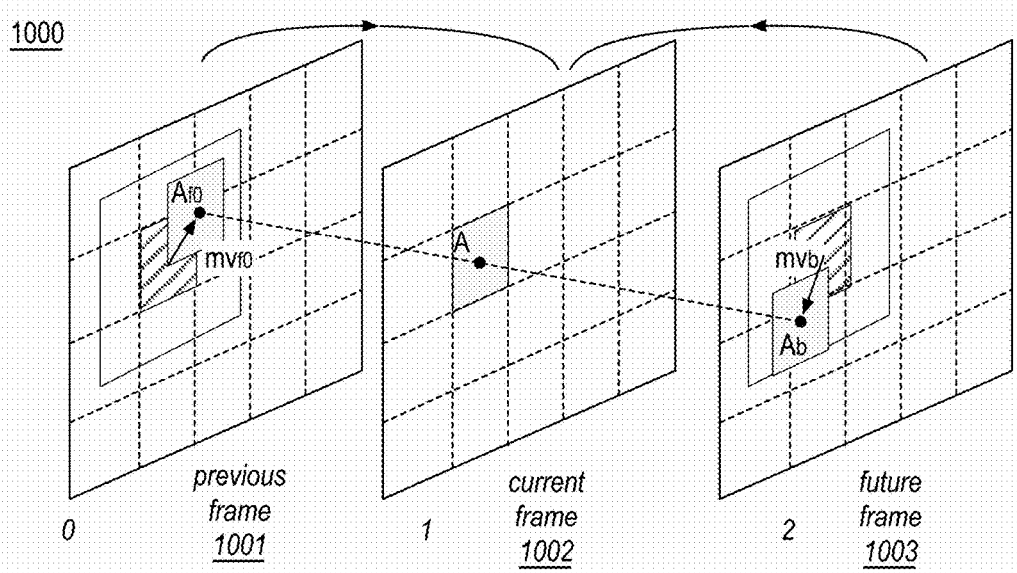
FIG. 10

| c3 | c2 | c3 |
|----|----|----|
| c2 | c1 | c2 |
| c3 | c2 | c3 |

FIG. 18

CONTENT ADAPTIVE MOTION COMPENSATED TEMPORAL FILTERING FOR DENOISING OF NOISY VIDEO FOR EFFICIENT CODING

BACKGROUND

Discussion herein is directed to video processing and, in particular, the area of filtering of video content with the goal of reducing or eliminating noise from frames of video. For example, it may be advantageous to reduce noise without adversely impacting or altering the video content itself, which may be difficult since identifying noise versus actual content is challenging. For example, not adversely impacting video content may include not blurring the content, not damaging the fine structures within the video content, preserving textures in video content as they are, and preserving edges in video content.

In the context of video processing, video generation typically begins with the capture of the output of a sensor/camera or scanning of film, which inherently results in capturing noise in addition to the intended video signal. The amount of captured noise in the content depends on many factors including the resolution used for capture of content, the sensitivity of the sensor, the ambient light, the presence of other electronics near the sensor, the type of film used and the exposure time, the bit-depth in analog-to-digitization process, and others. Also, the type of noise in the content may vary depending on the type of sensor and the capture process used, the type of film and the scanning process used, or the process of digitization of analog to digital signal. For instance, as a result of the aforementioned processes, digitized natural video source content may typically have Gaussian noise, salt-and-pepper noise, scene noise, film grain noise, or others.

One type of video content that is an exception in terms of not having noise is purely synthesized video content such as cartoons or animations. Sometimes noise is added to synthesized content to make the content appear more photorealistic or natural. Furthermore, for the case of movie content generated from scanning of film, the choice of the type of film impacts the amount, strength and look-and-feel of noise such as fine grain noise, coarse grain noise, scattered grain noise, or dense grain noise etc. In fact, a movie producer/director may choose a type of film and exposure to capture a message or ambience (of an entire movie or a scene of a movie) they want to convey (e.g., whether the movie has a gritty look and feel by a higher strength, coarse grain noise or a mellow look and feel by a low strength or fine grain noise.

The preceding has been in the context of uncompressed original video content and not video content that has been compressed because, typically, denoising can be thought of as a preprocessing operation prior to encoding. However, in transcoding scenarios, the source video itself may be coded, albeit at high bitrates for ease of transmission or editing (this type of quality may be referred to as contribution quality). Furthermore, contribution quality video for distribution may need to be encoded to lower bit-rates (e.g., to distribution quality). In such cases, a denoiser may have to deal with additional sources of noise (e.g., from video coding itself) although if contribution bit-rates are high enough (such as in high quality transcoding) such noise may not be much of a problem. There are also other cases where somewhat lower quality transcoding may be needed such as for HD video from 15 Mbits/s to 5 Mbits/s. In such cases, the 15 Mbits/s coded video is likely to have coding artifacts. There are also cases where transcoding is needed simply to go from one video codec format to another and bit-rates may be lower and thus source video may have video coding artifacts.

For example, the artifacts introduced by video coding processes may also be considered as coding noise. Such artifacts include blockiness, blurriness, ringing, chroma bleeding, etc. The type and intensity of coding noise may depend on the codec standard (e.g. MPEG-2 or AVC), bit-rate, quality/speed tradeoffs in the codec, hardware/software codec, and the like.

Furthermore, in some contexts, noise filtering may be used as part of a preprocessor to make video content easier to encode. In this application, noise filtering may be used a bit more aggressively (with the consequence of some impact on fidelity of the content) to allow larger compression to be obtained by consequent encoding (e.g., by AVC, HEVC, etc.). In some applications, such as internet streaming of movies, during prime-time, etc., bandwidth that is normally available may have been cut-back drastically and such techniques may be necessary. Thus instead of encoding with higher quantizers in AVC or HEVC encoding, softening the content by denoise filtering prior to AVC or HEVC encoding may result in more graceful introduction of artifacts under the scenario of drastic cut-down in bandwidth. Noise filtering used in this manner is also useful for bit-rate control (e.g., in CBR systems) as it allows another control on bit-rate (e.g., varying the amount of filtering depending on resources available). Since the typical goal of any eventual fidelity based video coder is to (within constraints of available bit-rate) maintain as much fidelity of input video as possible, noisy video represents a problem since, for an encoder, it is hard to tell noise from content. Thus a video encoder has a much harder time dealing with noisy content as compared to video content with low or no noise.

As such, there is a continual demand for improved video denoising techniques, devices, systems, and the like. It is with respect to these and other considerations that the present improvements have been needed. Such improvements may become critical as the desire to provide high quality video denoising becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 illustrates a block diagram of an example video encoder;

FIG. 2 illustrates a block diagram of an example adaptive motion compensated temporal filtering system;

FIG. 9A illustrates an example non-overlapped motion estimation context;

FIG. 9B illustrates an example overlapped motion estimation context;

FIG. 10 illustrates example bidirectional motion estimation and compensation for denoising a current block in a current frame;

FIG. 17 illustrates example pixels for the determination of example spatial filtering weights;

FIG. 18 illustrates example spatial filtering coefficients;

DETAILED DESCRIPTION

Figure 3:
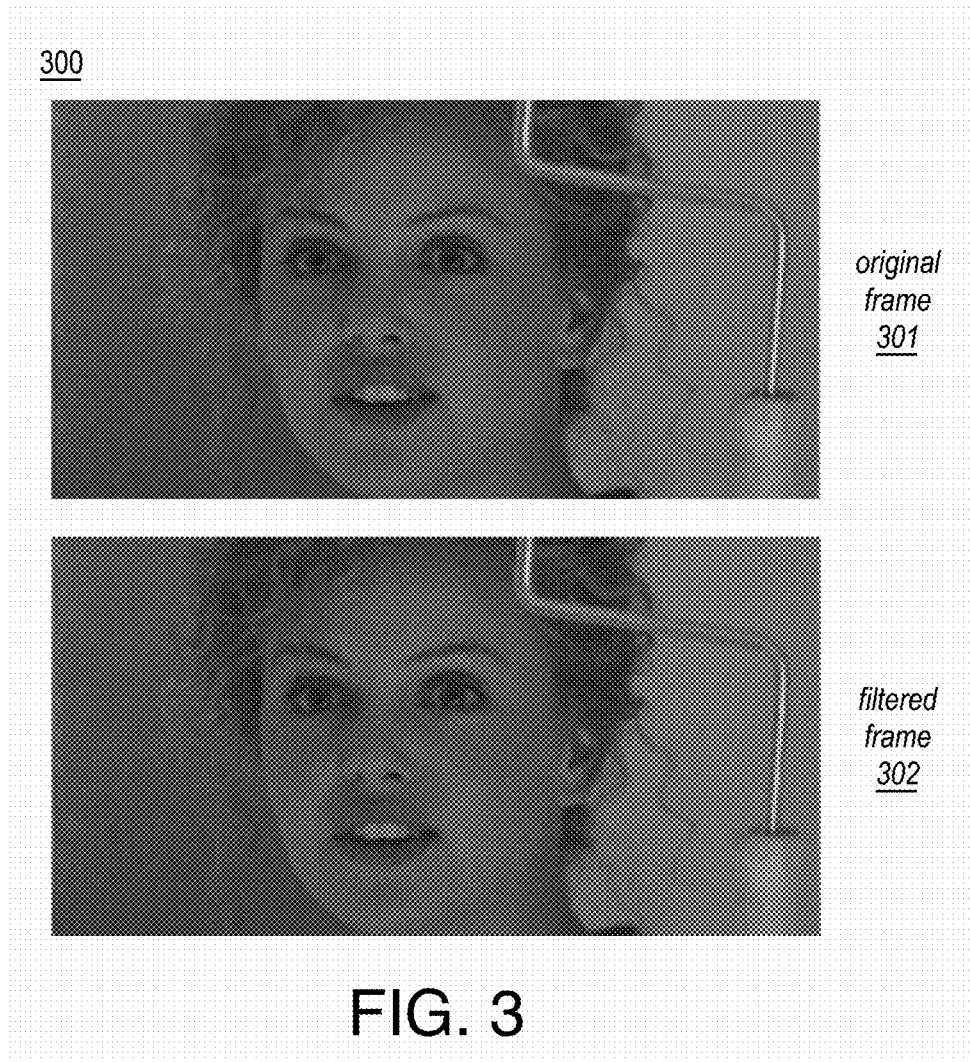
FIG. 3 illustrates sample results providing a before and after comparison for adaptive motion compensated temporal filtering performed using the techniques discussed herein.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", (or "embodiments", "examples", or the like), etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video denoising. Such techniques may be used in a variety of contexts such as prior to encode, between decode and encode, or prior to display.

For example, video encoders may use inter-frame coding using motion compensated prediction and inter coding (or temporal prediction based) differences. Such encoders may also support an intra coding (or spatial prediction) based mode.

FIG. 1 illustrates a block diagram of an example video encoder 100, arranged in accordance with at least some implementations of the present disclosure. For example, video encoder 100 may provide inter-frame coding. For example, such inter-frame coding may include motion-compensated discrete cosine transform (DCT) coding. For example, standards based video coding (e.g., encode/decode) may be based on such coding techniques, although details differ between the standards.

In inter-frame coding, temporally predictive coding that adapts to motion of objects between frames of video and is used to compute motion compensated differential residual signals may be combined with spatial transform coding that converts spatial blocks of pixels to blocks of frequency coefficients, typically by DCT (e.g., of a block size such as 8×8) followed by reduction in precision of these DCT coefficients by quantization to adapt video quality to available bit-rate. Since the resulting transform coefficients have energy redistributed in lower frequencies, some of the small valued coefficients after quantization turn to zero and some high frequency coefficients may be coded with higher quantization errors or even skipped altogether. These and other characteristics of transform coefficients such as frequency location, some quantized levels occurring more frequently than others, etc. allow for the use of frequency domain scanning of coefficients and entropy coding (e.g., variable word length coding) to achieve additional compression gains.

As shown in FIG. 1, since motion compensation is difficult to perform in the transform domain, an operation in an inter-frame coder may be to create a motion compensated prediction error in the pixel domain. For example, for each block of a current frame of video 111, intra or inter prediction may be used for the block. For inter prediction, a prediction block in a reference frame may be found by motion compensated predictor 109 using a motion vector computed during motion estimation by motion estimator 108. The current block and the prediction block may be differenced by differencer 112 to generate a prediction error signal (e.g., a residual block or the like). The resulting prediction error signal or residual block may be transformed using, for example, a 2D DCT by block DCT module 101. The resulting residual coefficients may be quantized by an adaptive quantizer 102 (based on a quantization parameter, qp) to generate quantized residual coefficients. The quantized residual coefficients may be encoded using an entropy encoder 103, which may be a Variable Length Coder (VLC), an arithmetic entropy coder, or the like, into coded into a bitstream 121, which may be buffered for transmission over a channel to a remote device such as a decoder.

For intra prediction, a prediction block may be generated using pixel data from the current frame of video 111 by intra predictor 107. As discussed with respect to inter prediction, the current block and the prediction block may be differenced by differencer 112 to generate a prediction error signal (e.g., a residual block or the like) and the resulting prediction error signal or residual block may be transformed using, for example, a 2D DCT by block DCT module 101. The resulting residual coefficients may be quantized by adaptive quantizer 102 to generate quantized residual coefficients, which may be encoded using an entropy encoder 103 and coded into bitstream 121, which may be buffered for transmission over a channel to a remote device such as a decoder.

Also as shown, encoder 100 includes a local decode loop including in inverse quantizer 104, a block inverse DCT module 105 and an adder 113. Inverse quantizer 104 may inverse quantize quantized coefficients from quantizer 102 to generate residual coefficients, which may be inverse transformed by a block inverse DCT module 105 to provide a prediction error signal (e.g., a residual block or the like). The prediction error signal may be added to the prediction block (as provided by intra predictor 107 or motion compensated predictor 109 via selector 110) by adder 113 to generate a predicted block. Such predicted blocks may be combined into a picture or frame, optionally deblock filtered or the like, and stored in decoded picture store 106 for use in the prediction of other frames or pictures of video 111.

Furthermore, a decoder in analogy to encoder 100 may include an entropy decoder (not shown), intra predictor 107, motion compensated predictor 109, inverse quantizer 104, block inverse DCT module 105, adder 113, and, optionally, selector 110. The decoder may receive bitstream 121 via the entropy decoder, which may decode bitstream 121 to generate quantized coefficients and control signals. The quantized coefficients may be provided to inverse quantizer 104, which may inverse quantize the quantized coefficients from quantizer 102 to generate residual coefficients, which may be inverse transformed by block inverse DCT module 105 to provide a prediction error signal (e.g., a residual block or the like). The prediction error signal may be added to a prediction block by adder 113 to generate a predicted block. The prediction block may be provided by intra predictor 107 (if intra prediction is used for the block) or motion compensated predictor 109 (if inter prediction is used for the block). Such intra or inter prediction may be based on intra modes or motion vectors received for the block via bitstream 121. Such predicted blocks may be combined into a picture or frame, optionally deblock filtered or the like, and stored in decoded picture store 106 for eventual display to a user via a display (not shown).

The noise reduction techniques discussed herein may be provided prior to the operations discussed with respect to encoder 100 (e.g., as pre processing operations to generate encoder 100), after local decode by encoder 100 (e.g., prior to being stored in decoded picture store 106), after decode by a decoder (e.g., prior to being stored in decoded picture store 106 or prior to display to a user), or in any other suitable video processing context.

Noise in video is a problem as it costs additional bit-rate while it does not add anything to preserve fidelity of either coarse (e.g., medium to coarse textures, medium to strong edges, strong structures) details or fine (e.g., flat area, weak texture, mild edges) details. In some coding contexts, source video content (whether noisy or not) may be input to an encoder (e.g., an AVC or HEVC encoder) such as video encoder 100 for compression to a lower bit-rate as needed for storage or transmission. For a given fixed bit-rate, if the video content being coded is not noisy, the bit-rate is being used to preserve coding quality of details in the content. However, for the same given fixed bit-rate, if the video content being coded is noisy, the bit-rate is used for coding noise and trying to preserve it as much as possible, as well for coding content and trying to preserve it as much as possible. Thus, in effect, less bit-rate is available for coding details of the content, lowering its effective quality. Furthermore, as higher and higher quality is expected from video coding, coding of noise becomes more and more difficult as noise is difficult to compensate by spatial or temporal prediction and such noise generates a large number of small valued coefficients in transform coding, which are not efficient for subsequent entropy coding. For the case of non-constant bit-rate coding such as variable bit-rate (VBR) coding, noisy video requires more bit-rate than non-noisy video, with the additional bit-rate typically hard to justify as it does not add anything obvious to quality. Therefore, noise reduction may provide compression efficiency benefit in many video encoding contexts. Furthermore, noise reduction allows a large dynamic range of operating bit-rates at which compression can occur providing the ability to deal with varying channel conditions as well as flexibility in bit-rate control. Therefore, noise reduction may also provide the benefit of easier adaptation to channel conditions.

Another reason for noise reduction is perceived increase in video quality. Noisy video typically reduces the perception of high subjective quality since viewers typically prefer less noisy video (e.g., less noisy video is typically characterized by users as having higher subjective quality). Thus, in compression scenarios, video that has undergone noise reduction has the potential for increasing subjective quality scores of coded (encoded/decoded) video as compared to visual quality results that might result from coding of video without noise reduction. As will be appreciated, the level of noise filtering should be low enough not to visually damage the content for viewers to have high subjective impression of denoised coded video. Therefore, noise reduction may provide visual quality benefit in many video contexts.

The techniques discussed herein may provide several advantages over current denoising techniques. For example, the techniques discussed herein: may be used for a practical design of noise filters depending on application requirements; may be can be used individually or as combinations for maximum benefit; may be flexible and integrate with a wide variety of standards based video encoders or decoders such HEVC based video encoders or decoders, AVC based video encoders or decoders, etc.; may be applicable to normal delay video coding and low delay video coding; may produce better visual quality at the same bitrate; may be adaptive to content, coding bit-rate, and properties of human visual system; may adapt coding to properties of the human visual system for optimal results for human viewers; may exploit short term correlation and long term persistence of objects in video; and/or may operate in conjunction with regions-of-interest detected by face and skin-tone detectors.

Discussion now turns to the principles of the disclosed techniques and an overview of the disclosed system. The disclosed techniques may be characterized as motion compensated temporal filtering or adaptive motion compensated temporal filtering (AMCTF) denoising. The AMCTF denoisers discussed herein may use motion compensation with respect to past and future reference frames including a combination of past and future frames to generate bidirectional filtered results. In terms of motion compensation, the discussed techniques may support two or more modes of operation. For example, in a first mode, block motion estimation and compensation may be applied on 8×8 size blocks. In a second mode, block motion estimation and compensation may be applied on 16×16 blocks, but with an 8 pixel overlap, which may be characterized as overlapped block motion compensation. The choice of mode may be made based on application, and the choice may be largely driven by complexity with overlapped block motion compensation presenting higher complexity. Although discussed with respect to 8×8 and 16×16 block sizes, any block sizes may be used. In terms of modes for references, the discussed techniques may support two or more modes of operation. In a first mode, 2 references may be used: one in the past and another in the future. In a second mode, 4 references may be used: two in the past and two in the future. For each of the modes, the choice of prediction is adaptive on a block basis between unidirectional (forward or backward) and bidirectional (weighted or merged combination of unidirectional and bidirectional including novel blending). Such modes of references are exemplary and any number of reference frames may be used. In terms of blending, the discussed techniques may also support multiple modes. In a first mode, similarity based (e.g., SAD+spatial features based) blending may be used. In a second mode, adaptive weighted median filtering based blending may be used. In a third mode, motion based blending may be performed. The choice of mode may be dependent on content and the application. In terms of strength of filtering, the discussed techniques may support any number of filtering strengths such as 20 filtering strengths from 1-20 with a filtering strength of 1 providing the least filtering and a filtering strength of 20 providing the strongest filtering. In terms of overall adaptation, the denoise filtering discussed herein may use, on a block basis, either spatial filtering, or AMCTF filtering, or a weighted combination of spatial and AMCTF filtering. In some embodiments, a choice may be made on a frame basis between spatial or AMCTF denoising. The denoiser discussed herein may be characterized as a content adaptive motion compensated temporal filter (CA-MCTF) denoiser.

In some embodiments, an AMCTF may implement a combination of a MCTF and spatial denoising techniques plus content analysis with a goal of providing improved denoising using a selected technique where another may provide ineffective denoising, providing correct references that are related to the frame being denoised. For example, when motion compensation provides ineffective denoising, a spatial denoiser may have a bigger influence to provide better results while an area with high texture level and predictable motion may benefit from implementation of an adaptive motion compensated temporal filter (AMCTF).

FIG. 2 illustrates a block diagram of an example adaptive motion compensated temporal filtering system 200, arranged in accordance with at least some implementations of the present disclosure. As shown, adaptive motion compensated temporal filtering system 200 may include a pre-analyzer 201, a block motion estimation engine 202, a motion compensated merging module 203, and a deblocking module 204. For example, adaptive motion compensated temporal filtering system 200 may receive a YUV frame 211 (or a picture or frame of a video sequence in any suitable format) along with other input YUV frames of a video such as video 111 and adaptive motion compensated temporal filtering system 200 may provide denoised YUV frame 212 (or a denoised picture or frame of a video sequence in any suitable format). In an embodiment, pre-analyzer 201 may provide texture analysis and scene change detection. In some embodiments, adaptive motion compensated temporal filtering system 200 may use information from past and future frames to reject noise in current YUV frame 211 (e.g., the current picture). For example, motion compensated reconstruction may be generated from each reference frame or image referenced by current YUV frame 211 and then the reference frames or images and/or YUV frame 211 may be combined (e.g., by average, weighted average, mean, etc. as discussed herein). The resulting frame or image (e.g., denoised YUV frame 212) is a denoised version of the original (e.g., current YUV frame) with details preserved. For example, in contrast to spatial denoisers, AMCTF techniques discussed herein may discriminate details and texture from actual noise to provide enhanced visual perception (e.g., a cleaner picture or frame) and compression efficiency improvement as an encoder will not need to spend extra bits trying to preserve noise information.

Video content may typically contain multiple scenes such that at certain points of a sequence of video frames or pictures, the data between consecutive frames or pictures is not correlated. For example, images that belong to different scenes do not have meaningful information to provide as reference to a frame being denoised. If non correlated references were used, the matching blocks would not carry proper information about the current block. Instead such blocks would introduce artifacts and blur. By signaling scene changes, adaptive motion compensated temporal filtering system 200 may properly use only references that are correlated and thereby may use blocks that have significant information to allow noise reduction. Such scene change detection may be performed by pre-analyzer 201 and may include any suitable scene change detection techniques. Furthermore, pre-analyzer 201 may perform a measurement of texture in YUV frame 211 to improve the capabilities of adaptive motion compensated temporal filtering system 200 to discriminate noise from high texture.

As shown, block motion estimation engine 202 may provide motion estimation for adaptive motion compensated temporal filter 200. Such motion estimation provides motion vectors that describe translational transformation between a frame (e.g., YUV frame 211) and a temporal reference frame (or multiple reference frames). For example, the frame and the temporal reference frame(s) may be highly correlated and the motion estimation results (e.g., a motion vector field or the like) may track the same object from different temporal instances, providing multiple copies of the same object.

As shown, the results (e.g., motion vectors) of block motion estimation engine 202 may be provided to motion compensated merging module 203. Motion compensated merging module 203 may use the motion vectors provided by block motion estimation engine 202 and/or additional information to measure similarity between a current block of YUV frame 211 and the blocks given by the motion vectors (e.g., reference block(s) from reference frame(s)). Based on the similarity and/or additional information, motion compensated merging module 203 may then determine a selected denoising technique for the current block. For example, motion compensated merging module 203 may determine an optimal technique to merge the current block and the reference block(s) and/or to perform spatial filtering such that noise can be rejected or reduced without damaging the texture information of the current block.

Furthermore, adaptive motion compensated temporal filtering system 200 may include optional deblocking module 204. Since the processing implemented by adaptive motion compensated temporal filtering system 200 is block based and due to potential discontinuities produced by the matching techniques of motion estimation and motion compensation merging, the denoised frame may be prone to blocking artifacts. Deblocking module 204 may perform deblocking such as deblock filtering to reduce such blocking artifacts. For example, deblocking module 204 may provide denoised YUV frame 212 such that denoised YUV frame 212 does not include fake texture (e.g., blocking artifacts). Furthermore, deblocking module 204 may provide a denoised frame that is temporally more stable, cleaner, and maintains texture detail. When the output frame (e.g., denoised YUV frame 212) has been generated, it may be passed to a previous frame buffer to be used as a past reference for the process performed by adaptive motion compensated temporal filtering system 200. For example, the denoised past reference may enhance the denoising properties of the merging step performed by motion compensated merging module 203.

FIG. 3 illustrates sample results 300 providing a before and after comparison for adaptive motion compensated temporal filtering performed using the techniques discussed herein, arranged in accordance with at least some implementations of the present disclosure. As shown, a filtered frame 302 may provide reduced noise with respect to an original frame 301.

As discussed, adaptive motion compensated temporal filtering system 200 or other systems discussed herein may have modes of operation that provide different tradeoffs between performance and quality. For example, a mode may represent a combination of features such as whether overlap motion estimation (ME) is used or not, a number of reference frames used (1, 2, 4, or more), whether subpel accuracy is used in motion estimation, whether deblocking is used or not, etc. An example list of modes is shown herein in Table 1.

Figure 4:
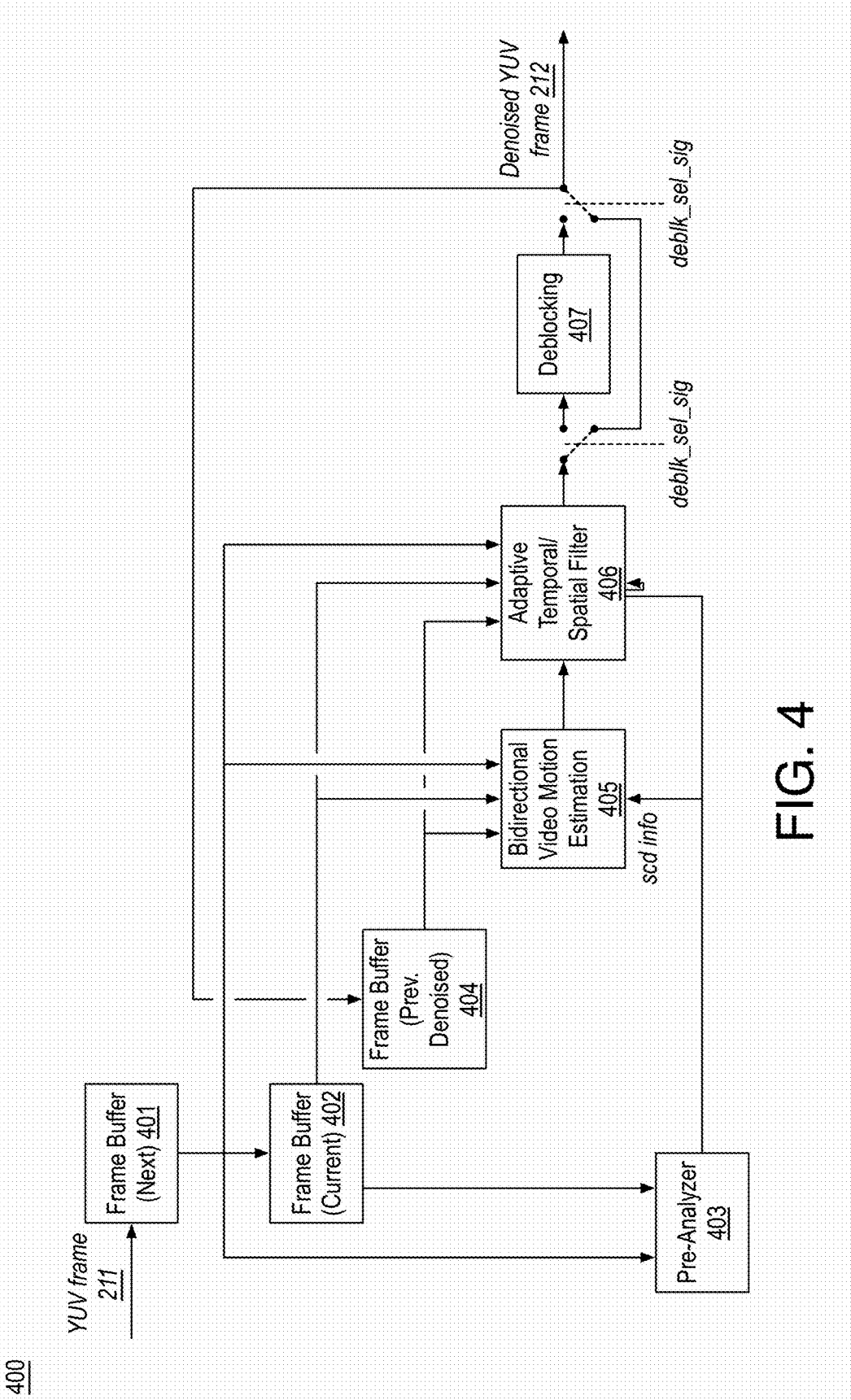
FIG. 4 illustrates a block diagram of an example adaptive motion compensated temporal filtering system.

FIG. 4 illustrates a block diagram of an example adaptive motion compensated temporal filtering system 400, arranged in accordance with at least some implementations of the present disclosure. As shown, adaptive motion compensated temporal filtering system 400 may include a frame buffer (next) 401, a frame buffer (current) 402, a pre-analyzer 403 (which may be or include the functionality of pre-analyzer 201), frame buffer (previously denoised) 404, a bidirectional video motion estimation module 405, an adaptive temporal/spatial filter 406, and a deblocking module 407 (which may be or include the functionality of deblocking module 407). As shown, deblocking module 407 may be implemented or bypassed under the control of a deblock selection signal (deblk_sel_sig). For example, adaptive motion compensated temporal filtering system 400 may include a number of frame buffers (that depend on the number of reference frames being used), a scene pre-analyer (e.g., as implemented by pre-analyzer 403), a multi-frame motion estimator (e.g., a bidirectional video motion estimation module 405; although any number of reference frames may be used), adaptive temporal/spatial filter 406, and deblocking module 407.

In the illustrated embodiment, deblocking is shown after adaptive filtering. In other embodiments, deblocking may be performed before adaptive filtering. The choice of whether to perform deblocking prior to or after filtering may be determined based on complexity (e.g., of the computing architecture used to implement adaptive motion compensated temporal filtering system 400) versus quality tradeoffs. For example, performing deblocking before adaptive filtering involves may be more complex with the expected quality of filtered video to be slightly higher. Alternatively, performing deblocking after filtering may provide lower complexity but at the cost of slightly lower quality filtered video.

Adaptive motion compensated temporal filtering system 400, adaptive motion compensated temporal filtering system 200, or any adaptive motion compensated temporal filtering system or techniques discussed herein may be performed in conjunction with a normal (temporal) order of frame processing or in an encode order of frame processing.

Figure 5:
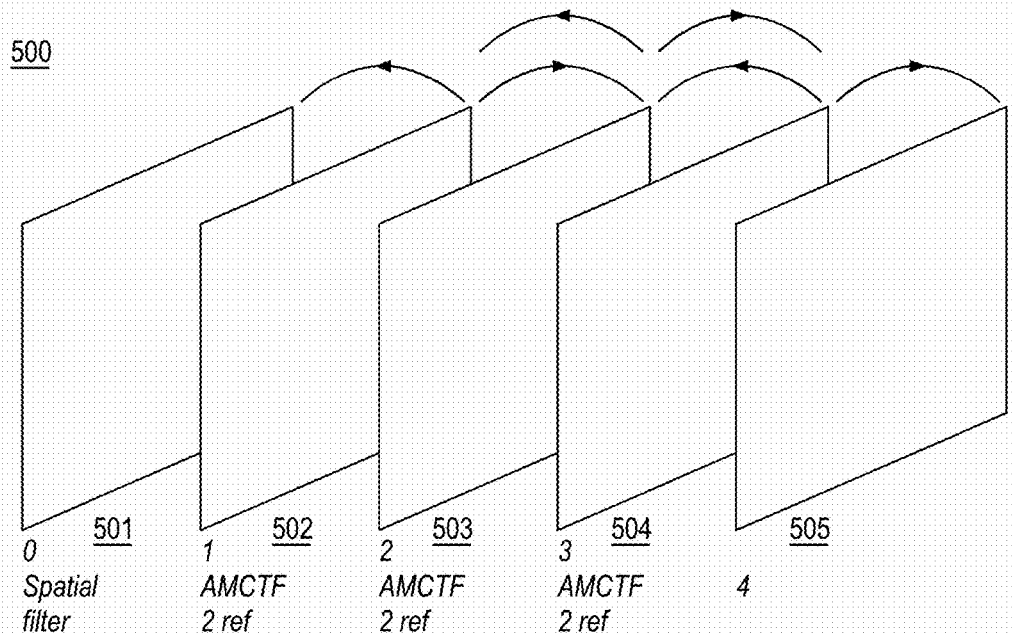
FIG. 5 illustrates an example normal (temporal) order of frame processing.

FIG. 5 illustrates an example normal (temporal) order of frame processing 500, arranged in accordance with at least some implementations of the present disclosure. For example, normal (temporal) order of frame processing 500 may represent a normal frame order of a video sequence. For example, a video sequence may include frames 501, 502, 503, 504, 505. As shown, in an embodiment, denoising of frame 0 501 may be performed using only spatial filtering, denoising of frame 1 502 may be performed using adaptive motion compensated temporal filtering (AMCTF) with two reference frames: one prior and one subsequent to frame 502 (e.g., frames 501, 503), denoising of frame 2 503 may be performed using adaptive motion compensated temporal filtering with two reference frames: one prior and one subsequent to frame 503 (e.g., frames 502, 503), and denoising of frame 3 504 may be performed using adaptive motion compensated temporal filtering with two reference frames:

one prior and one subsequent to frame 504 (e.g., frames 503, 505). As used herein, frames 501, 502, 503, 504 may be characterized as a current frame when being denoised and as reference frames when being used for motion compensated temporal filtering. For example, motion estimation may be performed for a current frame with respect to such reference frames to generate motion vector fields and motion compensated temporal filtering may be performed using blocks of the reference frames indicated by such motion vector fields. Although illustrated with 2 reference frames for frames 502, 503, 504, any number of reference frames may be used.

As shown, denoising of a current frame 503 may be performed with reference to one or more of a temporally previous frame 502, a second temporally previous frame 501 (e.g., temporally previous to frame 502), a temporally subsequent frame 504, and a second temporally subsequent frame 505 (e.g., temporally subsequent to frame 504). As used herein, frames 501, 502, 504, 505 may be characterized as reference frames with respect to current frame 503. As discussed further herein, motion estimation may be performed with respect to such reference frames to generate motion vector fields and motion compensated temporal filtering may be performed using blocks of the reference frames indicated by such motion vector fields.

Figure 6A:
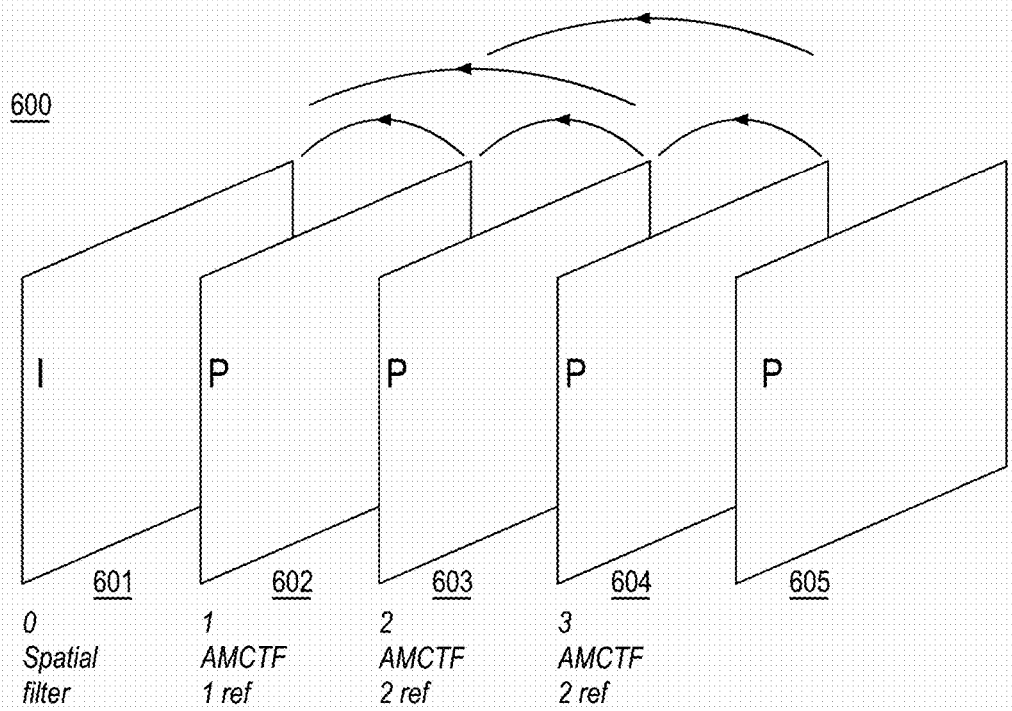
FIG. 6A illustrates an example encode order of frame processing.

FIG. 6A illustrates an example encode order of frame processing 600, arranged in accordance with at least some implementations of the present disclosure. For example, a video sequence may include frames 601, 602, 603, 604, 605. For example, encode order of frame processing 600 may represent an IPP structure with no extra frame encode context. As shown, denoising of I-frame 0 601 may be performed using only spatial filtering, denoising of P-frame 1 602 may be performed using adaptive motion compensated temporal filtering with a single reference frame (e.g., frame 601), denoising of P-frame 2 603 may be performed using adaptive motion compensated temporal filtering with two reference frames (e.g., frames 601, 602), and denoising of P-frame 3 604 may be performed using adaptive motion compensated temporal filtering with two reference frames (e.g., frames 602, 603). As used herein, frames 601, 602, 603, 604 may be characterized as a current frame when being denoised and as reference frames when being used for motion compensated temporal filtering. For example, motion estimation may be performed for a current frame with respect to such reference frames to generate motion vector fields and motion compensated temporal filtering may be performed using blocks of the reference frames indicated by such motion vector fields. Although illustrated with 1 reference frame for frame 602 and 2 reference frames for frames 603, 604, any number of reference frames may be used.

Figure 6B:
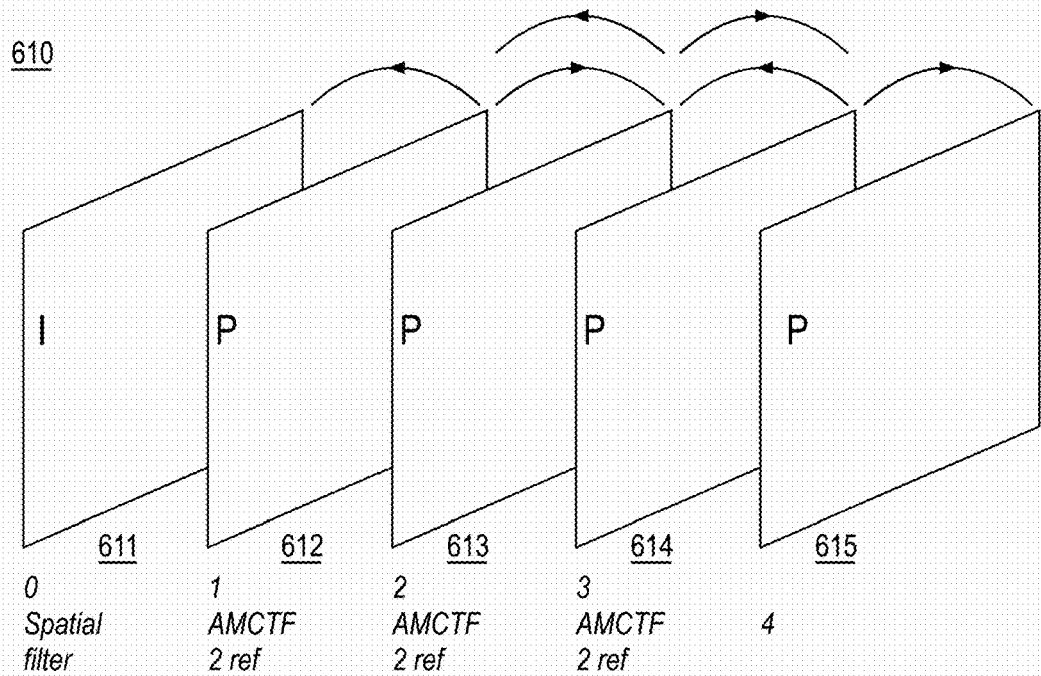
FIG. 6B illustrates an example encode order of frame processing.

FIG. 6B illustrates an example encode order of frame processing 610, arranged in accordance with at least some implementations of the present disclosure. For example, a video sequence may include frames 611, 612, 613, 614, 615. For example, encode order of frame processing 610 may represent an IPP structure with an extra frame encode context. As shown, denoising of I-frame 0 611 may be performed using only spatial filtering, denoising of P-frame 1 612 may be performed using adaptive motion compensated temporal filtering with two reference frames (e.g., frames 611, 613), denoising of P-frame 2 613 may be performed using adaptive motion compensated temporal filtering with two reference frames (e.g., frames 612, 614), and denoising of P-frame 3 614 may be performed using adaptive motion compensated temporal filtering with two reference frames (e.g., frames 613, 615). As used herein, frames 611, 612, 613, 614 may be characterized as a current frame when being denoised and as reference frames when being used for motion compensated temporal filtering. For example, motion estimation may be performed for a current frame with respect to such reference frames to generate motion vector fields and motion compensated temporal filtering may be performed using blocks of the reference frames indicated by such motion vector fields. Although illustrated with 2 reference frames for frames 612, 613, 614, any number of reference frames may be used.

Figure 6C:
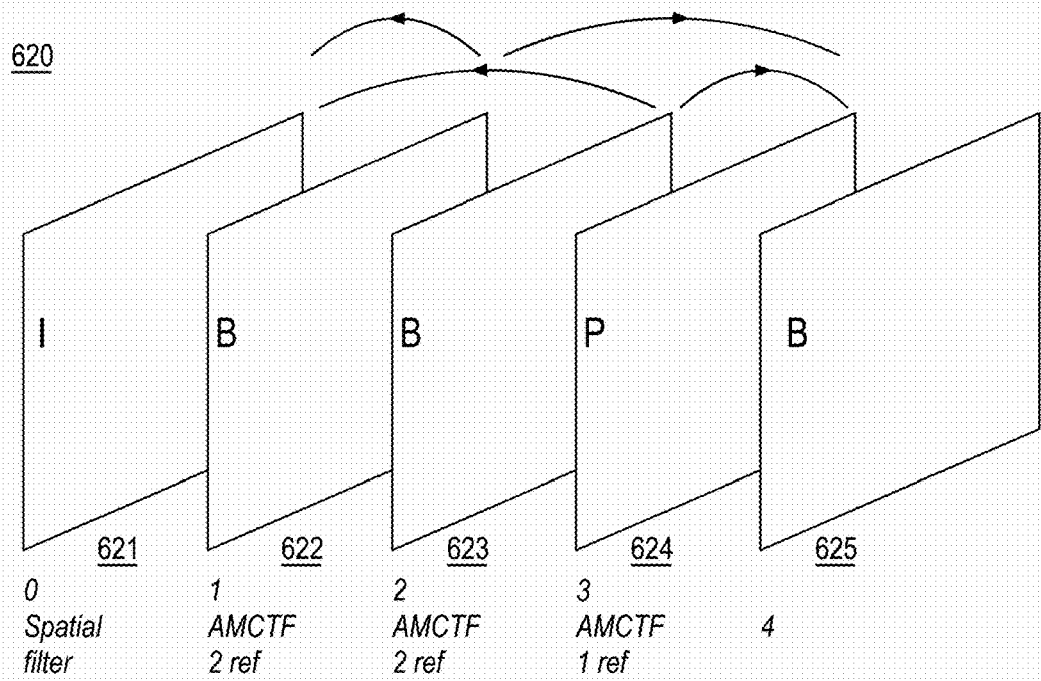
FIG. 6C illustrates an example encode order of frame processing.

FIG. 6C illustrates an example encode order of frame processing 620, arranged in accordance with at least some implementations of the present disclosure. For example, a video sequence may include frames 621, 622, 623, 624, 625. For example, encode order of frame processing 620 may represent an IBBP structure with no extra frame encode context. As shown, denoising of I-frame 0 621 may be performed using only spatial filtering, denoising of B-frame 1 622 may be performed using adaptive motion compensated temporal filtering with two reference frames (e.g., frames 621, 624), denoising of B-frame 2 623 may be performed using adaptive motion compensated temporal filtering with two reference frames (e.g., frames 621, 624), and denoising of P-frame 3 624 may be performed using adaptive motion compensated temporal filtering with one reference frame (e.g., frame 621; arrow not shown). As used herein, frames 621, 622, 623, 624 may be characterized as a current frame when being denoised and as reference frames when being used for motion compensated temporal filtering. For example, motion estimation may be performed for a current frame with respect to such reference frames to generate motion vector fields and motion compensated temporal filtering may be performed using blocks of the reference frames indicated by such motion vector fields. Although illustrated with 1 reference frame for frame 624 and 2 reference frames for frames 622, 623, any number of reference frames may be used.

Figure 6D:
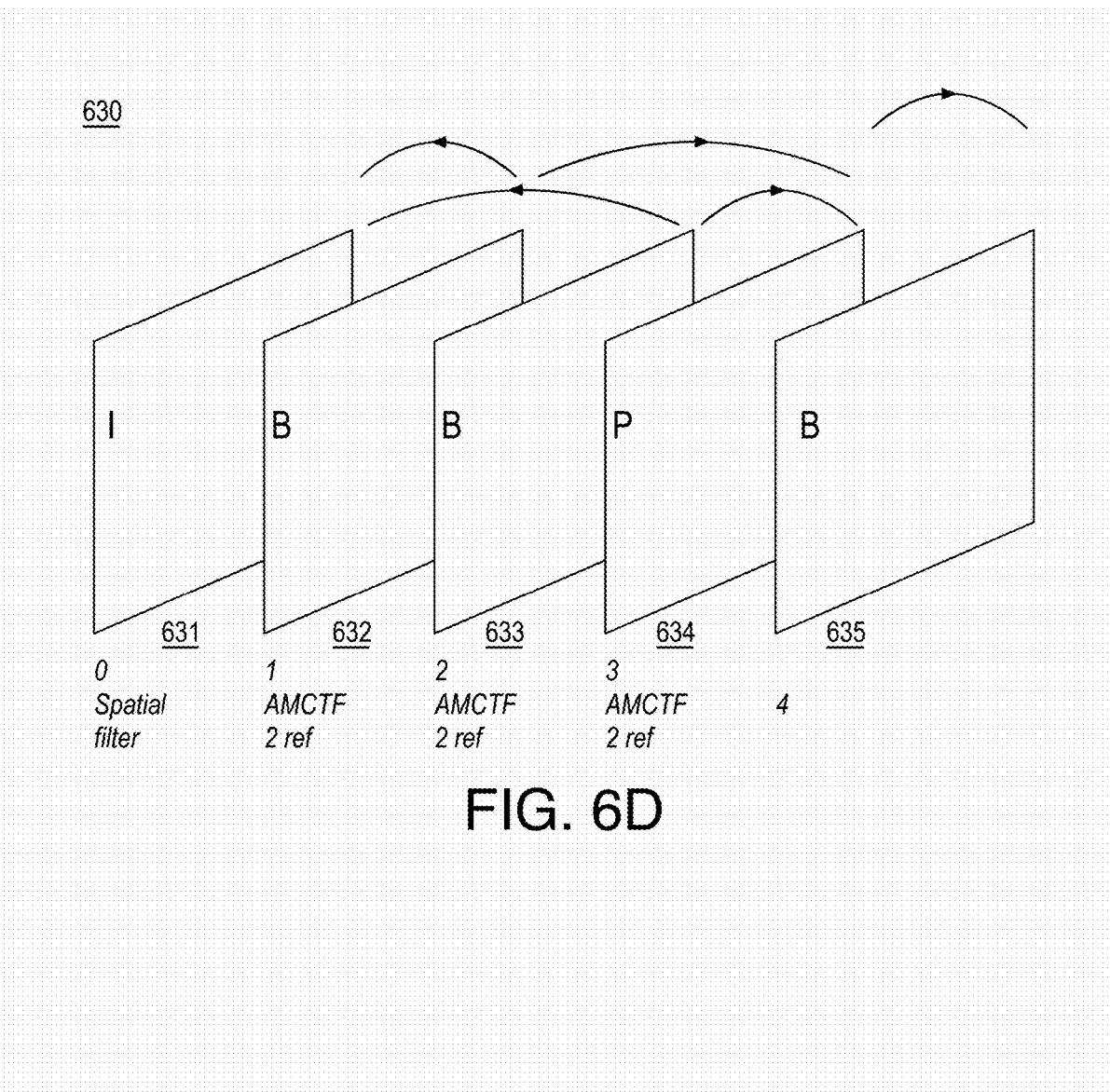
FIG. 6D illustrates an example encode order of frame processing.

FIG. 6D illustrates an example encode order of frame processing 630, arranged in accordance with at least some implementations of the present disclosure. For example, a video sequence may include frames 631, 632, 633, 634, 635. For example, encode order of frame processing 630 may represent an IBBP structure with an extra frame encode context. As shown, denoising of I-frame 0 631 may be performed using only spatial filtering, denoising of B-frame 1 632 may be performed using adaptive motion compensated temporal filtering with two reference frames (e.g., frames 631, 634), denoising of B-frame 2 633 may be performed using adaptive motion compensated temporal filtering with two reference frames (e.g., frames 631, 634), and denoising of P-frame 3 634 may be performed using adaptive motion compensated temporal filtering with two reference frames (e.g., frames 631, 635). As used herein, frames 631, 632, 633, 634, 635 may be characterized as a current frame when being denoised and as reference frames when being used for motion compensated temporal filtering. For example, motion estimation may be performed for a current frame with respect to such reference frames to generate motion vector fields and motion compensated temporal filtering may be performed using blocks of the reference frames indicated by such motion vector fields. Although illustrated with 2 reference frames for frames 632, 633, 634, any number of reference frames may be used.

Returning to FIG. 4, as discussed, pre-analyzer 403 may implement a scene change detector to flag hard scene cuts or changes. Scene change detection (SCD) may be used in a variety of video preprocessing applications. In the context of noise reduction using adaptive motion compensated temporal filtering, the absence of scene change detection may introduce visual artifacts at scene boundaries. Furthermore, scene change detection may be used to provide high coding efficiency in video coding for video sequences with frequent scene changes by optimal placement of entry points (e.g., I-pictures) and related management of group-of-pictures (GOP) size for a vide sequence.

Figure 7:
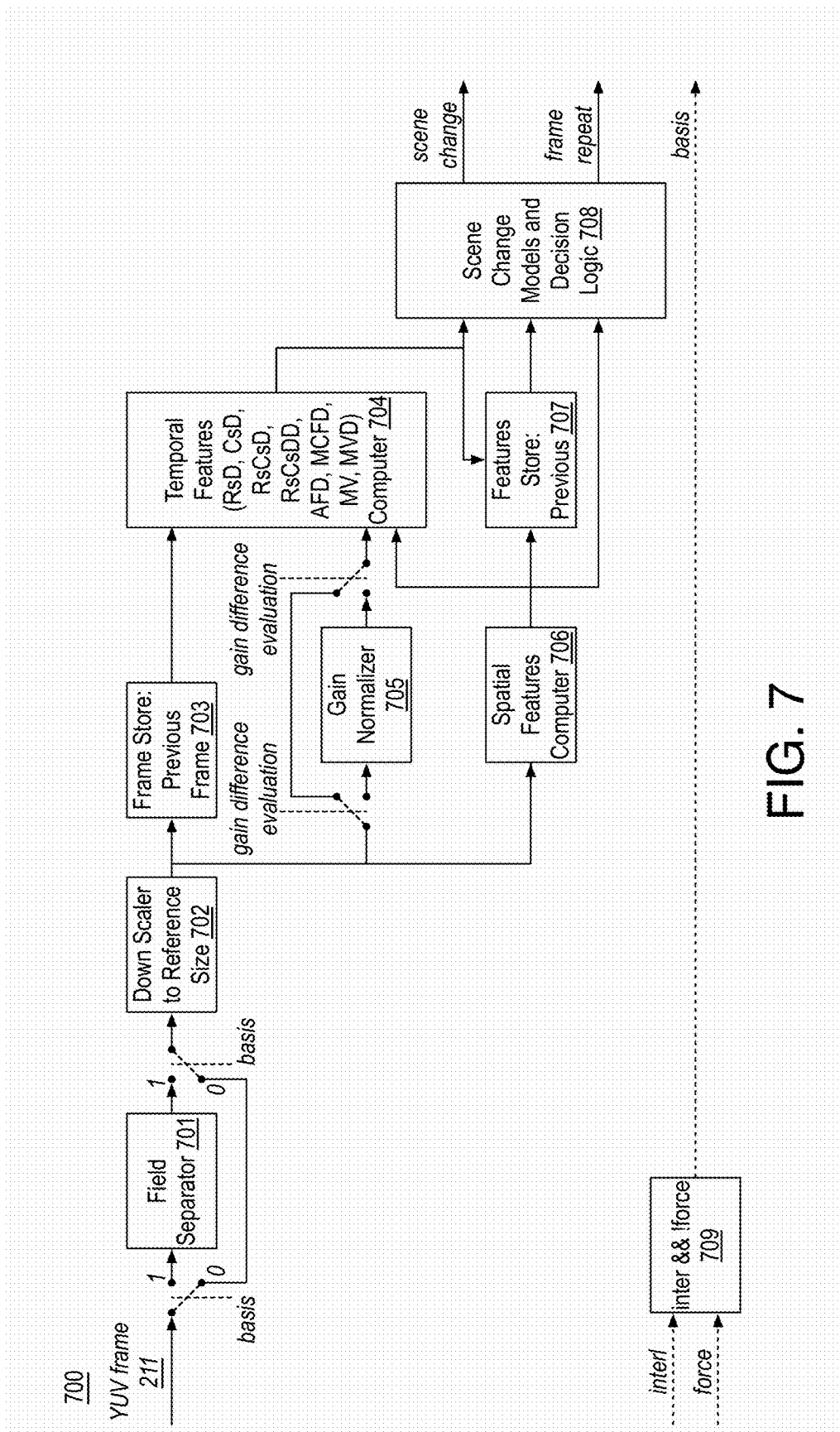
FIG. 7 illustrates a block diagram of an example scene change detector.

FIG. 7 illustrates a block diagram of an example scene change detector 700, arranged in accordance with at least some implementations of the present disclosure. As shown, scene change detector 700 may include a field separator 701, a down scaler to reference size (e.g., 128×64) module 702, a frame store (previous frame) 703, a temporal features computer 704 (e.g., to determine features such as RsD, CsD, RsCsD, RsCsDD, AFD, MCFD, MV, MVD), a gain normalizer 705, a spatial features computer 706 (e.g., to determine features such as Rs, Cs, SC index), a features store 707 (to store previous spatial and temporal features), a scene change models and decision logic 708, and an inter && !force module 709.

As shown, scene change detector 700 may receive a YUV frame 211 and scene change detector 700 may provide an indicator as to whether YUV frame 211 corresponds to a scene change. For example, scene change models and decision logic 708 may analyze spatial features of YUV frame 211 determined by spatial features computer 706 based on a down scaled frame provided by down scaler 702 and temporal features determined by temporal features computer 704 generated based on the down scaled current frame and down scaled previous frames. In some embodiments, the down scaled current frame may undergo gain normalization by gain normalizer 705 (i.e., under the control of a gain difference evaluation signal). If YUV frame 211 corresponds to a scene change, a scene change indicator or signal may be provided and, if not, a frame repeat indicator or signal may be provided. For example, by determining spatial and temporal features, and analyzing their behavior scene change detector 700 may determine whether a scene change has occurred or not. Although discussed herein with respect to scene change detector 700, pre-analyzer 403 may implement any suitable scene change detector.

Returning again to FIG. 4, pre-analyzer 403 may further analyze blocks or regions of YUV frame 211 for use in motion estimation and adaptive temporal/spatial filtering. In an embodiment, pre-analyzer 403 may measure the texture of blocks of YUV frame 211. As used herein, Rs may indicate a measure of vertical texture (e.g., vertical or row gradient) for a block and Cs may indicate a measure of horizontal texture (e.g., horizontal or column gradient) for a block. For example, an Rs and Cs calculator of pre-analyzer may determine on a block by block basis, Rs and Cs for blocks of YUV frame 211. In an embodiment, Rs and Cs are determined for each block using only the internal pixels (e.g., using the entirety of the pixels of the block and only the pixels of the block) of each block (e.g., 8×8 blocks or the like). Such techniques may avoid the introduction of false texture from a block or picture border related extension techniques.

The vertical and horizontal texture may be determined for blocks of YUV frame 211 using any suitable technique or techniques. In an embodiment, horizontal and vertical gradient square sums over each block may be determined as shown in Equations (1) and (2).

$$HorGradSqSum7x7[i][j] = \sum_{k=0...6}\sum_{l=0...6} (pel[(i \times b) + k][(j \times b) + l] - pel[(i \times b) + k][(j \times b) + l - 1])^2 \quad (1)$$

$$VertGradSqSum7x7[i][j] = \sum_{k=0...6}\sum_{l=0...6} (pel[(i \times b) + k][(j \times b) + l] - pel[(i \times b) + k - 1][(j \times b) + l])^2 \quad (2)$$

Next, Rs and Cs may be determined for each block (e.g., for 8×8 blocks such that b=7) using Equations (3) and (4) as follows.

$$Rs[i][j] = \sqrt{(VertGradSqSum7x7[i][j])/(b \times b)} \quad (3)$$

$$Cs[i][j] = \sqrt{(HorGradSqSum7x7[i][j])/(b \times b)} \quad (4)$$

As discussed, motion estimation may be performed (e.g., by bidirectional video motion estimation module 405) to determine or capture multiple samples of the same block (e.g., a current block) that may be used for noise reduction or rejection.

Figure 8:
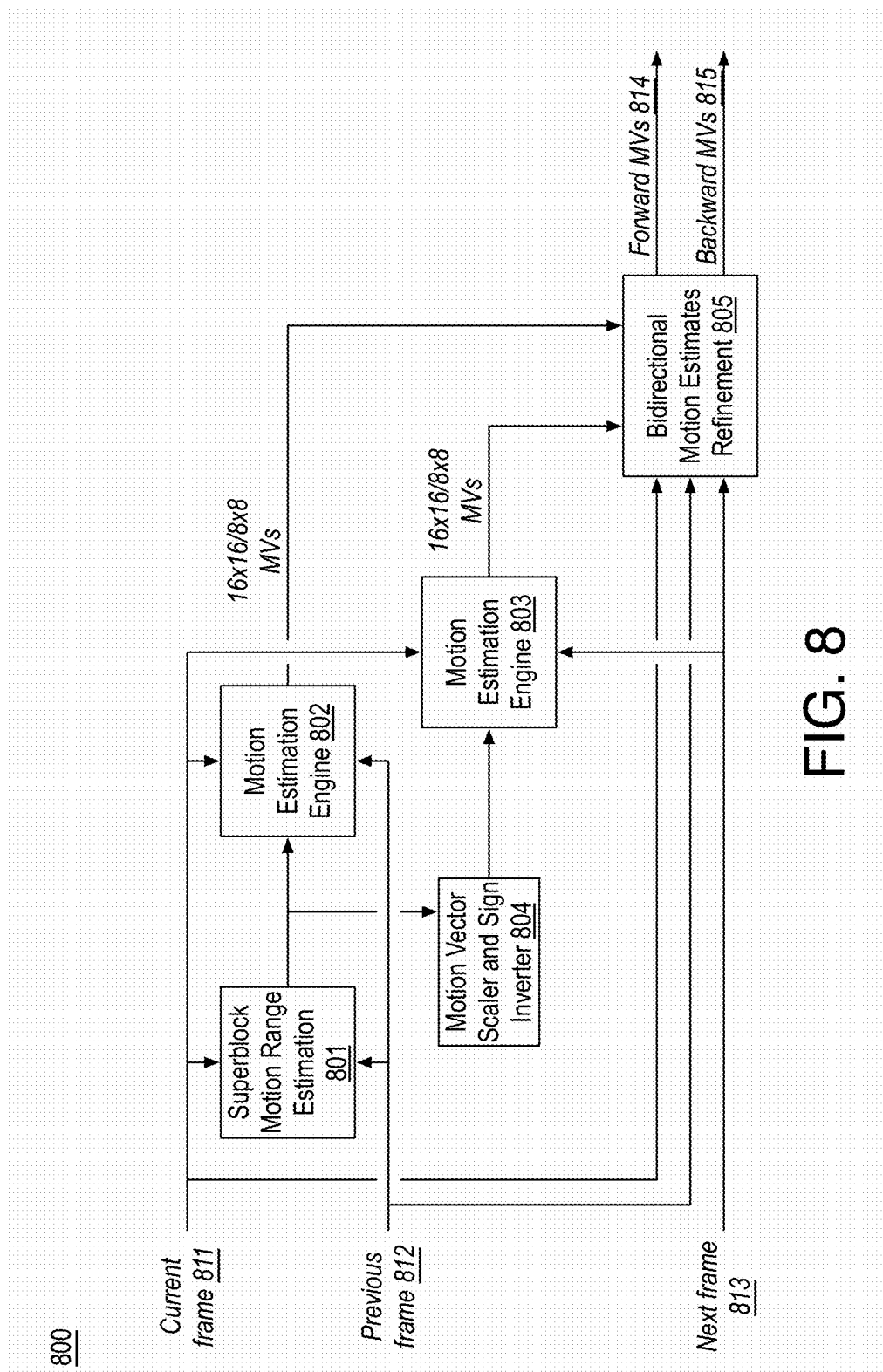
FIG. 8 illustrates an example motion estimation module for bidirectional motion estimation using two reference frames.

FIG. 8 illustrates an example motion estimation module 800 for bidirectional motion estimation using two reference frames, arranged in accordance with at least some implementations of the present disclosure. As shown, motion estimation module 800 may include a superblock motion range estimation module 801, a motion estimation engine 802, a motion vector scaler and sign invertor 804, a motion estimation engine 803, and a bidirectional motion estimates refinement module 805. Also as shown, motion estimation module 800 may receive a current frame 811, a previous frame 812, and a next frame 813 and motion estimation module 800 may provide forward motion vectors 814 (e.g., referencing previous frame 812) and backward motion vectors 815 (e.g., referencing next frame 813). For example, since motion estimation is computationally intensive, an initial analysis may be performed to determine direction and magnitude of motion so the motion estimation may be applied in the path of actual motion. For example, superblock motion range estimation module 801 (e.g., a motion range estimator (MRE)) may be applied to down sampled frames such as ¹⁄₁₆th size frames or pictures to determine predicted motion vectors.

The predicted motion vectors may be provided to motion estimation engine 802 for the generation of forward motion vectors. For example, motion estimation engine 802 may generate forward motion vectors (e.g., between current frame 811 and previous frame 812) or a motion vector field (e.g., 16×16/8×8 motion vectors) using the predicted motion vectors as an initial guess. For backward motion, the forward motion vectors may be inverted in sign and scaled by motion vector scaler and sign inverter 804, which may be provided to motion estimation engine 803, which may determine the backward direction motion vectors based on a motion search using the inverted motion vectors as guesses to generate backward motion vectors (e.g., between current frame 811 and next frame 813). As shown, the forward and backward motion vectors may be refined by bidirectional motion estimates refinement module 805. The refined forward motion vectors 814 and backward motion vectors 815 may be provided for motion compensation and adaptive filtering as discussed further herein.

In the discussed examples, motion estimation may be performed for 2 or 4 reference frames. However, such motion estimation may be extended to any number of references such as 1, 3, 6, 8, etc. such that more references or fewer may be used. A limiting factor for the expansion to additional frames is computational complexity (e.g., more reference requires more time needed for motion estimation). Furthermore, as discussed, motion estimation as performed by motion estimation engines 802, 803 may be performed in one of two modes: overlapped and non-overlapped.

FIG. 9A illustrates an example non-overlapped motion estimation context 900, arranged in accordance with at least some implementations of the present disclosure. In the example of FIG. 9A, for each block 901, 902, 903, 904 in non-overlapped motion estimation context 900, a motion vector is determined via search or the like. As shown, there is no overlap between blocks 901, 902, 903, 904 and the motion vectors (not shown) may be determined using any suitable technique or techniques such as those discussed herein. Furthermore, as discussed herein, during adaptive filtering, to determine overlapping pixels for the filtering of a current block, reference blocks corresponding to blocks 901, 902, 903, 904 (e.g., reference blocks from a reference frame determined using motion vectors) may be expanded such that overlapping pixels for the current block may be used. For example, the current block (in the current frame) and one or more reference blocks for the current block (the reference blocks being from the same or multiple reference frame) may be used for denoising. For example, the reference blocks are blocks from the reference frames that overlap a translation of the current block to the reference frames when motion compensation is performed on a corresponding one of blocks 901, 902, 903, 904. For example, if block 901 is the current block (being denoised), a motion compensated block from a reference frame may be determined (using the motion vector of block 901) for denoising. Furthermore, multiple reference blocks corresponding to blocks from a reference frame or multiple reference frames may be determined for denoising. The reference blocks are blocks from the reference frame(s) that are overlapped when the current block (e.g., block 901) is translated to the reference frame(s) when the motion vector for neighboring blocks (e.g., blocks 902, 903, 904) are used for the translation. Another way of looking at this is that neighboring blocks (e.g., blocks 902, 903, 904) are translated to the reference frames using the motion vectors of the neighboring blocks and then the translated blocks are extended to overlap the region that would be translated by the current block (e.g., block 901). For example, block 902 may be translated to a reference frame and the extended to the left to determine the reference overlap block for block 901. In an embodiment, the motion compensated current block and the reference blocks from a particular frame (prior or subsequent) may be averaged to determine an average or reference block for the current block for the particular frame.

FIG. 9B illustrates an example overlapped motion estimation context 920, arranged in accordance with at least some implementations of the present disclosure. In the example of FIG. 9B, motion estimation (ME) is performed for each block including a block 921 of regions 911, 912, 914, 915, a block 922 of regions 912, 913, 915, 916, a block 923 of regions 914, 915, 917, 918, and a block 924 of regions 915, 916, 918, 919. Motion estimation may also be performed for each of regions 911-919 (which also may be characterized as blocks). As shown, each block of blocks 921-924 may begin at half the width and/or height of the previous, neighboring block. For example, for a 16×16 setup, the first block (e.g., block 921) is located at (0,0), the block to the right of the first block (e.g., block 922) is located at (8,0), the block below the first block (e.g., block 923) is located at (0,8), and the block to the right of and below the first block (e.g., block 924) is located at (8,8). Furthermore, the next block to the right (not shown) is located at (16,0), and likewise for the next block row. In the illustrated example, regions 912, 915 overlap between block 921 and block 922, regions 914, 915 overlap between block 921 and block 923, and so on. For example, region 915 is provided in each of blocks 921-924. Furthermore, as discussed herein, during adaptive filtering, to determine overlapping pixels for the filtering of a current block when overlapped motion estimation was previously performed, the overlapping pixels may be retrieved based on the motion vectors provided (e.g., the pixels may be retrieved by motion compensation using the determined motion vectors). For example, to perform denoising as discussed herein, for a target region (e.g., region 915, which may be characterized as a current or target block), for a particular reference frame, the motion vectors of blocks 921-924 may be used to determine reference blocks for the target region for the particular reference frame such that a portion of each of the motion compensated blocks corresponding to blocks 921-924 provide overlap blocks for region 915 (e.g., a lower right portion of the motion compensated block of block 921, a lower left portion of the motion compensated block of block 922, the upper right portion of the motion compensated block of block 923, and the upper left portion of the motion compensated block of block 924). In an embodiment, the reference blocks from a particular frame (prior or subsequent) may be averaged to determine an average or reference block for the current block for the particular frame.

In the context of such non-overlapped and overlapped motion estimation, the number of blocks that need to be processed by motion estimation for overlapped motion estimation is provided by Equation (5) and the number of blocks that need to be processed by motion estimation for non-overlapped motion estimation is provided by Equation (6):

$$numBlocksOverlap = \left(\frac{width}{blkwidth}*2-1\right)*\left(\frac{height}{blkheight}*2-1\right) \quad (5)$$

$$numBlocksNonOverlap = \left(\frac{width}{blkwidth}*\frac{height}{blkheight}\right) \quad (6)$$

As discussed, bidirectional motion estimation and compensation may be used to denoise a current block in a current frame.

FIG. 10 illustrates example bidirectional motion estimation and compensation 1000 for denoising a current block in a current frame, arranged in accordance with at least some implementations of the present disclosure. As shown, for a current block A in a current frame 1002 (also labeled as 1), a forward motion vector $mv_f$ may be determined with respect to previous frame 1001 (also labeled 0) such that forward motion vector $mv_f$ references a reference block $A_f$ (e.g., a motion compensated block corresponding to current block A) in previous frame 1001 (which may be characterized as a reference frame). For example, reference block $A_f$ in previous frame 1001 may be a best match with respect to current block A. Similarly, for current block A in current frame 1002, a backward motion vector $mv_b$ may be determined with respect to future frame 1003 (also labeled 2) such that backward motion vector $mv_b$ references a reference block $A_b$ (e.g., a motion compensated block corresponding to current block A) in future frame 1003 (which may be characterized as a reference frame). For example, reference block $A_b$ in future frame 1003 may be a best match with respect to current block A in future frame 1003.

Although discussed with respect to previous and future frames, frames 1001, 1003 may be temporal previous and future frames or encode order previous and future frames or any suitable bidirectional frames with respect to current frame 1002.

Again returning to FIG. 4, after motion estimation (either overlapping or non-overlapping) by bidirectional video motion estimation module 405, the resulting motion vectors may be provided to a motion compensated merger (please refer to FIG. 2) or adaptive temporal/spatial filter 406 or the like. Adaptive temporal/spatial filter 406 or a motion compensated merging module may collect the motion vectors and may generate overlapped motion compensated 8×8 blocks from overlapped or non-overlapped motion estimation to determine the similarity between the motion compensated blocks and the current block. Weights may be assigned based on the similarity for merging the current block and the motion compensated block. As discussed, any number of references may be used for such merging. Furthermore, in some contexts, such merging may be skipped and spatial filtering may be used. Further still, in some contexts the type of merging performed may be varied as discussed further herein.

Figure 11:
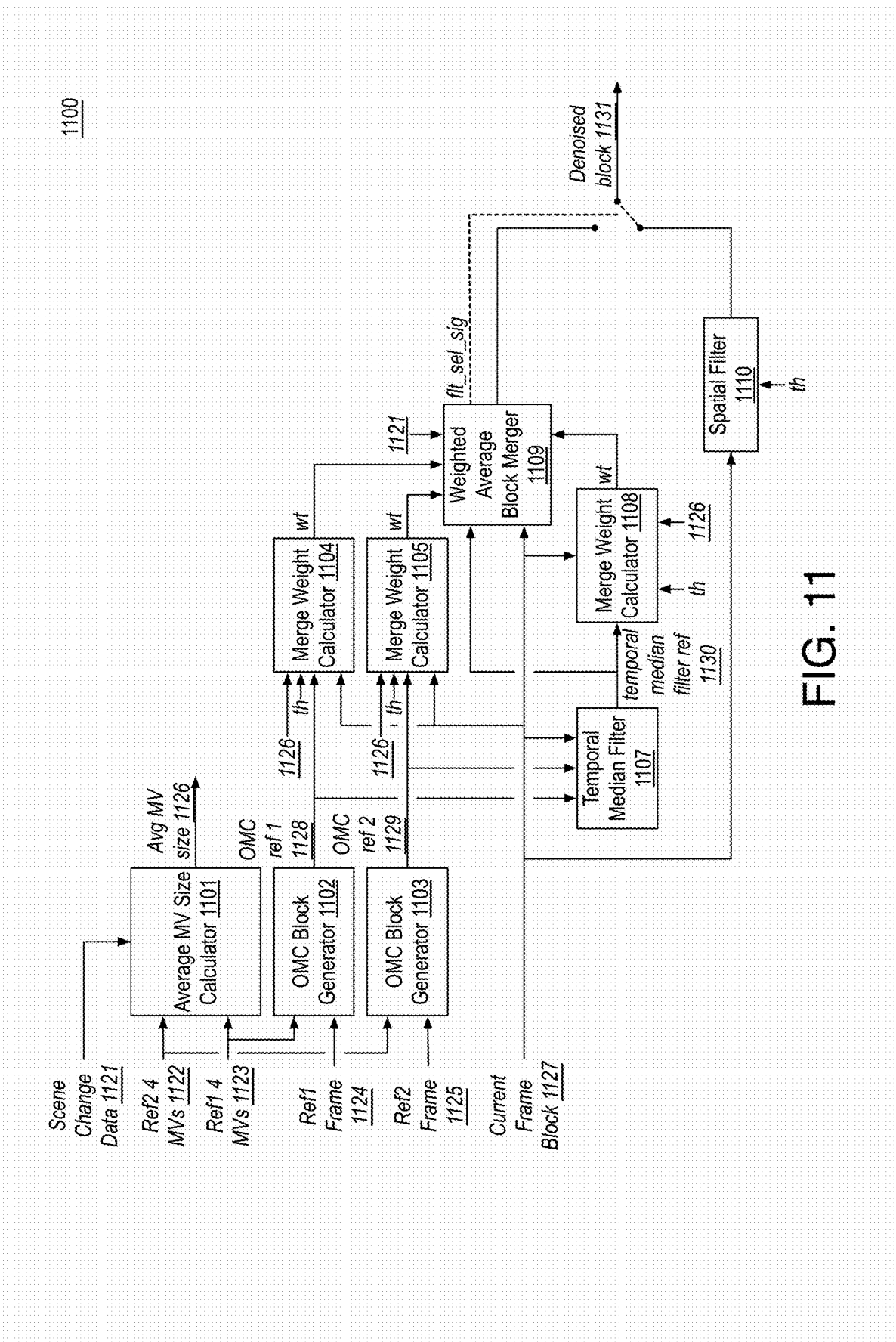
FIG. 11 illustrates an example adaptive temporal/spatial filter.

FIG. 11 illustrates an example adaptive temporal/spatial filter 1100, arranged in accordance with at least some implementations of the present disclosure. For example, adaptive temporal/spatial filter 1100 may be implemented as adaptive temporal/spatial filter 406. As shown, adaptive temporal/spatial filter 1100 may include an average motion vector size calculator 1101, an overlapped motion compensated (OMC) block generator 1102, an overlapped motion compensated block generator 1103, a merge weight calculator 1104, a merge weight calculator 1105, a temporal median filter 1107, a merge weight calculator 1108, a weighted average block merger 1109, and a spatial filter 1110. For example, overlapped motion compensated block generators 1102, 1103 may generate 8×8 overlapped blocks (overlapped motion compensated blocks 1128, 1129, respectively) for a current 8×8 block being denoised.

Also as shown, adaptive temporal/spatial filter 1100 may receive scene change data 1121, reference 2 4 motion vectors 1122, reference 1 4 motion vectors 1123, reference 1 frame 1124, reference 2 frame 1125, and a current frame block 1127. For example, denoising may be performed for current frame block 1127 to generate a denoised block 1131. Such denoising may be performed based on a first reference frame (reference 1 frame 1124) and a second reference frame (reference 2 frame 1125) such that the first and second reference frames are any reference frames discussed herein. Furthermore, for current frame block 1127, four motion vectors may reference the first reference frame (reference 1 4 motion vectors 1123) and four motion vectors may reference the second reference frame (reference 2 4 motion vectors 1122). Although discussed with respect to 4 motion vectors for each of 2 reference frames, any number of motion vectors and reference frames may be used.

As is discussed further below, based on the, for example, four motion vectors for a reference frame, a reference block (e.g., a motion compensated block) for current frame block 1127 may be determined (e.g., using a motion vector that references the reference block from current frame block 1127) and three overlapping reference blocks may also be determined. For each of the three overlapping reference blocks, a neighbor block to current frame block 1127 may be determined, a motion vector for the neighbor block may be retrieved, the reference block for the neighbor block may be determined, and an overlapping reference block may be determined. The overlapping reference block includes pixel values from the reference frame for current frame block 1127 as determined based on the neighbor block and the neighbor block's motion vector but, of course, the pixel information of the overlapping reference block corresponds to current frame block 1127. When overlapping motion estimation was used to generate the discussed motion vectors, the overlapping reference block may be determined using standard motion compensation (e.g., the motion vector of the neighboring block may be used to retrieve the overlapping reference block). When non-overlapping motion estimation was used to generate the discussed motion vectors, the block retrieved using motion compensated must be extended to retrieve the overlapping reference block. In any case, the reference blocks from a reference frame may be averaged to generate overlapped motion compensated blocks 1128, 1129 such that overlapped motion compensated block 1128 is a reference block (e.g., an average reference block) from reference 2 frame 1125 (e.g., a prior or subsequent reference frame with respect to the current frame of current frame block 1127) and overlapped motion compensated block 1129 is a reference block (e.g., an average reference block) from reference 1 frame 1124 (e.g., a prior or subsequent reference frame with respect to the current frame of current frame block 1127).

Based on the current block, the overlapping reference block or average reference block, and other information such as average motion vector size and a user defined threshold, merge weights may be determined for the blocks. Furthermore, multiple denoising techniques may be evaluated or a selected denoising technique from multiple denoising techniques may be determined based on the current block, the overlapping reference blocks, and other information as discussed below.

For example, FIG. 11 illustrates how overlapped 8×8 block may be generated. As shown, overlapped motion compensated block generator 1102 may collect the motion vectors from all or some of the four quadrants that are around the target or current block (e.g., current frame block 1127) that reference reference 1 frame 1124 via reference 1 4 motion vectors 1123. For non-overlapped motion estimation, overlapped motion compensated block generator 1102 determines the motion vectors from the closest neighboring blocks for current frame block 1127 and uses them as if they were 16×16 blocks (e.g., gathering 16×16 reference blocks such that a portion of the 16×16 reference block is an overlapping portion and provides an overlapping reference block for current frame block 1127). For overlapped motion estimation, the motion vectors may be used to gather the blocks needed to generate overlapping reference blocks. In either case, an overlapping reference block as used herein includes pixel values of a reference frame overlapped by current frame block 1127 (e.g., a current or target block) when current frame block 1127 is translated to the reference frame by a motion vector corresponding to the block neighboring or overlapping current frame block 1127. For example, the motion vector corresponding to the block neighboring or overlapping current frame block 1127 is that block's motion vector (e.g., as determined by motion estimation) and references a reference frame to determine a motion compensated block corresponding to the block neighboring or overlapping current frame block 1127. All reference blocks from a particular reference frame (e.g., the motion compensated block for current frame block 1127 and the reference blocks determined by the discussed overlapping techniques, which may typically include 4 total blocks—one motion compensated block for current frame block 1127 and three overlapping reference blocks) such as reference 1 frame 1124 may then be averaged to provide an average block for the particular reference frame. Such an average block may be characterized as an average reference block, an overlapped average reference block, an overlapping motion compensated block, or the like. Such an average block may be determined for each reference frame used to denoise current frame block 1127. With respect to overlapped motion compensated block generator 1102, the average block is labeled as overlapped motion compensated (OMC) reference 1 1128 (e.g., overlapped motion compensated reference block 1128).

Similarly, overlapped motion compensated block generator 1103 may collect the motion vectors from all or some of the four quadrants that are around the target or current block (e.g., current frame block 1127) that reference reference 2 frame 1125 via reference 2 4 motion vectors 1122. As discussed, for non-overlapped motion estimation, overlapped motion compensated block generator 1103 determines the motion vectors from the closest neighboring blocks for current frame block 1127 and uses them as if they were 16×16 blocks (e.g., gathering 16×16 reference blocks such that a portion of the 16×16 reference block is an overlapping portion and provides an overlapping reference block for current frame block 1127). For overlapped motion estimation, the motion vectors may be used to gather the blocks needed to generate overlapping reference blocks. In either case, an overlapping reference block, as discussed, includes pixel values of a reference frame overlapped by current frame block 1127 (e.g., a current or target block) when current frame block 1127 is translated to the reference frame by a motion vector corresponding to the block neighboring or overlapping current frame block 1127. As discussed above, all reference blocks from reference 2 frame 1125 (e.g., the motion compensated block for current frame block 1127 and the reference blocks determined by the discussed overlapping techniques, which may typically include 4 total blocks—one motion compensated block for current frame block 1127 and three overlapping reference blocks) may then be averaged to provide an average block for reference 2 frame 1125. With respect to overlapped motion compensated block generator 1103, the average block is labeled as overlapped motion compensated (OMC) reference 2 1129 (e.g., overlapped motion compensated reference block 1129).

When motion compensated overlapped blocks 1128, 1129 (e.g., the average blocks) for each reference frame (e.g., reference 1 frame 1124, reference 2 frame 1125) are generated, they may be provided to merge weight calculators 1104, 1105, which may use the average motion vector size (as discussed below) calculated from the motion vectors used to generate that motion compensated block as well as a filter strength value provided by a user or an application and the scene change information (e.g., which nullifies the weight in case a particular reference belongs to a different scene than the current frame) to determine merge weights.

Based on the merge weights (wt), the motion compensated overlapped reference blocks 1128, 1129 (e.g., average blocks as discussed) and current frame block 1127 may be merged (via weighted average block merger 1109) and provided, as denoised block 1131 to be combined into a denoised output frame. As shown, alternatively, spatial filtering may be applied to current frame block 1127 (under the control of a filter selection signal flt_sel_sig) by spatial filter 1110. Furthermore, the discussed merging may be weighted averaging of current frame block 1127 and motion compensated overlapped reference blocks 1128, 1129 (e.g., OMC ref 1 and OMC ref 2) using weights generated by merge weight calculators 1104, 1105 or merging may be performed using current frame block 1127 and a block generated by temporal median filtering. For example, temporal median filter 1107 may apply pixel wise median filtering to current frame block 1127 and motion compensated overlapped reference blocks 1128, 1129 (e.g., OMC ref 1 and OMC ref 2) to generate a median filtered block (e.g., temporal median filter ref 1130). Median filtered reference block 1130 may be characterized as a filtered block, a temporal median filter reference block, a filtered reference block, or the like. Weighted averaging may then be applied to current frame block 1127 and median filtered reference block 1130 by weighted average block merger 1109 using weights (wt) determined by merge weight calculator 1108 as is discussed further herein. Weighted average block merger 1109 may output the weighted averaged block as denoised block 1131.

Therefore, for each current frame block 1127, one of three denoising or filtering techniques may be used: (1) spatial filtering of current frame block 1127 by spatial filter 1110, (2) weighted averaging of current frame block 1127 and motion compensated overlapped reference blocks 1128, 1129 by weighted average block merger 1109, or (3) temporal median filtering of current frame block 1127 and motion compensated overlapped reference blocks 1128, 1129 to generate median filtered reference block 1130 by temporal median filter 1107 followed by weighted averaging of current frame block 1127 and median filtered reference block 1130 by weighted average block merger 1109. In any event, the resulting denoised block corresponding to current frame block 1127 is provided as denoised block 1131.

For example, if average motion vector size 1126 indicates small motion, all references blocks (e.g., OMC reference 1 and OMC reference 2 or more, if used) and the current block (current frame block 1127) may be processed by temporal median filter 1107, which provides median filtering across collocated pixels in current frame block 1127 and the overlapping reference block to generate median filtered reference block 1130 corresponding to current frame block 1127. A weighted average (using weights from merge weight calculator 1108) of median filtered reference block 1130 and current frame block 1127 may then be determined to generate denoised block 1131. If average motion vector size 1126 does not indicate small motion, a weighted average (using weights from merge weight calculators 1104, 1105) of current frame block 1127 and motion compensated overlapped reference blocks 1128, 1129 (e.g., OMC reference 1 and OMC reference 2 or more, if used) may be determined to generate denoised block 1131. Also as shown, if a comparison of current frame block 1127 with motion compensated overlapped reference blocks 1128, 1129 (e.g., OMC reference 1 and OMC reference 2) indicate current frame block 1127 is not motion compensable (e.g., via filter selection signal), spatial filtering may be applied current frame block 1127 and the spatially filtered denoised block may be provided as denoised block 1131.

For example, if an average motion vector size indicates small motion (e.g., average motion vector size 1126 is less than a threshold), the temporal median filtering followed by weighted averaging techniques may be used. Furthermore, if current frame block 1127 is not motion compensable as determined based on a comparison of current frame block 1127 to motion compensated overlapped reference blocks 1128, 1129 (e.g., using sum of absolute differences, SAD, a total SAD, an average SAD, or the like compared to threshold), spatial filtering (e.g., an intra filter) may be used. For example, a SAD value threshold of 289 may be used for 8×8 blocks.

As shown, average motion vector size calculator 1101 may determine an average motion vector size 1126. Average motion vector size 1126 may be determined based on motion vectors 1122, 1123 using any suitable technique or techniques. In an embodiment, average motion vector size 1126 is determined as the average magnitude of all the motion vectors of all the references used with the condition that, scene change motion vectors (as determined based on scene change data 1121) are removed from the calculation since that reference frame will not going to be used for processing. For example, as discussed, for 8×8 motion compensation (overlapped block method) in the context of 2 reference frames, 4 motion vectors are used: one that corresponds to the actual 8×8 block (e.g., current frame block 1127) and 3 that correspond to 16×16 regions (that also include the actual 8×8 block, current frame block 1127). As will be appreciated, for 4 or more reference frames, additional motion vectors will be used. Furthermore, a magnitude of a motion vectors may be provided as sqrt (mvx$^2$+mvy$^2$) where sqrt provides a square root and mvx and mvy are the x and y components of the motion vector. Average motion vector size 1126 may then be provided as follows in Equation (7):

$$\text{avg\_MV\_size} = \frac{\sum_{i=0}^{numref} \sum_{j=0}^{numMotionVectors} (mv_{ij})}{numref * numMotionVectors} \quad (7)$$

where avg_MV_size is average motion vector size 1126, numRef is the number of reference frames, numMotionVectors is the number of motion vectors for each reference frame, and $mv_{ij}$ is the magnitude of each motion vector.

Discussion now turns to weighted averaging to determine denoised block 1131. For example, current frame block 1127 and each average reference block (e.g., motion compensated overlapped reference blocks 1128, 1129 or more, if used) may be weighted averaged to generate denoised block 1131. For example, as discussed, generating a motion compensated filtering version of current frame block 1127 using 2 reference frames may involve mixing current frame block 1127 and the average reference block from each reference frame using separate weights for each of the blocks. The determination of such weights is discussed elsewhere herein. An example mixing process or weighted averaging to generate denoised block 1131 is shown as follows in Equation (8):

$$\text{wt\_mixing\_filt}=(\text{wt\_cur}*\text{curblk})+\sum_{i=1}^{numRef}(\text{wt}_i*\text{refblk}_i) \quad (8)$$

where wt_mixing_filt is denoised block 1131, wt cur is the weight for current frame block 1127, curblk is current frame block 1127, numRef is the number of reference frames (and the number of average reference blocks), $wt_i$ is the weight for each (averaged) reference block, and $refblk_i$ is each (averaged) reference block (e.g., motion compensated overlapped reference blocks 1128, 1129 or more, if used).

Discussion now turns to median filtering followed by weighted filtering to determine denoised block 1131. For example, current frame block 1127 and each average reference block (e.g., motion compensated overlapped reference blocks 1128, 1129 or more, if used) may be median filtered to generate a median filtered block (e.g., median filtered reference block 1130). Subsequently, current frame block 1127 and median filtered reference block 1130 may be weighted averaged to generate denoised block 1131. For example, temporal median filtering may involve using average reference blocks (e.g., motion compensated overlapped reference blocks 1128, 1129 or more, if used) generated as discussed herein and performing pixel-by pixel (e.g., for each block) median filtering across, for example, 3 pixels from (e.g., past, current, next) frames, and taking the middle (median) value. Such processing results in, for example, a 8×8 median filtered block (e.g., median filtered reference block 1130) that corresponds to current frame block 1127. Median filtered reference block 1130 is then merged or mixed with current frame block 1127 using weights determined using techniques discussed elsewhere herein. The process of temporal filtering followed by weighted averaging is shown as follows in Equation (9):

$$\text{wt\_mixing\_median\_filt} = \begin{cases} \text{temporal\_median\_filt}(curblk, refblk_i) \\ (\text{wt\_cur}*curblk) + (\text{wt\_median}*medianblk) \end{cases} \quad (9)$$

where wt_mixing_median_filt is denoised block 1131, temporal_median_filt provides median filtering, curblk is current frame block 1127, $refblk_i$ is each (averaged) reference block (e.g., motion compensated overlapped reference blocks 1128, 1129 or more, if used), wt_cur is the weight for current frame block 1127, wt_median is the weight for the median filtered block, and medianblk is the median filtered block (e.g., median filtered reference block 1130).

As discussed, in some contexts, spatial filtering may be applied to current frame block 1127 when current frame block 1127 is deemed to not be motion compensable. Such spatial filtering may be performed using any suitable technique or techniques. In an embodiment, spatial filtering may be provided as shown as follows in Equation (10):

$$\text{spatial\_filt}=\text{spatial\_filt}(curblk) \quad (10)$$

where spatial_filt is denoised block 1131 and a function that provides spatial filtering and curblk is current frame block 1127.

Discussion now turns to selection of the technique for generating denoised block 1131 (e.g., weighted averaging only, temporal filtering followed by weighted averaging, or spatial filtering only). Selection of the technique for generating denoised block 1131 may be performed using any suitable technique or techniques. In an embodiment, each technique may be implemented and a technique that provides a minimum difference between the denoised blocks and current frame block 1127 may be used to generate denoised block 1131.

In some embodiments, a determination may be made as to whether current frame block 1127 is motion compensable. If not, spatial filtering may be used. If so, a further determination may be made as to whether current frame block 1127 and the neighboring blocks exhibit small motion. If so, temporal filtering followed by weighted averaging is used. If not, weighted averaging only is used. In some embodiments, selection of the best of three filtering options is based on average motion vector size 1126 (avg_motion_size) and a comparison of generated blocks (e.g., via SAD) as shown in Equation (11) as follows. For example, Equation (11) provides for median filtering followed by weighted averaging for small motion (e.g., small MVs), for spatial filtering of blocks that are not motion compensable, and for all other cases, weighted averaging filtering (e.g., motion compensated filtering). For example, Equation (11) may provide for filtering option selection as follows:
filter_selection_criteria:

if(((avg_MV_size>size_limit) or !(numref %2))&
    SAD<SAD_limit), then use wt_mixing_filt( )
else if((avg_MV_size<size_limit)&
    SAD<SAD_limit), then use wt_median_filt( )
else use spatial)filt( )                                    (11)

where SAD is the sum of absolute differences for current frame block 1127 when compared to an average block or blocks (e.g., motion compensated overlapped reference blocks 1128, 1129 or more, if used), SAD_limit is a threshold (e.g., 289 or the like), !(numref %2) indicates the number of references is not a factor of 2, avg_MV_size is average motion vector size 1126), and size_limit is a threshold to determine whether motion is small or not small (e.g., size_limit may be 2.5 pixels, 3 pixels, 8 pixels, or the like). For example, size_limit may be empirically obtained value such that motion is small enough to grant advantages when a unique reference is created with the temporal median filter.

For example, average motion vector size calculator 1101 may take as input the motion vectors for each reference or block used for motion compensation (e.g., via reference 2 4 motion vectors 1122, reference 1 4 motion vectors 1123) and scene change information (e.g., via scene change data 1121) and average motion vector size calculator 1101 may determine the average magnitude of all the received motion vectors. Scene change data 1121 may be used to invalidate the set of motion vectors that belong to the reference that are not of the same scene as the current frame and, in that case, the average magnitude may be calculated only with the motion vectors from the references that are in the same scene as the current frame.

Figure 12:
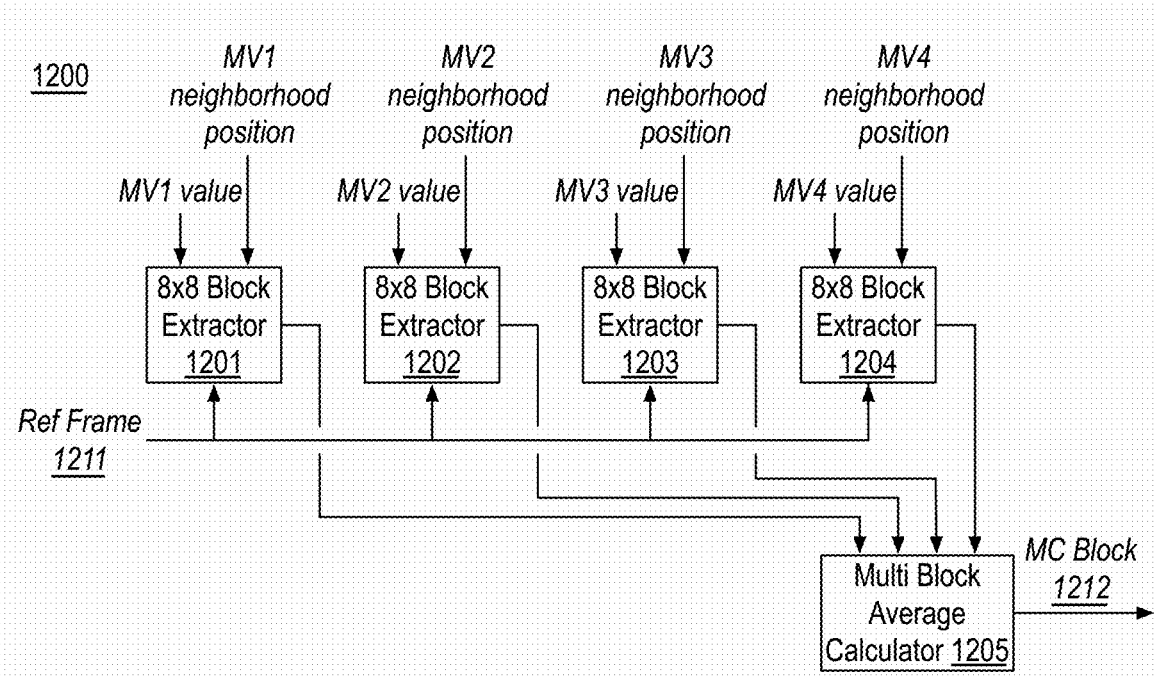
FIG. 12 illustrates an example overlapped motion compensated block generator.

FIG. 12 illustrates an example overlapped motion compensated block generator 1200, arranged in accordance with at least some implementations of the present disclosure. For example, overlapped motion compensated block generator 1200 may be implemented as overlapped motion compensated block generators 1102, 1103. As shown, overlapped motion compensated block generator 1200 may include 8×8 block extractors 1201, 1202, 1203, 1204, and a multi block average calculator 1205. Also as shown, overlapped motion compensated block generator 1200 may receive MV1 value, MV2 value, MV3 value, MV4 value, MV1 neighborhood position, MV2 neighborhood position, MV3 neighborhood position, MV4 neighborhood position, and reference frame 1211 and overlapped motion compensated block generator 1200 may generate a motion compensated block 1212 (e.g., one of motion compensated overlapped reference blocks 1128, 1129 or more, if used). For example, each of 8×8 block extractors 1201, 1202, 1203, 1204 may extract an 8×8 reference block corresponding to the target block such that each reference block includes pixel values from reference frame 1211 corresponding to a translation of the target block to reference frame 1211 using values MV1-MV4. For example, values MV1-MV4 neighborhood positions MV1-MV4 may be used to collect such pixel values from reference frame 1211 corresponding to a translation of the target block to reference frame 1211.

As discussed, while motion estimation may be performed using block overlap or not, motion compensation is always performed with overlapping blocks such that the overlapped blocks may be averaged to generate a motion compensated reference block (e.g., motion compensated overlapped reference blocks 1128, 1129 or more, if used). Overlapped motion compensation may be straightforward when motion estimation is overlapped. For example, the overlapping neighbor blocks of the target block may be motion compensated to retrieve the pixel values from the reference frame corresponding to the overlap of the target block. In the context of non overlapped motion estimation with respect to a current block, the neighborhood of motion vectors is used to generate an overlapped block including the block to the right, the block below, and the block to the right of the block below. The overlapping blocks are then combined in one final reference block as an average of all 4 blocks.

Figure 13:
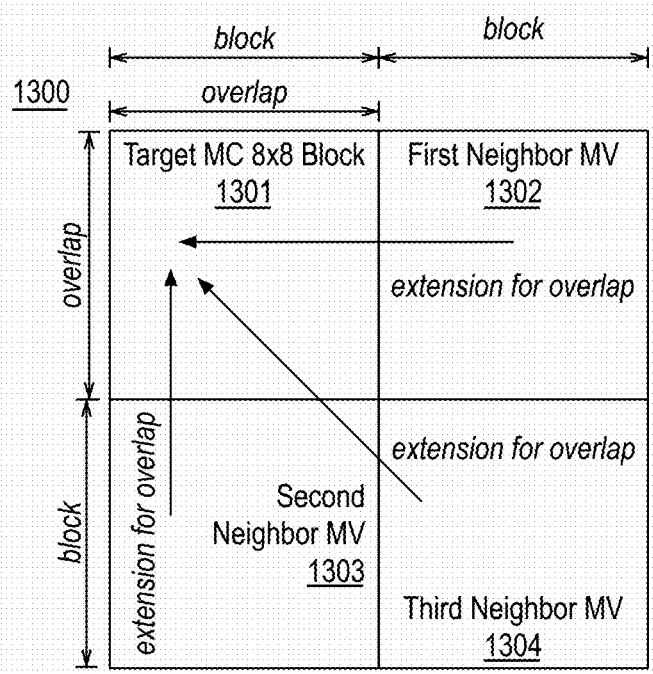
FIG. 13 illustrates the generation of an overlapped target block from non-overlapped motion estimation.

FIG. 13 illustrates the generation of an overlapped target block 1300 from non-overlapped motion estimation, arranged in accordance with at least some implementations of the present disclosure. As shown, the generation of overlapped target block 1300 may include a target motion compensated 8×8 block 1301 (e.g., a block determined from reference frame 1211 using a motion vector corresponding to the target block itself), an extension of a reference block from a first neighbor motion vector 1302 to determine overlapping pixel values, an extension of a reference block from a second neighbor motion vector 1303 to determine overlapping pixel values, and an extension of a reference block from a third neighbor motion vector 1304 to determine overlapping pixel values. As shown, the neighboring motion vectors may be from neighbors to the right, below, and to the right and below the target block. However, any neighboring motion vectors may be used. As discussed, each motion compensated block corresponding to the neighboring motion vectors may be determined and extended based on the relationship between the neighbors in a proper direction to determine pixel values from the reference frame that would overlap with the target block. Such processing may provide the pixel values from the reference frame that would be determined if the neighboring motion vectors were applied to the target block itself. Thereby, 4 sets of pixel values may be determine for overlapped target block 1300: pixel values from the reference frame for a motion compensated block corresponding to the target block, pixel values from the reference frame that correspond to expanding a motion compensated block corresponding to a neighbor block to the right of the target block such that the expansion is to the left of the neighbor block in response to the neighbor block being to the right of the target block, pixel values from the reference frame that correspond to expanding a motion compensated block corresponding to a neighbor block below the target block such that the expansion is upward from the neighbor block in response to the neighbor block being below the target block, pixel values from the reference frame that correspond to expanding a motion compensated block corresponding to a neighbor block below and to the right of the target block such that the expansion is to the left and upward of the neighbor block in response to the neighbor block being below and to the right of the target block, or the like for other neighbors (e.g., above, above and to the right, to the left, or below and to the left) of the target block.

The pixel values may be averaged as discussed herein to determine an average reference block for the current target block (e.g., one of motion compensated overlapped reference blocks 1128, 1129 or more, if used, please refer to FIG. 11). As discussed, such determination of sets of pixel values and averaging may be performed by 8×8 block extractors 1201, 1202, 1203, 1204 and multi block average calculator 1205, respectively, to generate motion compensated block 1212 (e.g., an average reference block) for a target block.

Figure 14:
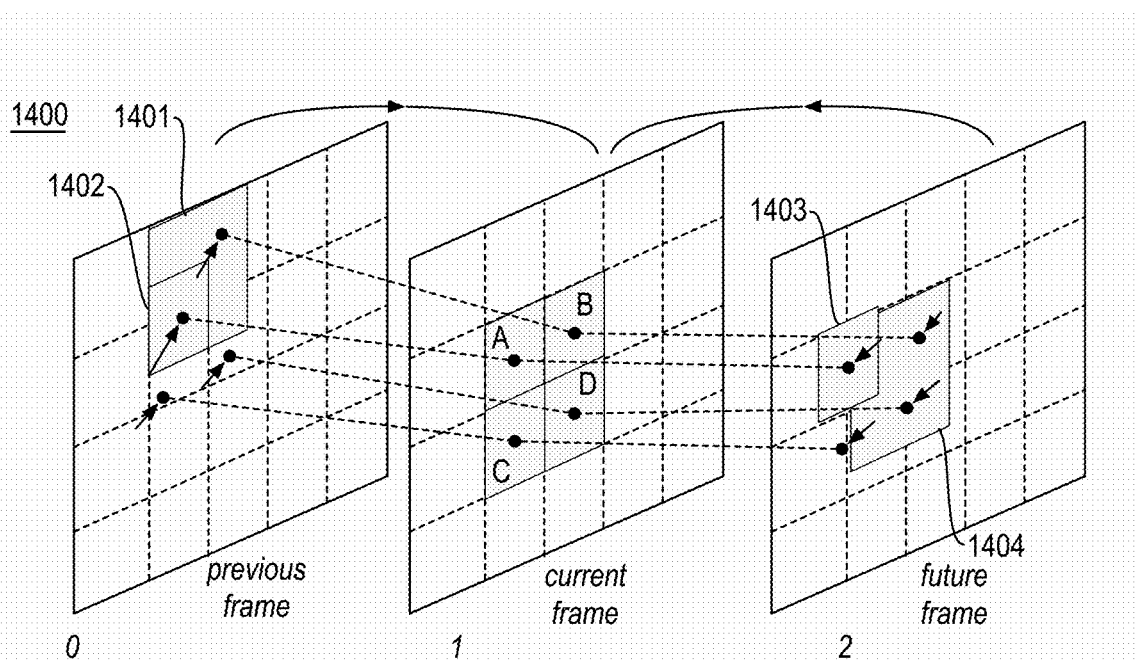
FIG. 14 illustrates example overlapping motion compensation from non-overlapped motion estimation.

FIG. 14 illustrates example overlapping motion compensation 1400 from non-overlapped motion estimation, arranged in accordance with at least some implementations of the present disclosure. As shown, overlapping motion compensation 1400 may determine, for a target block A, a motion compensated block 1402 corresponding to target block A in the previous frame (e.g., via 8×8 block motion compensation without need for expansion). Furthermore, overlapping motion compensation 1400 may determine an extended motion compensated block 1401 corresponding to target block A. For example, extended motion compensated block 1401 may be determined by accessing an 8×8 block (not shown) in the previous frame motion compensated from block B to the right of target block and extending the 8×8 block to generate extended motion compensated block 1401 (extended to 16×16 in FIG. 14 although 16×8 could be used in this context) that includes overlapping pixels for target block A. The overlapping pixels (e.g., those pixels determined by translating target block A to the previous frame using the motion vector of neighboring block B) may be used to generate an average reference block for target block A and the previous frame (e.g., a first reference frame) as discussed herein. Similarly, such overlapping pixels may be determined using such motion compensation and block extension using neighboring blocks C and D (not shown for the sake of clarity), which are also used in the generation of the average reference block.

Similarly, overlapping motion compensation 1400 may determine, for target block A, a motion compensated block 1403 corresponding to target block A in the future frame (e.g., via 8×8 block motion compensation without need for expansion). Furthermore, overlapping motion compensation 1400 may determine an extended motion compensated block 1404 corresponding to target block A. For example, extended motion compensated block 1401 may be determined by accessing an 8×8 block (not shown) in the future frame by motion compensating from block B to the right of target block and extending the 8×8 block to generate extended motion compensated block 1404 (extended to 16×16 in FIG. 14 although 16×8 could be used in this context) that includes overlapping pixels for target block A. The overlapping pixels (e.g., those pixels determined by translating target block A to the future frame using the motion vector of neighboring block B) may be used to generate an average reference block for target block A and the previous frame (e.g., a first reference frame) as discussed herein. Similarly, such overlapping pixels may be determined using such motion compensation and block extension using neighboring blocks C and D (not shown for the sake of clarity), which are also used in the generation of the average reference block.

As discussed, FIGS. 13 and 14 illustrate how, for the case of non-overlapped motion estimation, the overlapped motion compensated block is produced using the current position motion compensated block plus the 3 adjacent neighbors (right, bottom and right bottom) such that the adjacent neighbors motion compensated blocks are extended to, for example, a 16×16 area so they overlap with the current block. With the 4 different samples of the same motion compensated block (e.g., the target block), these sample block are averaged and the output is one of the references used for denoising (e.g., motion compensated overlapped reference blocks 1128, 1129 or more, if used).

Figure 15:
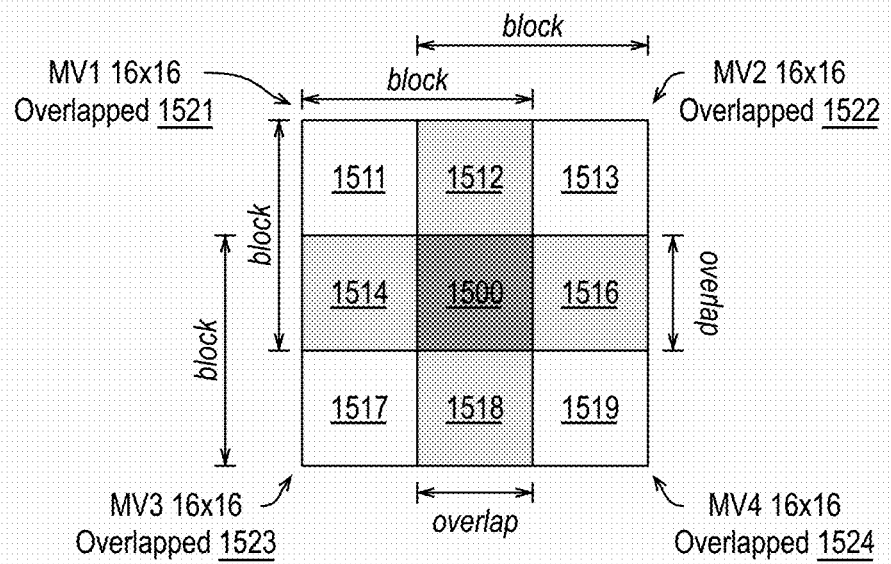
FIG. 15 illustrates the generation of an example overlapped target block from overlapped motion estimation.

FIG. 15 illustrates the generation of an example overlapped target block 1500 from overlapped motion estimation, arranged in accordance with at least some implementations of the present disclosure. As shown, the generation of an overlapped 8×8 target block 1500 may include retrieving pixel values from a reference frame corresponding to MV1 16×16 overlapped 1521 (e.g., a motion vector for a 16×16 block that overlaps 8×8 target block 1500), pixel values from a reference frame corresponding to MV2 16×16 overlapped 1522 (e.g., a motion vector for a 16×16 block that overlaps 8×8 target block 1500), pixel values from a reference frame corresponding to MV3 16×16 overlapped 1523 (e.g., a motion vector for a 16×16 block that overlaps 8×8 target block 1500), and pixel values from a reference frame corresponding to MV4 16×16 overlapped 1524 (e.g., a motion vector for a 16×16 block that overlaps 8×8 target block 1500). For example, MV1 16×16 overlapped 1521 may retrieve pixel values for regions 1511, 1512, 1514, and 1500, MV2 16×16 overlapped 1522 may retrieve pixel values for regions 1512, 1513, 1500, and 1516, MV3 16×16 overlapped 1523 may retrieve pixel values for regions 1514, 1500, 1517, and 1518, and MV4 16×16 overlapped 1524 may retrieve pixel values for regions 1500, 1516, 1518, and 1519. As shown, the overlapping blocks may be in quadrants around target block 1500 (above and to the left, above and to the right, below and to the left, and below and to the right with respect to target block 1500). Thereby, 4 sets of pixel values may be determine for overlapped target block 1500: pixel values from a reference frame corresponding to region 1500 accessed based on a motion vector from a block including regions 1511, 1512, 1514, 1500 overlapping and above and to the left of region 1500, pixel values from a reference frame corresponding to region 1500 accessed based on a motion vector from a block including regions 1512, 1513, 1500, 1516 overlapping and above and to the right of region 1500, pixel values from a reference frame corresponding to region 1500 accessed based on a motion vector from a block including regions 1514, 1500, 1517, 1518 overlapping and below and to the left of region 1500, and pixel values from a reference frame corresponding to region 1500 accessed based on a motion vector from a block including regions 1500, 1516, 1518, 1519 overlapping and below and to the right of region 1500.

The pixel values for region 1500 (e.g., 4 sets of pixel values in this example) may be averaged as discussed herein to determine an average reference block (one of motion compensated overlapped reference blocks 1128, 1129) for the current target block. As discussed, such determination of sets of pixel values and averaging may be performed by 8×8 block extractors 1201, 1202, 1203, 1204 and multi block average calculator 1205, respectively, to generate motion compensated block 1212 (e.g., an average reference block such as one of motion compensated overlapped reference blocks 1128, 1129) for a target block (e.g., current frame block 1127).

Discussion now turns to temporal filtering of the discussed target block and average reference blocks to determine a median filtered block. For example, such median filtering may be performed on current frame block 1127 and motion compensated overlapped reference blocks 1128, 1129 by temporal median filter 1107 to generate median filtered reference block 1130 (please refer to FIG. 11) as discussed herein.

Figure 16:
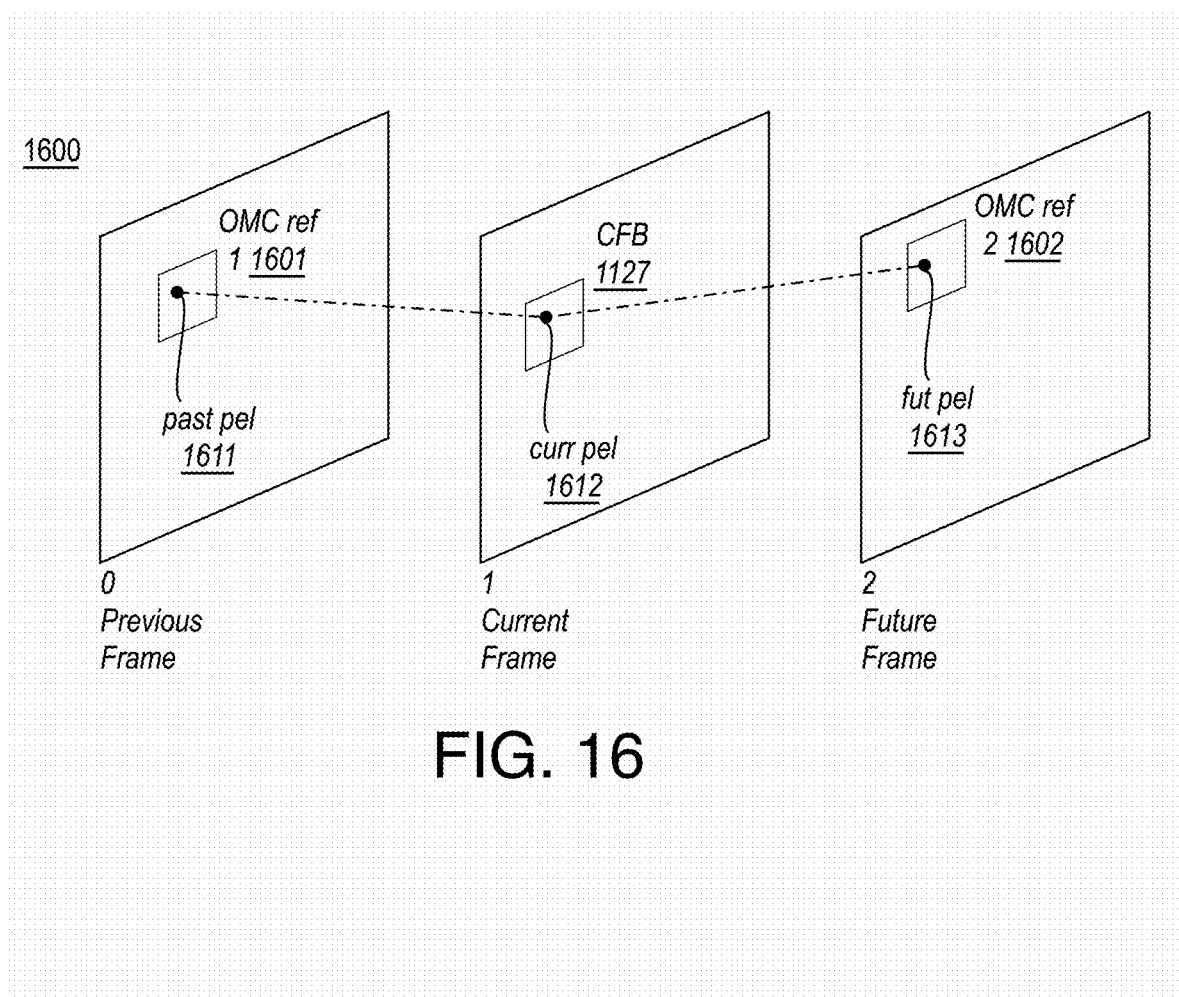
FIG. 16 illustrates example temporal filtering from example blocks.

FIG. 16 illustrates example temporal filtering 1600 from example blocks, arranged in accordance with at least some implementations of the present disclosure. As shown, temporal filtering 1600 (e.g., temporal median filtering) may be performed on a pixel by pixel basis (e.g., for every pixel of the discussed) using each of collocated pixels 1611, 1612, 1613 such that collocated pixels 1611, 1612, 1613 are collocated within their respective blocks. For example, past pixel 1611 (e.g., from a past reference frame, labeled 0 previous frame), current pixel 1612 (e.g., from a current frame, labeled 1 current frame), and future pixel 1613 (e.g., from a future frame, labeled 2 future frame) are collocated within overlapped motion compensated reference block 1 1601, current frame block 1127, and overlapped motion compensated reference block 2 1602, respectively. Such temporal filtering 1600 may be performed using any suitable technique or techniques such as median filtering such that a middle or median value of pixels 1611, 1612, 1613 is provided as the median filter result. In an embodiment, temporal filtering 1600 is performed as discussed with respect to Equation (9).

Discussion now turns to determining merge weights for weighted averaging of the discussed blocks (e.g., weighted averaging of current frame block 1127 and motion compensated overlapped reference blocks 1128, 1129 or weighted averaging of current frame block 1127 and median filtered reference block 1130). For example, the following determination of merge weights may be performed by any, all, or a combination of merge weight calculators 1104, 1105, 1108. The adaptive motion compensated temporal filtering merging discussed herein may adapt a threshold per block to determine which pixels need to be modified. For example, a filter strength (FS), which may be provided as a user or application input may be modulated by the motion vector size of the reference block and texture differences (e.g., Rs and/or Cs difference). Such threshold adaptation provides for a smoother transition between different areas in a picture or frame since the different levels of focus and lightning conditions require more adaptation than provided by non-adaptive thresholding. The adaptive threshold may be determined as follows in Equation (12):

$$TH = \frac{(FS*50)^2}{\sqrt{\frac{MVsize + RsDiff^2 + CsDiff^2}{16}} + 1} \quad (12)$$

where TH is the adaptive threshold, FS is filter strength (e.g., from 1-20), MVsize is the discussed average motion vector size (e.g., average motion vector size 1126) or another measure of motion for the target block such as MV size for MV between the target block and one or both of corresponding motion compensated blocks, RsDiff is the difference between Rs for the target block (e.g., Rs for current frame block 1127) and the Rs of one or both of the average reference blocks (e.g., Rs for one or both of motion compensated overlapped reference blocks 1128, 1129), and CsDiff is the difference between Cs for the target block (e.g., Cs for current frame block 1127) and the Cs of one or both of the average reference blocks (e.g., Cs for one or both of motion compensated overlapped reference blocks 1128, 1129). Such Rs and Cs (e.g., vertical and horizontal texture) values may be determined as discussed herein with respect to Equations (1)-(4), for example.

As an example, for a sample block, if FS=20, RsDiff=1.2272, CsDiff=3.0864, and MVsize=11, the resulting integer value of TH for the block is 175629. Once the threshold TH is calculated, a determination is made as to whether the blocks are similar enough to be merged and/or the technique used to merge the blocks. Such determination(s) may be made using a similarity value. The similarity value may be determined using any suitable technique or techniques. In an embodiment, the similarity value may be determined as shown in Equation (13) as follows:

$$similarityVal = \frac{TH^2 - \left(\sum_{i=0}^{blkheight-1}\sum_{j=0}^{blkwidth-1} abs(Y_{cur}(i,j) - Y_{ref}(i,j))\right)^2}{TH^2 + \left(\sum_{i=0}^{blkheight-1}\sum_{j=0}^{blkwidth-1} abs(Y_{cur}(i,j) - Y_{ref}(i,j))\right)^2} *256 \quad (13)$$

where similarityVal is the similarity value, TH is the adaptive threshold, blkheight and blkwidth are the height and width of the block being evaluated, abs provides an absolute value function, $Y_{cur}$ is the luma value for the pixel location (e.g., provided by i, j) for the current frame block (e.g., current frame block 1127) and $Y_{ref}$ is the luma value for the pixel location in the reference block (e.g., motion compensated overlapped reference blocks 1128, 1129 or median filtered reference block 1130). For example, continuing the above example, a similarityVal may be calculated to be 215 for a first reference block. For a second reference block, assuming FS=20, RsDiff=-3.0552, CsDiff=-10.6848, MVsize=11, a similarity value may be similarly calculated to be 191.

Discussion now turns to determining weighting values or weights for blocks. For example, after calculation of the similarity value for each reference block, merging weight factors may be determined. Such merging weight factors or weights may be determined using any suitable technique or techniques. In an embodiment, merging weight factors or weights may be determined as follows in Equations (14) and (15):

$$l1norm = 256 + 1 + \sum_{i=1}^{numref} similarityVal_i \quad (14)$$

where l1norm is a normalization value, 256 may be a maximum weight value (which may be any suitable value), numref is the number of reference blocks being implemented, and $similarityVal_i$ is the similarity value for the ith reference block (e.g., motion compensated overlapped reference blocks 1128, 1129 or median filtered reference block 1130).

$$wt_i = \frac{similarityVal_i \times 256}{l1norm} \quad (15)$$

where wti is the weight or merging weight factor for the ith reference block (e.g., motion compensated overlapped reference blocks 1128, 1129 or median filtered reference block 1130). For example, wt_cur may refer to the weight for the current (or target) block (e.g., current frame block 1127) and $wt_i$ may refer to weights applied to reference blocks (e.g., motion compensated overlapped reference blocks 1128, 1129 or median filtered reference block 1130) being used for filtering. The value of the weights may be between 0 and 256, $similarityVal_i$ may also be range in the range of 0 to 256, and the value of l1norm may be 257 or above. Continuing the above example, where similarity values for first and second reference blocks were determined to be 215 and 191, weight values for the first and second reference blocks may be determined to be 83 and 73, respectively.

Such merging techniques may be performed for any number of references (e.g., reference blocks). In some embodiments, when the technique for denoising is selected to be temporal median filtering, it may be advantageous to use an even number of references (e.g., reference blocks). Furthermore, when a scene change is detected, the merging weight for the frame in the new scene is set to 0 such that no merging will be performed from that reference.

Discussion now turns to weighted block merging or weighted averaging. In some embodiments, a next operation in the merging process may use the described weights for the pair (or more) of reference blocks to determine a weight or merging weight for the current block. The weight or merging weight for the current block may be generated using any suitable technique or techniques. For example, such weighted block merging or weighted averaging may be performed by weighted average block merger 1109 (please refer to FIG. 11). In an embodiment, the weight or merging weight for the current block may be determined as shown in Equation (16) as follows:

$$\text{wt\_cur} = 256 - \Sigma_{i=1}^{numref} \text{wt}_i \qquad (16)$$

where wt_cur is the weight for the current or target block (e.g., current frame block 1127), 256 is the maximum weight value (which may be any suitable value), numref is the number of reference blocks, and wti is the weight or merging weight factor for the ith reference block (e.g., motion compensated overlapped reference blocks 1128, 1129 or median filtered reference block 1130). For example, the weight or merging weight for the current block may include determining the current weight by differencing a sum of calculated weights from references from 256 (e.g., the maximum weight value) as follows.

The denoised block may (e.g., denoised block 1131 in the context of merging blocks as discussed with respect to weighted average block merger 1109) be determined based on merging or combining the blocks via weighted averaging of the current block (e.g., current frame block 1127) and the reference blocks (e.g., motion compensated overlapped reference blocks 1128, 1129) or of the current block (e.g., current frame block 1127) and a median filtered block (e.g., temporal median filter reference block 1130). The denoised block (e.g., denoised block 1131) may be determined based on merging or combining the blocks via weighted averaging using any suitable technique or techniques. In an embodiment, the denoised block for the current block may be determined as shown in Equation (17) as follows:

$$\text{outputBlk}[\,] = \frac{\text{curBlk}[\,] \times \text{wt\_cur} + \sum_{i=1}^{numref} (\text{refBlk} * \text{wt}_i) + 128}{256} \qquad (17)$$

where outputBlk is the denoised block (e.g., denoised block 1131), curBlk is the current or target block (e.g., current frame block 1127), wt_cur is the weight for the current or target block, numref is the number of reference blocks (e.g., averaged blocks or temporally filtered blocks), refBlk is the reference block(s) (e.g., e.g., motion compensated overlapped reference blocks 1128, 1129 or median filtered reference block 1130), and wti is the weight or merging weight factor for the ith reference block. For example, continuing the example provided above, the weight for the current block may be 256−83−73=100 and the filtered block may be determined as shown in Equation (17). As discussed herein, the output block (e.g., denoised block 1131) may be compared against the original block (e.g., current frame block 1127) using sum of absolute difference (SAD) or the like. If the resulting difference (e.g., SAD) is bigger than a threshold (e.g., 289), the output block (e.g., denoised block 1131) may be discarded and a resulting block from spatial filtering (e.g., an intra filter process) may be used as the filtered output (e.g., denoised block 1131).

Discussion now turns to example spatial filtering. For example, such spatial or intra filtering may be performed by spatial filter 1110 on current frame block 1127 to generate denoised block 1131. In some embodiments, spatial or intra filtering may be based on block variance. For example, a denoised pixel may be the result of the weighted sum of the pixel (e.g., pixel value) itself and neighboring pixels (e.g., pixel values). To determine weights, a dispersion of a surrounding pixels may be determined and applied to determine or generate the coefficients of the filter.

For example, to determine the weights, the average value of 16 pixels for each group of 2 by 2 pixels may be performed for luma values (e.g., a luma layer).

Figures 17, 18:
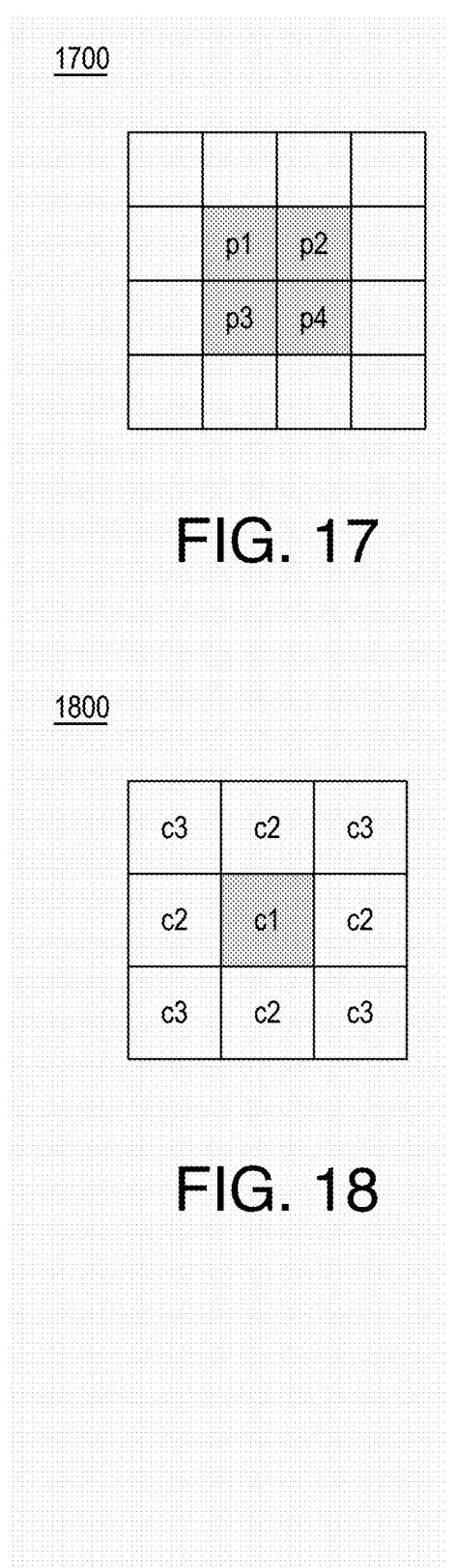

FIG. 17 illustrates example pixels 1700 for the determination of example spatial filtering weights, arranged in accordance with at least some implementations of the present disclosure. As shown in FIG. 17, pixels p1, p2, p3, p4 may share the same average value and the same dispersion value. For example, to determine weights, the average value of pixels 1700 (e.g., 16 pixels) may be determined for each group of 2×2 pixels. In the example of FIG. 17, pixels p1, p2, p3, p4 in a 2×2 group of pixels may share the same average value among all of pixels 1700. For example, FIG. 17 illustrates example 4×4 averaging for 2×2 common pixels.

FIG. 18 illustrates example spatial filtering coefficients 1800, arranged in accordance with at least some implementations of the present disclosure. As show in FIG. 18, spatial filtering coefficients 1800 may include a first coefficient value, c1, at a center location of spatial filtering coefficients 1800, a second coefficient value, c2, at top center, bottom center, center right, and center locations of spatial filtering coefficients 1800, and a third coefficient value, c3, at diagonal locations (e.g., top left, top right, bottom left, and bottom right) of spatial filtering coefficients 1800.

In some embodiments, spatial denoising may be performed as follows. Average and variance values may be determined as shown in Equations (18) and (19) as follows:

$$Y_{avg} = \frac{\sum_{i=0}^{3}\sum_{j=0}^{3} Y_{(i,j)}}{16} \qquad (18)$$

$$\text{variance} = \frac{\sum_{i=0}^{3}\sum_{j=0}^{3} (Y_{(i,j)} - Y_{avg})^2}{16} \qquad (19)$$

where $Y_{avg}$ is the average value for a block of pixels, $Y_{(i,j)}$ is a luma value at frame position (i, j), 16 is the number of pixels in the block size used for averaging (which may be any block size), and variance is the variance for the block of pixels.

Spatial filtering coefficients 1800 (e.g., coefficient values c1, c2, c3) may then be determined as shown in Equations (20) and (21):

$$c1 = \frac{1}{1+4(v1+v2)},\ c2 = \frac{v1}{1+4(v1+v2)}, \qquad (20)$$

$$c3 = \frac{v2}{1+4(v1+v2)}$$

-continued $$v1 = -\frac{variance}{e^{FS*50}}, v2 = -\frac{2*variance}{e^{FS*50}} \quad (21)$$

where c1, c2, c3 are the spatial filtering coefficients, variance is the bock variance as discussed above, and FS is the filter strength.

Coefficients c1, c2 and c3 may then be used as weights to determine each pixel new value. For example, spatial filtering may be applied by the spatial filter illustrated with respect to FIG. 18. Such filtering may be applied to luma values and, for chroma filtering, the same coefficients may be used on collocated chroma pixels to the 2×2 block. For example, in a 4:2:0 color space, one chroma pixel corresponds to a 2×2 luma pixel block. Such intra filtering techniques may allow for the removal of noise in the spatial domain without degradation of image edges or textures.

As discussed, motion compensated temporal filtering techniques may use two reference frames (e.g., one prior to and one subsequent to the current or target frame) such that two reference blocks are generated. Discussion now turns to extending the described techniques to additional reference frames such as four reference frames. Such extension to four reference frames may provide improved filtering at the cost of increased computational costs. For example, temporal denoising may be provided using bidirectional motion estimation with four reference frames.

Figure 19:
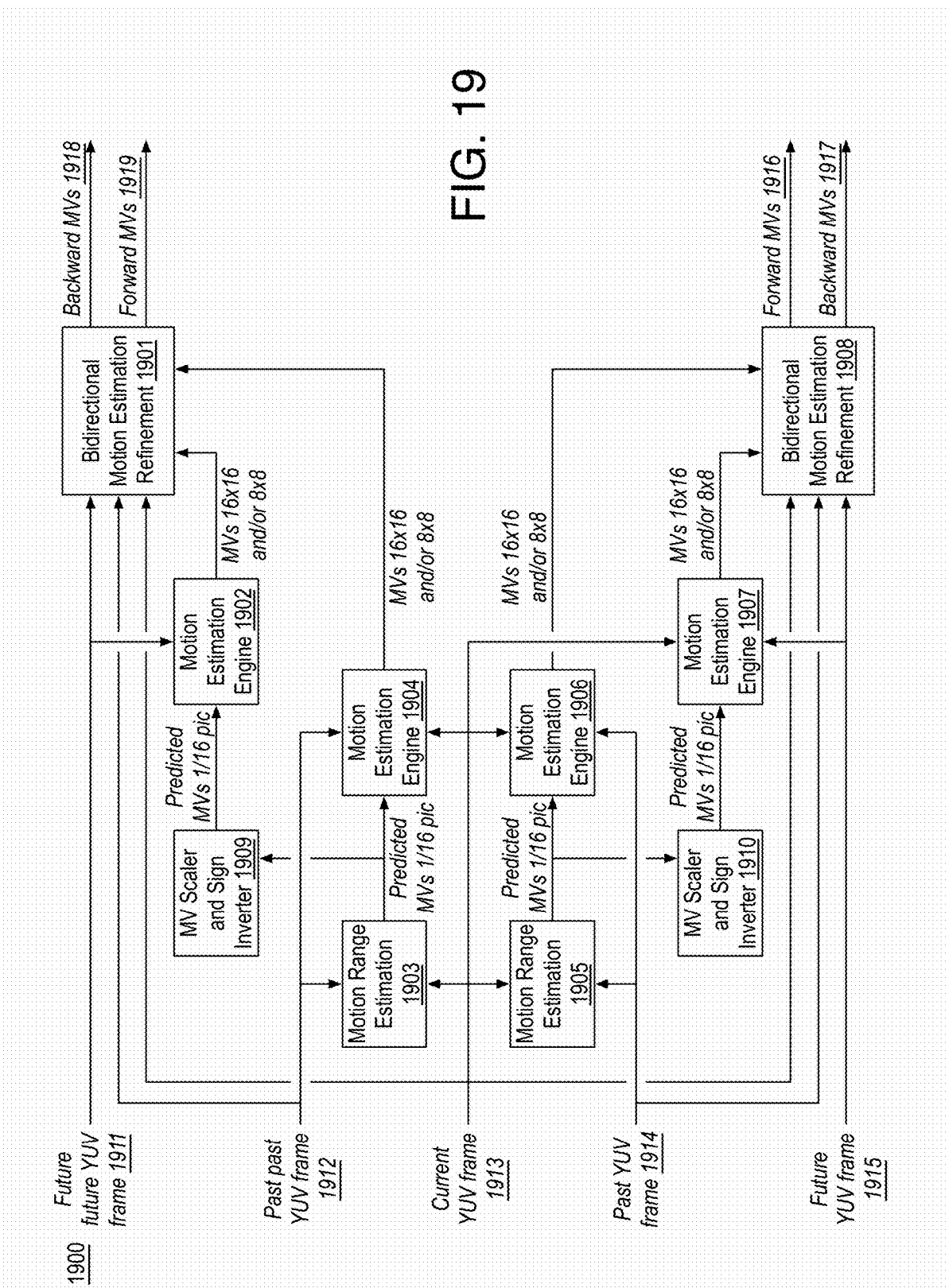
FIG. 19 illustrates an example motion estimation module for bidirectional motion estimation using four reference frames.

FIG. 19 illustrates an example motion estimation module 1900 for bidirectional motion estimation using four reference frames, arranged in accordance with at least some implementations of the present disclosure. As shown, motion estimation module 1900 may include motion range estimation modules 1903, 1905, motion vector scaler and sign invertors 1909, 1910, motion estimation engines 1902, 1904, 1906, 1907, and bidirectional motion estimation refinement modules 1901, 1908. Also as shown, motion estimation module 1900 may receive a current frame 1913, a past frame 1914, a past past frame 1912 (e.g., a frame prior to past frame 1914), a future frame 1915, and a future future frame 1911 (e.g., a frame subsequent to future frame 1915) and motion estimation module 1900 may provide forward motion vectors 1916 (using current frame 1913 and past frame 1914), forward motion vectors 1916 (using current frame 1913 and past past frame 1919), backward motion vectors 1917 (using current frame 1913 and future frame 1915), and backward motion vectors 1918 (using current frame 1913 and future future frame 1911). For example, motion range estimation modules 1903, 1905 may be applied to down sampled frames such as 1/16th size frames or pictures to determine predicted motion vectors. The predicted motion vectors from motion range estimation module 1905 (e.g., between current frame 1913 and past frame 1914) may be provided to motion range estimation modules 1906.

The predicted motion vectors may be provided to motion estimation engine 1906 for the generation of forward motion vectors. For example, motion estimation engine 1906 may generate forward motion vectors (e.g., between current frame 1913 and past frame 1914) or a motion vector field (e.g., 16×16/8×8 motion vectors) using the predicted motion vectors as an initial guess. For backward motion, the forward motion vectors may be inverted in sign and scaled by motion vector scaler and sign inverter 1910. The resulting motion vectors may be provided to motion estimation engine 1907, which may determine the backward direction motion vectors based on a motion search again using the inverted motion vectors as guesses to generate backward motion vectors (e.g., between current frame 1913 and future frame 1915). As shown, the forward and backward motion vectors may be refined by bidirectional motion estimates refinement module 1908. The refined forward motion vectors 1916 and backward motion vectors 1917 may be provided for motion compensation and adaptive filtering as discussed further herein.

Similarly, The predicted motion vectors from motion range estimation module 1903 (e.g., between current frame 1913 and past past frame 1912) may be provided to motion range estimation modules 1904. The predicted motion vectors from motion range estimation module 1903 may be provided to motion estimation engine 1904 for the generation of forward motion vectors. For example, motion estimation engine 1904 may generate forward motion vectors (e.g., between current frame 1913 and past past frame 1912) or a motion vector field (e.g., 16×16/8×8 motion vectors) using the predicted motion vectors as an initial guess. For backward motion, the forward motion vectors may be inverted in sign and scaled by motion vector scaler and sign inverter 1909. The resulting motion vectors may be provided to motion estimation engine 1902, which may determine the backward direction motion vectors based on a motion search again using the inverted motion vectors as guesses to generate backward motion vectors (e.g., between current frame 1913 and future future frame 1911). As shown, the forward and backward motion vectors may be refined by bidirectional motion estimates refinement module 1901. The refined forward motion vectors 1919 and backward motion vectors 1918 may be provided for motion compensation and adaptive filtering as discussed further herein In the discussed example of FIG. 19, motion estimation is performed for 4 reference frames. However, such motion estimation may be extended to more references or fewer may be used.

Figure 20:
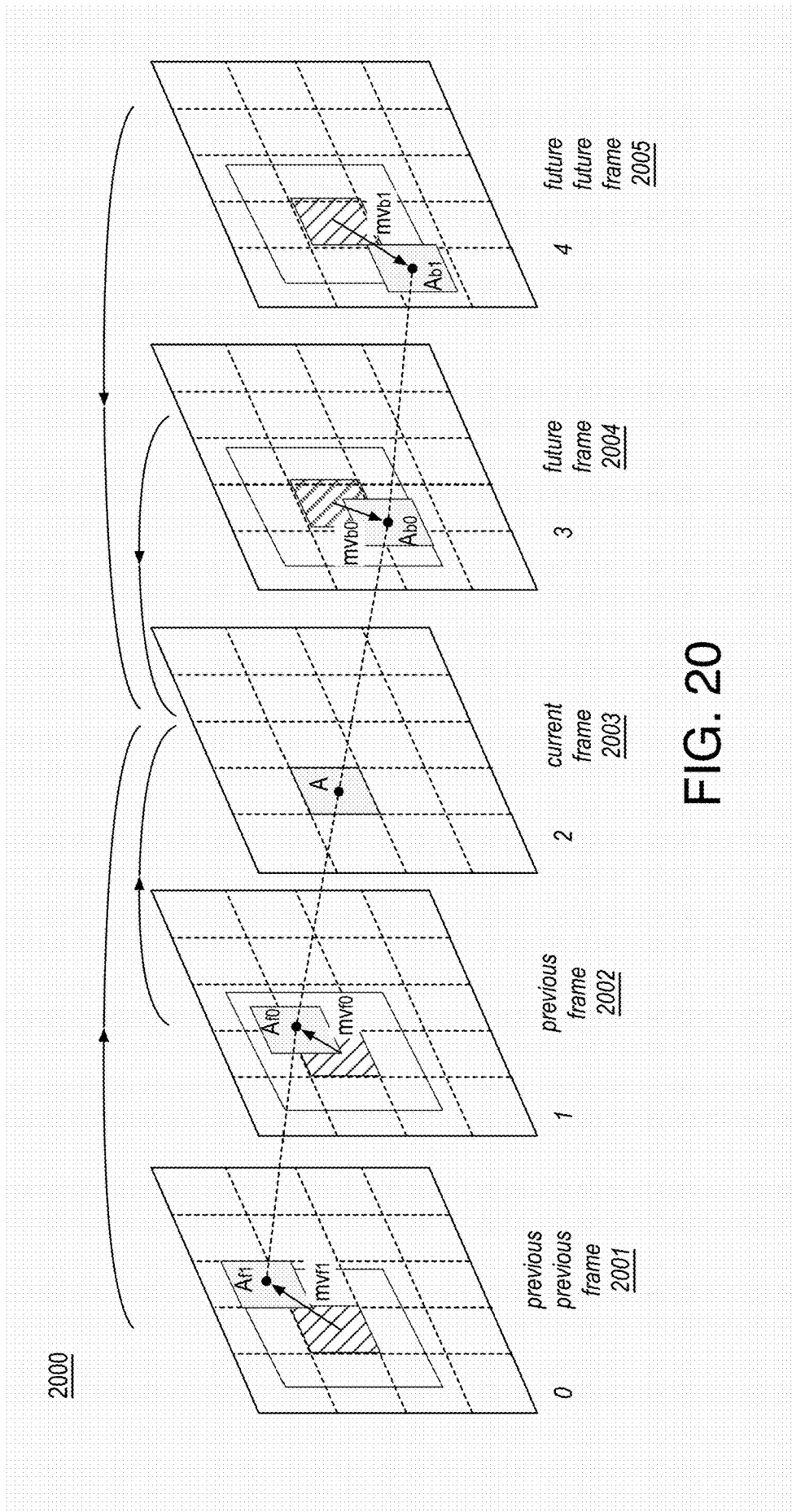
FIG. 20 illustrates example bidirectional motion estimation and compensation for denoising a current block in a current frame using four reference frames.

FIG. 20 illustrates example bidirectional motion estimation and compensation 2000 for denoising a current block in a current frame using four reference frames, arranged in accordance with at least some implementations of the present disclosure. As shown, for a current block A in a current frame 2003 (also labeled as 3), a forward motion vector $mv_{f0}$ may be determined with respect to previous frame 2002 (also labeled 1) such that forward motion vector $mv_{f0}$ references a reference block $A_{f0}$ in previous frame 2002 (which may be characterized as a reference frame; for example, previous frame 2001 may be a previous or past frame as discussed herein). For example, reference block $A_{f0}$ in previous frame 2002 may be a best match with respect to current block A. Furthermore, for current block A in current frame 2003, a forward motion vector $mv_{f1}$ may be determined with respect to previous previous frame 2001 (also labeled 0) such that forward motion vector $mv_{f1}$ references a reference block $A_{f1}$ in previous previous frame 2001 (which may also be characterized as a reference frame; for example, previous previous frame 2001 may be a previous previous or a past past frame as discussed herein). For example, reference block $A_{f1}$ in previous previous frame 2001 may be a best match with respect to current block A.

Similarly, for current block A in current frame 2003, a backward motion vector $mv_{b0}$ may be determined with respect to future frame 2004 (also labeled 3) such that backward motion vector $mv_{b0}$ references a reference block $A_{b0}$ in future frame 2004 (which may be characterized as a reference frame; for example, future frame 2004 may be a future or next frame as discussed herein). For example, reference block $A_{b0}$ in future frame 2004 may be a best match with respect to current block A in future frame 2004. Furthermore, for current block A in current frame 2003, a backward motion vector $mv_{b1}$ may be determined with respect to future future frame 2005 (also labeled 4) such that backward motion vector $mv_{b1}$ references a reference block $A_{b1}$ in future future frame 2005 (which may be characterized as a reference frame; for example, future future frame 2005 may be a future future or next next frame as discussed herein). For example, reference block $A_{b1}$ in future future frame 2005 may be a best match with respect to current block A in future future frame 2005.

Although discussed with respect to previous, previous previous, future, and future future frames, the reference frames may be temporal previous and future frames or encode order previous and future frames or any suitable bidirectional frames with respect to current frame 2003.

Figure 21:
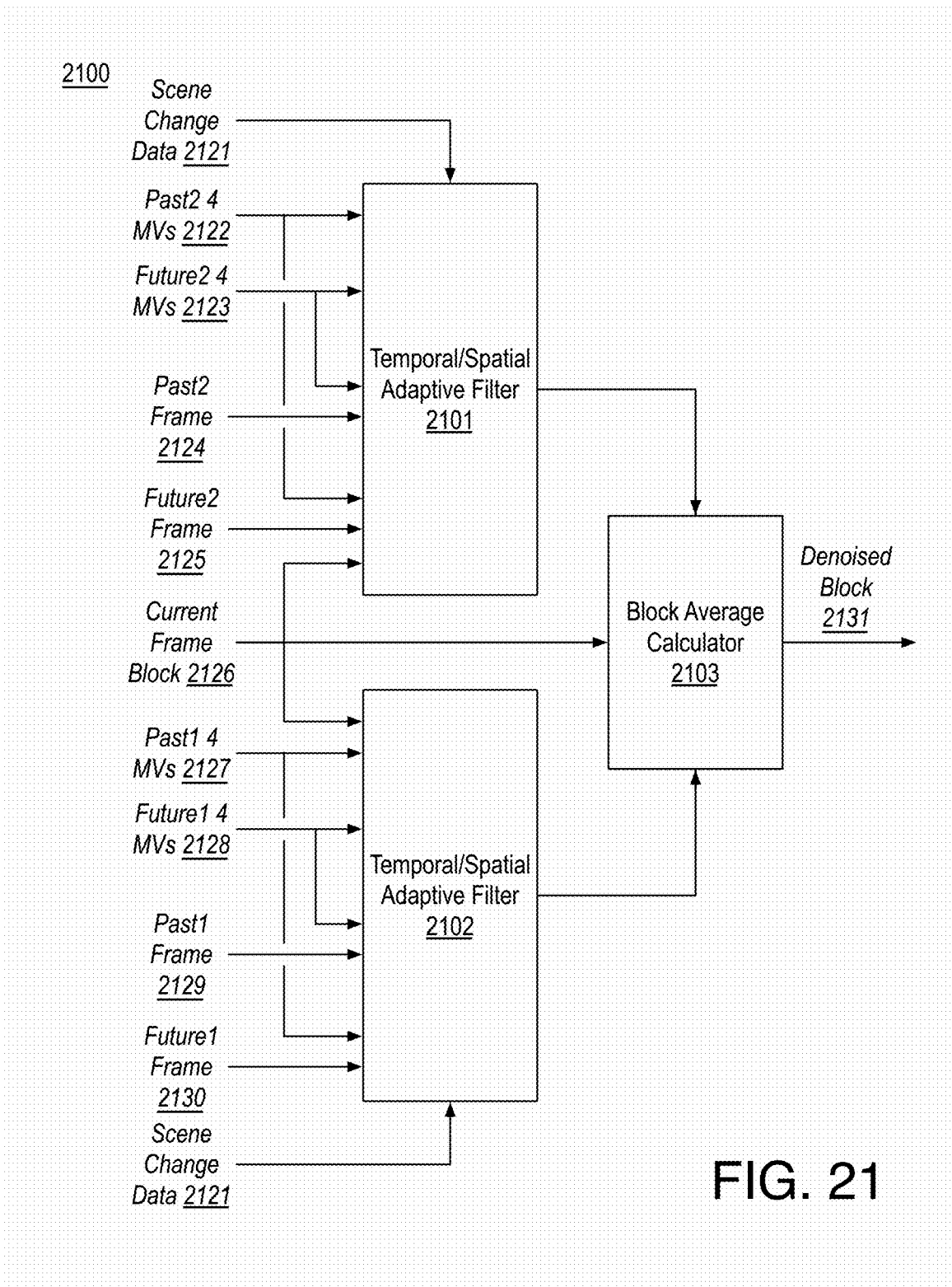
FIG. 21 illustrates a block diagram of an example adaptive motion compensated temporal filtering system.

FIG. 21 illustrates a block diagram of an example adaptive motion compensated temporal filtering system 2100, arranged in accordance with at least some implementations of the present disclosure. As shown, adaptive motion compensated temporal filtering system 2100 may include a temporal/spatial adaptive filter 2101, a temporal/spatial adaptive filter 2102, and a block average calculator 2103. Also as shown, adaptive motion compensated temporal filtering system 2100 may receive scene change data 2121, past2 (indicating a past past frame)) 4 motion vectors 2122, future2 (indicating a future future frame) 4 motion vectors 2123, past2 frame 2124, future2 frame 2125, current frame block 2126, past1 (indicating a past frame) 4 motion vectors 2127, future1 4 motion vectors 2128, past1 (indicating a future frame) frame 2129, and future1 frame 2130, and adaptive motion compensated temporal filtering system 2100 may generate a filtered or denoised block 2131.

For example, temporal/spatial adaptive filter 2101 may include an average motion vector size calculator, OMC block generator(s), and merge weight calculator(s) in analogy to those discussed with respect to FIG. 11. Temporal/spatial adaptive filter 2101 may determine an average motion vector size based on past2 4 motion vectors 2122 and future2 4 motion vectors 2123 (in analogy to average motion vector size 1126), OMC reference blocks (in analogy to OMC reference blocks 1128, 1129), and merge weights for the OMC reference blocks and/or current frame block 2126 based on the motion vectors and frame data corresponding to past past (e.g., past2) and future future (e.g., future2) reference frames. Such processing may be performed as discussed with respect to FIG. 11 and elsewhere herein. Similarly, temporal/spatial adaptive filter 2102 may include an average motion vector size calculator, OMC block generator(s), and merge weight calculator(s). Temporal/spatial adaptive filter 2102 may determine an average motion vector size based on past1 4 motion vectors 2127 and future1 4 motion vectors 2128 (in analogy to average motion vector size 1126), OMC reference blocks (in analogy to OMC reference blocks 1128, 1129), and merge weights for the OMC reference blocks and/or current frame block 2126 based on the motion vectors and frame data corresponding to past (e.g., past1) and future (e.g., future1) reference frames. Thereby, adaptive motion compensated temporal filtering system 2100 may generate four reference blocks (e.g., one each for a past reference frame, a past past reference frame, a future reference frame, and a future future reference frame) as well as weights for such blocks. Furthermore, when spatial filtering is applied, one or both of temporal/spatial adaptive filters 2101, 2102 may generate a spatial or intra filter block corresponding to current frame block 2126.

Block average calculator 2103 may receive such reference blocks and weights from temporal/spatial adaptive filters 2101 and may merge the reference blocks and current frame block 2126 as discussed herein. In some embodiments, the reference blocks and current frame block 2126 may be combined by weighted averaging as discussed herein to generate denoised block 2131. In some embodiments, the reference blocks and current frame block 2126 are pixel wise temporally filtered (e.g., by a median filter) to generate a median filtered block and the median filtered block and current frame block 2126 are weighted averaged to generate denoised block 2131. In some embodiments, denoised block 2131 is provided as a spatially filtered block of current frame block 2126 as discussed herein.

The discussed techniques may also be applied to interlaced video content.

Figure 22:
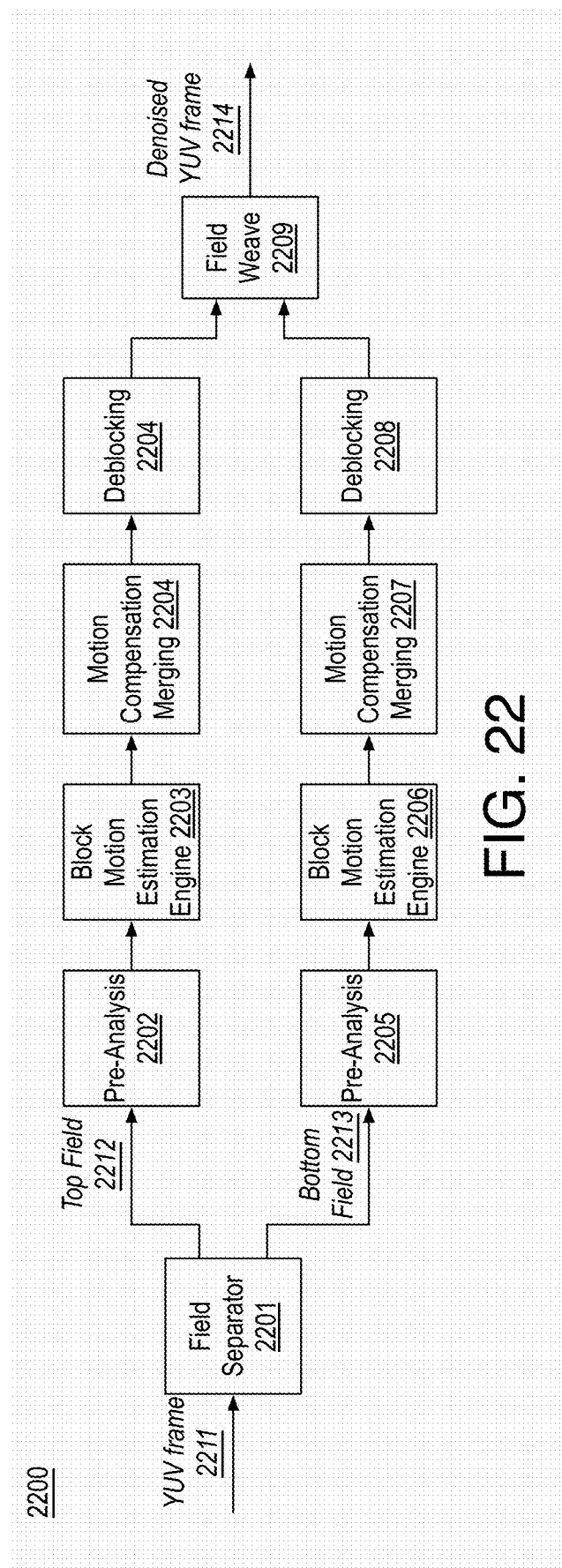
FIG. 22 illustrates a block diagram of an example adaptive motion compensated temporal filtering system.

FIG. 22 illustrates a block diagram of an example adaptive motion compensated temporal filtering system 2200, arranged in accordance with at least some implementations of the present disclosure. As shown, adaptive motion compensated temporal filtering system 2200 may include a field separator 2201, which separates a YUV frame 2211 into a top field 2212 and a bottom field 2213 (which may also be characterized as top and bottom frames). Such separation may be performed using any suitable technique or techniques.

Also as shown, adaptive motion compensated temporal filtering system 2200 may include pre-analyzers 2202, 2205, block motion estimation engines 2203, 2206, motion compensated merging modules 2204, 2207, deblocking modules 2204, 2207, and a field weave module 2209. For example, pre-analyzer 2202, block motion estimation engine 2203, motion compensated merging module 2204, and deblocking module 2204 may operate on top field 2212 in the same manner as pre-analyzer 201, block motion estimation engine 202, motion compensated merging module 203, and deblocking module 204 operate on a YUV frame. Similarly, pre-analyzer 2205, block motion estimation engine 2206, motion compensated merging module 2207, and deblocking module 2208 may operate on bottom field 2213 in the same manner as pre-analyzer 201, block motion estimation engine 202, motion compensated merging module 203, and deblocking module 204 operate on a YUV frame. Such modules of adaptive motion compensated temporal filtering system 2200 may perform any operations or implement any suitable modules as discussed herein. The results of such processing are provided to field weave module 2209, which weaves or merges the resulting top and bottom fields to provide a denoised YUV frame 2214. For example, the adaptive motion compensated temporal filtering techniques discussed herein may process interlaced content such that a video sequence may be separated into its two fields (e.g., top, bottom), which are processed separately. When the filtering for both fields is finished, they may be weaved back again to generate denoised interlaced video content.

Figure 23:
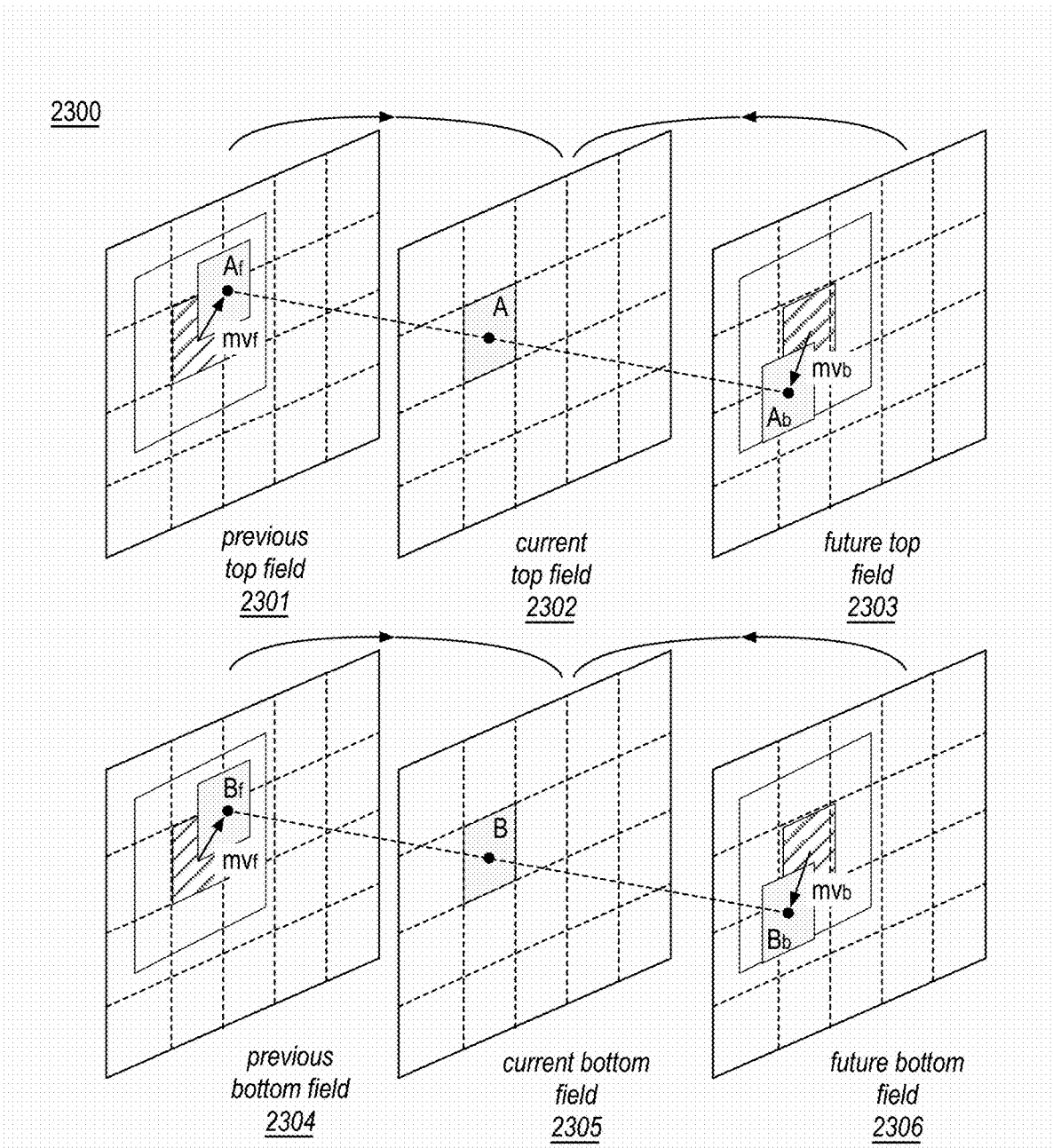
FIG. 23 illustrates example bidirectional motion estimation and compensation for interlaced video content.

FIG. 23 illustrates example bidirectional motion estimation and compensation 2300 for interlaced video content, arranged in accordance with at least some implementations of the present disclosure. As shown, for a current block A in a current top field 2302, a forward motion vector $mv_f$ may be determined with respect to previous top field 2301 such that forward motion vector $mv_f$ references a reference block $A_f$ in previous top field 2301 (which may be characterized as a reference field). Similarly, for current block A in current top field 2302, a backward motion vector $mv_b$ may be determined with respect to future top field 2303 such that backward motion vector $mv_b$ references a reference block $A_b$ in future top field 2303 (which may be characterized as a reference field). Furthermore, for a current block B in a current bottom field 2305, a forward motion vector $mv_f$ may be determined with respect to previous bottom field 2304 such that forward motion vector $mv_f$ references a reference block $B_f$ in previous bottom field 2304 (which may be characterized as a reference field). Similarly, for current block B in current bottom field 2305, a backward motion vector $mv_b$ may be determined with respect to future bottom field 2306 such that backward motion vector $mv_b$ references a reference block Bb in future bottom field 2306 (which may be characterized as a reference field). Although discussed with respect to one previous and one future fields, temporal previous and future fields or encode order previous and future fields in any number may be used.

Figure 24:
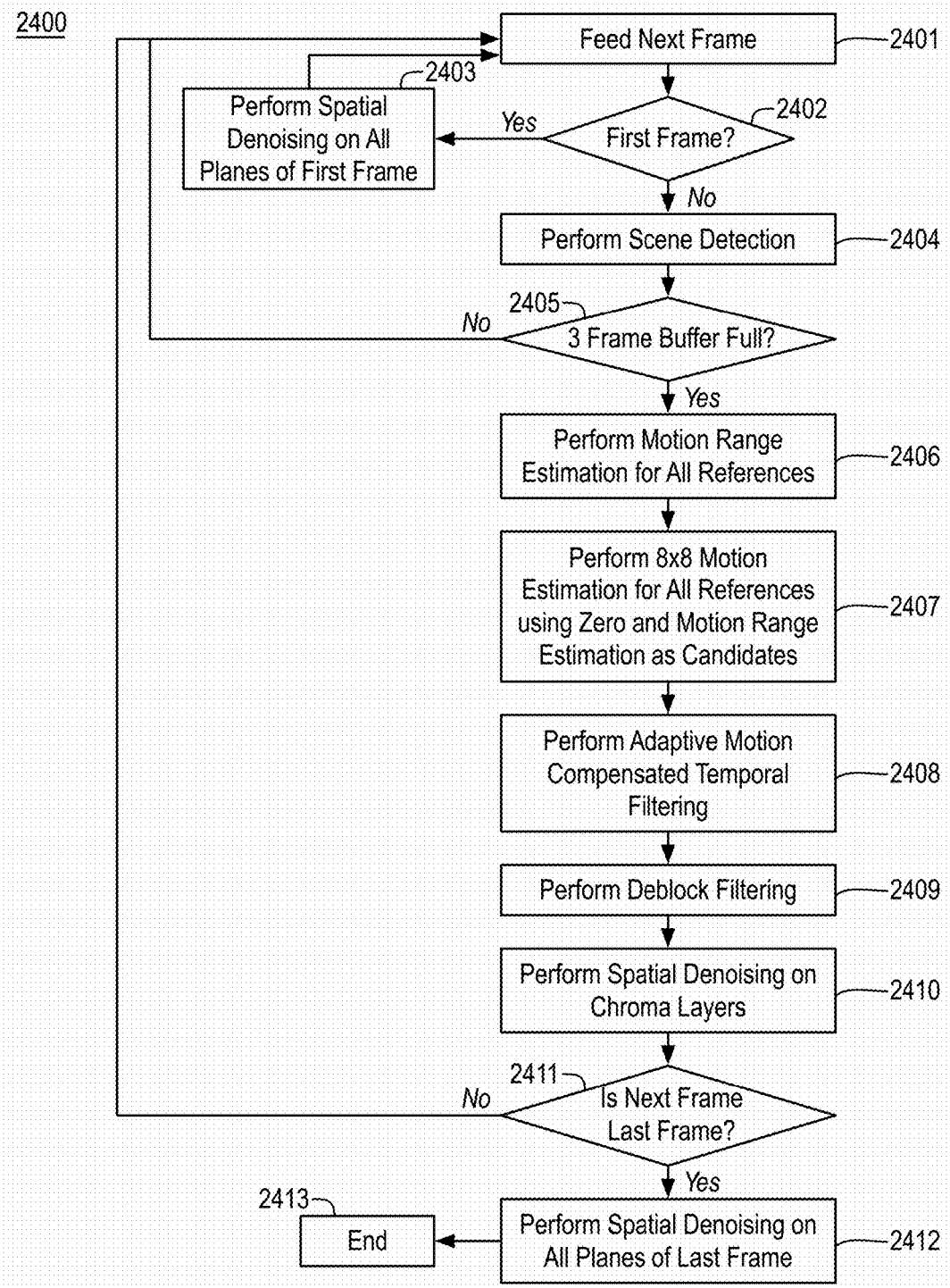
FIG. 24 illustrates an example process for frame processing in adaptive motion compensated temporal filtering.

FIG. 24 illustrates an example process 2400 for frame processing in adaptive motion compensated temporal filtering, arranged in accordance with at least some implementations of the present disclosure. In the illustrated implementation, process 2400 may include one or more operations as illustrated by operations 2401-2413. However, embodiments herein may include additional operations, certain operations being omitted, or operations being performed out of the order provided.

Process 2400 may begin at operation 2401, where a next frame may be provided or fed for processing. At decision operation 2402, a determination may be made as to whether the current frame is a first frame. If so, spatial denoising is performed at operation 2403 (e.g., on all planes such as Y, U, and V planes of the current frame) and processing continues at operation 2401. If not, scene detection may be performed at operation 2404. Processing may continue at operation 2405, where a determination may be made as to whether a three frame buffer is full. If not, processing continues at operation 2401 as discussed. If so, processing may continue at operation 2406, where motion range estimation is performed for all reference frames. Processing may continue at operation 2407, where fine motion estimation (e.g., 8×8 block motion estimation) may be performed for all the reference frames with respect to the current frame using zero motion vectors and the motion range estimates determined at operation 2406 as candidates.

Processing may continue at operation 2408, where adaptive motion compensated temporal filtering may be performed as discussed herein. For example, the block based processing as provided by process 2500 of FIG. 25 may be performed.

Processing may continue at operation 2409, where optional deblock filtering may be performed on the blocks determined at operation 2408 to generate a denoised and deblocked frame. Processing may continue at operation 2410, where spatial denoising may be performed on chroma layers of the current frame. Processing may continue at decision operation 2411, where a determination may be made as to whether the current frame is a last frame. If so, processing may continue at operation 2412, where spatial denoising may be performed on all planes of the last frame. If not, processing may continue at operation 2401 as discussed above.

Figure 25:
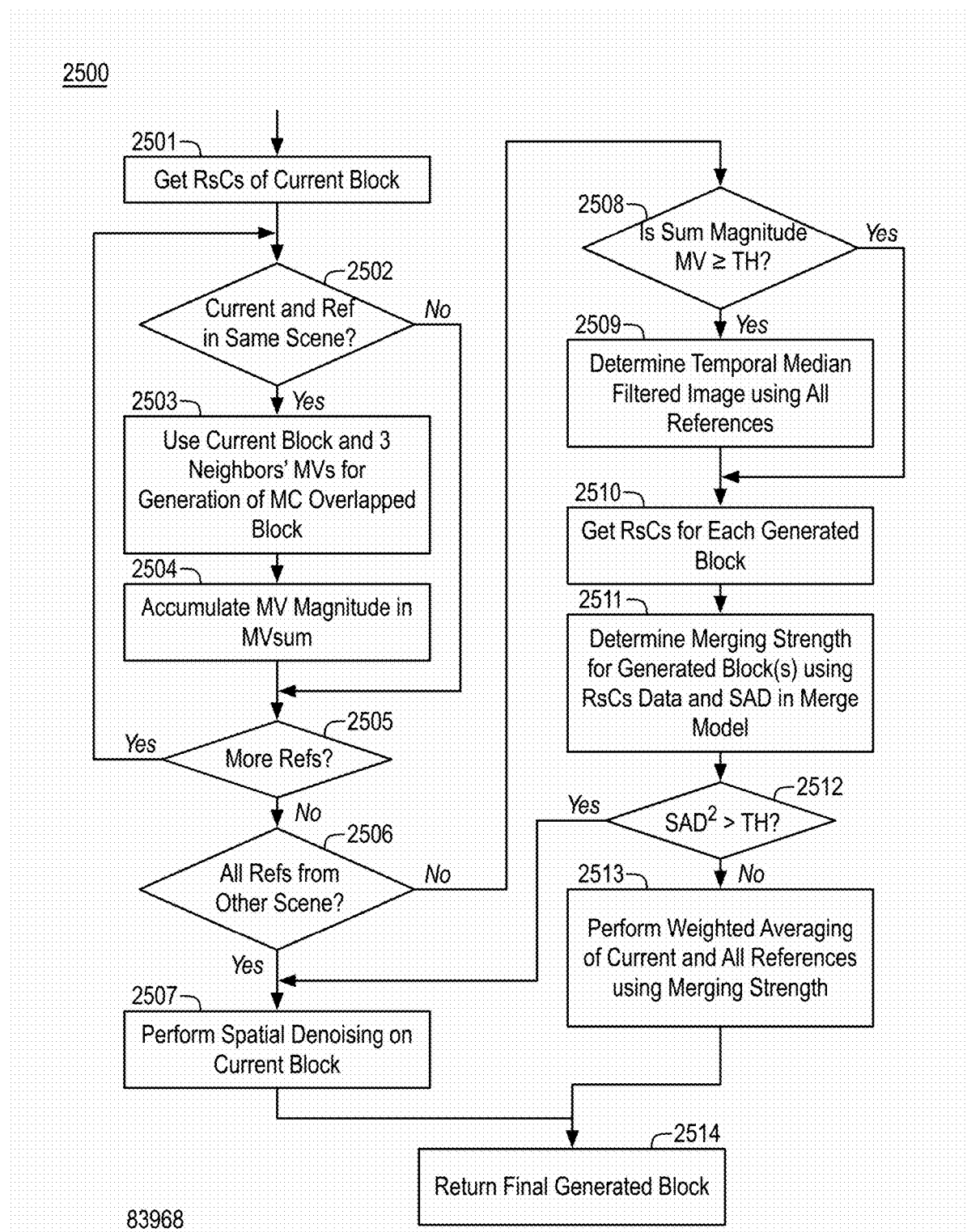
FIG. 25 illustrates an example process for block processing in adaptive motion compensated temporal filtering.

FIG. 25 illustrates an example process 2500 for block processing in adaptive motion compensated temporal filtering, arranged in accordance with at least some implementations of the present disclosure. For example, process 2500 may be performed at operation 2408 of process 2400. In the illustrated implementation, process 2500 may include one or more operations as illustrated by operations 2501-2514. However, embodiments herein may include additional operations, certain operations being omitted, or operations being performed out of the order provided.

Process 2500 may begin at operation 2501, where texture information (Rs, Cs, RsCs) may be determined for the current block. Processing may continue at decision operation 2502, where a determination may be made as to whether the current frame and a reference frame are in the same scene. If not, processing may skip to decision operation 2505 as discussed below. If so, processing may continue at operation 2503, where the current block and three (for example) neighbor's motion vectors (e.g., referencing the reference frame) to generate a motion compensated overlapped block. Such a motion compensated overlapped block may be generated using any suitable technique or techniques. In overlapped motion estimation contexts, the motion compensated overlapped block may use overlapping neighbor blocks to determine overlapping reference blocks, which may be averaged to generate the motion compensated overlapped block. In non-overlapped motion estimation contexts, the motion compensated block for the current block and blocks determined using motion vectors from neighboring blocks as extended to overlap the current block may be averaged to generate the motion compensated overlapped block. In any event, operation 2503 provides a motion compensated overlapped block for the reference frame being evaluated. As shown, processing may continue at operation 2504, where a motion vector magnitude sum may be accumulated as MVsum. In other embodiments, an average motion vector magnitude may be used.

Processing may continue from operation 2504 or decision operation 2502 at decision operation 2505, where a determination may be made as to whether there are any more reference frames to be evaluated. If so, processing may repeat at operations 2502, 2503, 2504 such that a motion compensated overlapped block may be determined for each reference frame. If not, processing may continue at decision operation 2506, where a determination may be made as to whether all references are from another scene. If so, processing may continue at operation 2507 where spatial denoising may be performed for the current block and processing may continue at operation 2514 where the final generated block (e.g., a denoised block) may be returned. If not, processing may continue at decision operation 2508, where a determination may be made as to whether the sum of the motion vector magnitudes (e.g., MVsum) or an average of the motion vector magnitudes is greater than a threshold such as 8 for the sum of the motion vector magnitudes or 3 for the average of the motion vector magnitudes or the like. If so, processing may continue at operation 2509, where a temporal median filtered image (e.g., block) may be determined using the reference blocks from operation 2503 and/or the current block. In either case, processing may continue at operation 2510, where texture information (Rs, Cs, RsCs) may be determined for each block generated (e.g., reference blocks and/or temporal median filtered block). Processing may continue at operation 2511, where merging strength (e.g., merge weights) may be determined for the generated blocks using the texture information and/or differences between the blocks (e.g., SAD). Processing may continue at decision operation 2512, where a determination may be made as to whether a square of the sum of absolute differences between the current block and one or more of the generated blocks is greater than a threshold such as 83,968. If so, processing may continue at operation 2507, where spatial denoising may be performed for the current block and processing may continue at operation 2514 where the final generated block (e.g., a denoised block) may be returned. If not, processing may continue at operation 2513 where weighted averaging of the current block and reference blocks may be performed using the weights generated at operation 2511 to generate a final denoised block and processing may continue at operation 2514, where the denoised block may be returned for deblock processing (please see FIG. 24).

As discussed, the adaptive motion compensated temporal filtering provided herein may be performed in a variety of modes. Table 1 lists example adaptive motion compensated temporal filtering (AMCTF) modes of operation. As shown, such modes may be based on whether only intera (spatial) filtering is applied, whether or not overlap motion estimation is used, whether deblock filtering is applied, the number of reference frames used, and whether subpel accuracy is used. In Table 1, 0 is used to indicate no or off and 1 is used to indicate yes or on.

embodiments, an AMCTF system may receive video content to be filtered and a filtering strength that is externally provided (e.g., selected by user or determined by a video noise measuring system or the like). For example, the AMCTF system may also take as input supplementary parameters (e.g., overlap motion estimation or not, number of references, subpel accuracy or not, and deblocking or not) that may provide a tradeoff between quality that can be afforded and speed performance that is desirable. As discussed herein, while filter strength may be provided to AMCTF filtering system, the filtering thresholds to determine filtering techniques may be modulated based both on video content and the received filter strength. In some embodiments, AMCTF is content format aware and may be used to filter either progressive or interlaced video content. In case of interlaced content, AMCTF may use fields of the same parity for adaptive filtering. The AMCTF system may

TABLE 1

Adaptive Motion Compensated Temporal Filtering (AMCTF) Modes of Operation.

| | Mode | Overlap ME | Deblock | References | SubPel accuracy |
|---|---|---|---|---|---|
| 1 | Only Intra filtering | — | — | 0 | — |
| 2 | One Reference no overlapped motion, no deblocking, integer pel | 0 | 0 | 1 | 0 |
| 3 | One Reference no overlapped motion, no deblocking, quater pel | 0 | 0 | 1 | 1 |
| 4 | One Reference overlapped motion, no deblocking, integer pel | 1 | 0 | 1 | 0 |
| 5 | One Reference overlapped motion, no deblocking, quarter pel | 1 | 0 | 1 | 1 |
| 6 | One Reference no overlapped motion, with deblocking, integer pel | 0 | 1 | 1 | 0 |
| 7 | One Reference no overlapped motion, with deblocking, quarter pel | 0 | 1 | 1 | 1 |
| 8 | One Reference overlapped motion, with deblocking, integer pel | 1 | 1 | 1 | 0 |
| 9 | One Reference overlapped motion, with deblocking, quarter pel | 1 | 1 | 1 | 1 |
| 10 | Two references no overlapped motion, no deblocking, integer pel | 0 | 0 | 2 | 0 |
| 11 | Two references no overlapped motion, no deblocking, quater pel | 0 | 0 | 2 | 1 |
| 12 | Two references overlapped motion, no deblocking, integer pel | 1 | 0 | 2 | 0 |
| 13 | Two references overlapped motion, no deblocking, quarter pel | 1 | 0 | 2 | 1 |
| 14 | Two references no overlapped motion, with deblocking, integer pel | 0 | 1 | 2 | 0 |
| 15 | Two references no overlapped motion, with deblocking, quarter pel | 0 | 1 | 2 | 1 |
| 16 | Two references overlapped motion, with deblocking, integer pel | 1 | 1 | 2 | 0 |
| 17 | Two references overlapped motion, with deblocking, quarter pel | 1 | 1 | 2 | 1 |
| 18 | Four references no overlapped motion, no deblocking, integer pel | 0 | 0 | 4 | 0 |
| 19 | Four references no overlapped motion, no deblocking, quarter pel | 0 | 0 | 4 | 1 |
| 20 | Four references overlapped motion, no deblocking, integer pel | 1 | 0 | 4 | 0 |
| 21 | Four references overlapped motion, no deblocking, quarter pel | 1 | 0 | 4 | 1 |
| 22 | Four references no overlapped motion, with deblocking, integer pel | 0 | 1 | 4 | 0 |
| 23 | Four references no overlapped motion, with deblocking, quarter pel | 0 | 1 | 4 | 1 |
| 24 | Four references overlapped motion, with deblocking, integer pel | 1 | 1 | 4 | 0 |
| 25 | Four references overlapped motion, with deblocking, quarter pel | 1 | 1 | 4 | 1 |

The techniques discussed herein may provide adaptive motion compensated temporal filtering (AMCTF). In some be used as a prefilter that is loosely coupled with encoding (e.g., running ahead of video coding) such that frames are filtered first in normal input order regardless of the order in which they are encoded (e.g., filtering order is unrelated to encoding order). For example, such ordering may be different than input order due to B-frames. In other embodiments the AMCTF system may be used as a prefilter such that the filtering order is tightly coupled to encoding order (e.g. IBBP . . . encoding is different than IPPP . . . encoding order) such that frame buffering requirements may be minimized. In some embodiments, the AMCTF system uses multiple frames for filtering such as 2 other frames (e.g., one immediately before and one immediately after as in bidirectional ME) the frame being filtered. In other embodiments, the AMCTF system uses 4 other frames (e.g., two consecutive frames before and two consecutive frames after also as in bidirectional ME). However, it is not necessary that in the 2 reference case or 4 reference case frames used for filtering be immediately before or after. Instead, the frames do not need to be consecutive. Furthermore, the AMCTF system may use 2 references both in the past or both in the future (e.g., unidirectionally rather than bidirectionally). Furthermore, in the case of tight coupling with encoding, the filtering order of frames (and its associated references) may follow encoding order rather than the input order. The AMCTF system may use either overlapped block or not overlapped block motion estimation, but the AMCTF system always uses overlapped block for motion compensation. For the overlapped motion estimation case, motion estimation may be performed on 16×16 blocks. For nonoverlapped motion estimation case, motion estimation may be performed on 8×8 block basis. As discussed herein, filtered blocks may be generated by mixing and selecting from the best of, for example, three (weighted mixing of motion compensated reference blocks and current reference blocks, weighted mixing of pixel-wise motion compensated temporal median blocks and current reference blocks, and spatially filtered blocks). For example, median filtering may be used for the case of small motion and the need for preserving edge detail, whereas, spatial filtering may be performed for the case of complex/uncompensable motion. Furthermore, the AMCTF system supports optional deblocking. When deblocking is invoked (e.g., when the input content is pre-encoded with medium or low quality), it may be performed either prior to or after motion filtering. If deblocking is performed before encoding, for some computing architectures, it may result in higher complexity but often resulting in filtered content with higher quality. Performing deblocking after encoding can result in lower complexity but filtered video quality may be of lower quality (e.g., slightly blurrier). As discussed, the filtering weights needed to generate mixed blocks may be generated totally based on the content of the block being filtered (e.g., the weights are not predetermined or selected from any predetermined values).

Figure 26:
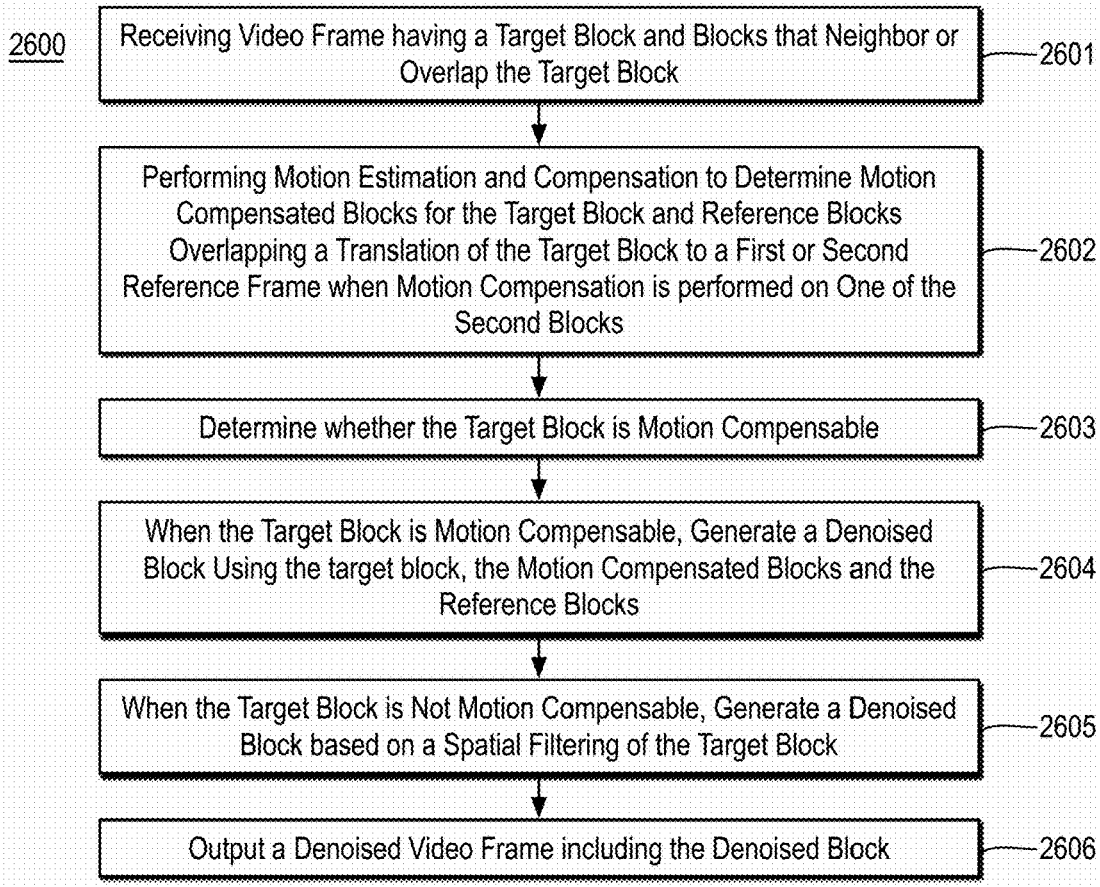
FIG. 26 is a flow diagram illustrating an example process for reducing noise in video.

FIG. 26 is a flow diagram illustrating an example process 2600 for reducing noise in video, arranged in accordance with at least some implementations of the present disclosure. Process 2600 may include one or more operations 2601-2606 as illustrated in FIG. 26. Process 2600 may form at least part of a video denoising process. Furthermore, process 2600 will be described with reference to system 2700 of FIG. 27. For example, process 2600 or portions thereof may be performed by system 2700.

Figure 27:
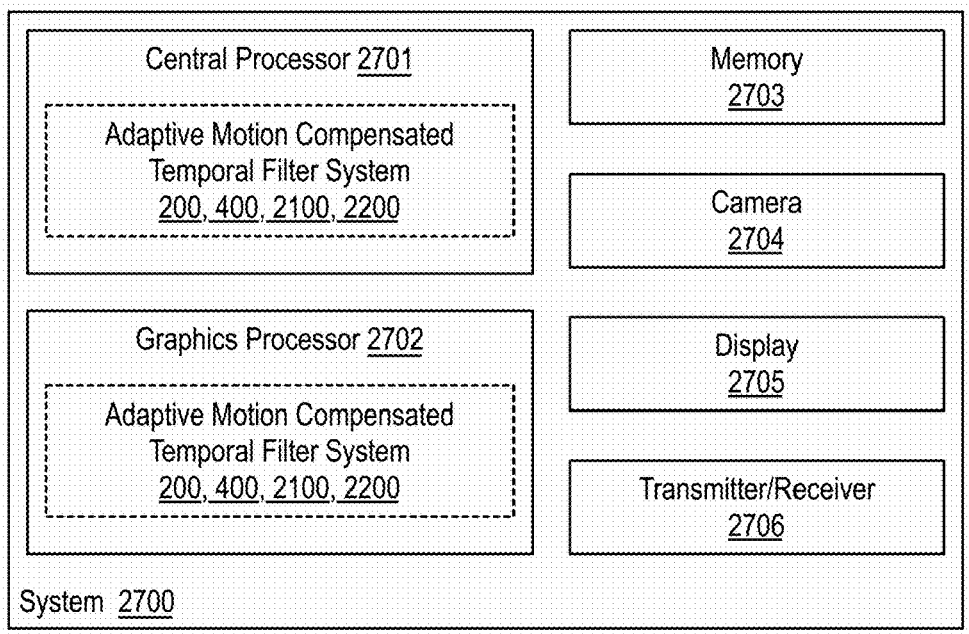
FIG. 27 is an illustrative diagram of an example system for reducing noise in video.

FIG. 27 is an illustrative diagram of an example system 2700 for reducing noise in video, arranged in accordance with at least some implementations of the present disclosure. For example, system 2700 may perform one or more operations discussed with respect to any process or system or any other operations discussed herein. As shown in FIG. 27, system 2700 may include a central processor 2701, a graphics processor 2702, a memory 2703, a camera 2704, a display 2705, and a transmitter/receiver 2706. In some embodiments system 2700 may not include camera 2704, display 2705, and/or transmitter/receiver 2706. As shown, central processor 2701 and/or graphics processor 2702 may implement one or more or combinations of adaptive motion compensated temporal filtering systems 200, 400, 2100, 2200. Adaptive motion compensated temporal filtering systems 200, 400, 2100, 2200 may include any components, systems, or the like as discussed herein or combinations thereof. In the example of system 2700, memory 2703 may store frame data, image data, denoise data, block data, reference block data, or any related data such as any other data discussed herein.

As shown, in some embodiments, one or more or combinations of adaptive motion compensated temporal filtering systems 200, 400, 2100, 2200 may be implemented via central processor 2701. In other embodiments, one or more or combinations of adaptive motion compensated temporal filtering systems 200, 400, 2100, 2200 may be implemented via graphics processor 2702. In yet other embodiments, one or more or combinations of adaptive motion compensated temporal filtering systems 200, 400, 2100, 2200 may be implemented by a video processing unit, a video processing pipeline, or the like. In some embodiments, one or more or combinations of adaptive motion compensated temporal filtering systems 200, 400, 2100, 2200 may be implemented in hardware as a system-on-a-chip (SoC).

Graphics processor 2702 may include any number and type of graphics processing units that may provide the operations as discussed herein. Such operations may be implemented via software or hardware or a combination thereof. For example, graphics processor 2702 may include circuitry dedicated to manipulate and/or analyze images or frames obtained from memory 2703. Central processor 2701 may include any number and type of processing units or modules that may provide control and other high level functions for system 2700 and/or provide any operations as discussed herein. Memory 2703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 2703 may be implemented by cache memory. In an embodiment, one or more or portions of adaptive motion compensated temporal filtering systems 200, 400, 2100, 2200 may be implemented via an execution unit (EU) of graphics processor 2702 or another processor. The EU may include, for example, programmable logic or circuitry such as a logic core or cores that may provide a wide array of programmable logic functions. In an embodiment, one or more or portions of adaptive motion compensated temporal filtering systems 200, 400, 2100, 2200 may be implemented via dedicated hardware such as fixed function circuitry or the like. Fixed function circuitry may include dedicated logic or circuitry and may provide a set of fixed function entry points that may map to the dedicated logic for a fixed purpose or function. Camera 2704 may be any suitable camera or device that may obtain image or frame data for processing as discussed herein. Display 2705 may be any display or device that may present image or frame data. Transmitter/receiver 2706 may include any suitable transmitter and/or receiver that may transmit or receive bitstream data as discussed herein.

System 2700 may implement any devices, systems, modules, units, or the like as discussed herein. Furthermore, system 2700 may implement any processes, operations, or the like as discussed herein. System 2700 may have any suitable form factor. For example, system 2700 may be implemented by a camera, a smartphone, an ultrabook, a tablet, a wearable device, a monitor, a desktop computer, a set top box, or the like.

Returning to discussion of FIG. 26, process 2600 may begin at operation 2601, where a video frame having a target block and two or more second blocks that neighbor or overlap the target block may be received for processing. For example, the video frame received for processing may be any video frame discussed herein in any suitable format such as a YUV format or the like. Furthermore, blocks of the received frame may be processed in any order and/or at least partially in parallel by operations 2602-2606 to generate a denoised block corresponding to each block of the received target frame.

Processing may continue at operation 2602, where motion estimation and compensation may be performed to determine, for the target block, a first motion compensated block from a first reference frame and a second motion compensated block from a second reference frame and to determine, for the target block, a plurality of reference blocks, each reference block comprising a block of the first or second reference frame overlapping a translation of the target block to the first or second reference frame when motion compensation is performed on a corresponding one of the second blocks. For example, the first and second reference frame may be a past (e.g., immediately temporally prior to the video frame) reference frame and a future (e.g., immediately temporally subsequent to the video frame) reference frame. In other examples, the first and second reference frames may be past and future in an encode order. In yet other examples, the first and second reference frames may be both past or both future frames. Furthermore, additional reference frames may be used. In an embodiment, each of the reference blocks includes pixel values of the first or second reference frame overlapped by the target block when the target block is translated to the first or second reference frame by a motion vector of the corresponding one of the second blocks determined by the motion estimation.

The motion estimation of operation 2602 may be performed using any suitable technique or techniques. In an embodiment, the motion estimation is non-overlapping motion estimation. In an embodiment, the motion estimation is non-overlapping motion estimation. In any event, the motion compensation performed at operation 2602 is overlapping motion compensation. In an embodiment, performing motion estimation and compensation at operation 2602 includes performing overlapping motion estimation based on the video frame and the first reference video frame to determine a motion vector between the target block and the first motion compensated block and a second motion vector between one of the second blocks and a motion estimation block of the first reference frame and selecting a portion of the motion estimation block overlapping a translation of the target block to the first reference frame as one of the reference blocks. In an embodiment, performing motion estimation and compensation at operation 2602 includes performing non-overlapping motion estimation based on the video frame and the first reference video frame to determine a first motion vector between the target block and the first motion compensated block and a second motion vector between one of the second blocks and a motion estimation block of the first reference frame and extending the motion estimation block in the first reference frame to overlap overlapping a translation of the target block to the first reference frame and selecting the extended portion of the first reference frame as one of the reference blocks.

Processing may continue at operation 2603, where a determination may be made as to whether the target block is motion compensable based at least on motion between the target block and the first and second motion compensated blocks and comparisons of the target block to the first and second motion compensated blocks. The determination as to whether the target block is motion compensable may be made using any suitable technique or techniques such as any technique discussed herein.

Processing may continue at operation 2604, where, when the target block is motion compensable, a denoised block corresponding to the target block may be generated based on the target block, the first motion compensated block, the second motion compensated blocks, and the reference blocks. The denoised block corresponding to the target block may be generated based on the target block, the first motion compensated block, the second motion compensated blocks, and the reference blocks using any suitable technique or techniques. In an embodiment, generating the denoised block corresponding to the target block based on the target block, the first motion compensated block, the second motion compensated blocks, and the reference blocks includes, when motion between the target block and the first and second motion compensated blocks and between the second blocks and the reference blocks is small motion, performing pixel wise median filtering based on the target block, a first average block of the first motion compensated block and reference blocks from the first reference frame, and a second average block of the second motion compensated block and reference blocks from the second reference frame to generate a median filtered block and determining a weighted average of the target block and the median filtered block to generate the denoised block and, when motion between the target block and the first and second motion compensated blocks and between the second blocks and the reference blocks is not small motion, determining a weighted average of the target block, the first average block, and the second average block.

The determination as to whether motion between the target block and the first and second motion compensated blocks and between the second blocks and the reference blocks is small motion or not small motion may be made using any suitable technique or techniques. In an embodiment, process 2600 further includes averaging magnitudes of motion vectors between the target block and the first motion compensated block, the target block and the second motion compensated block, and the second blocks and the reference blocks to determine an average motion vector size and comparing the average motion vector size to a threshold to determine whether the motion between the target block and the first and second motion compensated blocks and between the second blocks and the reference blocks is small motion or not small motion. For example, when the average motion vector size is greater than the threshold (or compares favorably to the threshold), there is not small motion and, when the average motion vector size is less than the threshold (or compares unfavorably to the threshold), there is small motion.

In an embodiment, generating the denoised block corresponding to the target block comprises a weighted averaging of the target block, a first reference block, and a second reference block and process 2600 further includes determining weights for the weighted averaging by determining an adaptive threshold based on a filter strength, a motion vector size between the target block and the first motion compensated block, and a texture of the target block, generating a similarity value between the target block and a selected one of the first or second reference blocks based at least in part on the adaptive threshold, and determining a weight corresponding to the selected one of the first or second reference blocks based on the similarity value. For example, the adaptive threshold may include a square of the filter strength over a square root of a value comprising the motion vector size, the similarity value ma include a difference between a square of the adaptive threshold and a pixel wise sum of squares of differences between the target block and the selected one of the first or second reference blocks, and/or a weight corresponding to the target block may include a difference between a constant and a sum of the weights of the first and second reference blocks.

Processing may continue at operation 2605, where, when the target block is not motion compensable, the denoised block corresponding to the target block may be generated based on a spatial filtering of the target block. The denoised block corresponding to the target block may be generated based on a spatial filtering of the target block using any suitable technique or techniques.

Processing may continue at operation 2606, where a denoised video frame including the denoised block may be output. For example, operations 2602-2605 may be performed for all blocks of the video frame received at operation 2601 and the resultant denoised blocks may be merged and optionally deblock filtered to generate the denoised video frame. The resultant denoised video frame may be presented to a user via a display, stored in a reference buffer, provided to an encoder for encoding to a bitstream, or the like. As discussed, in some embodiments, the denoised video frame may be deblocked. For example, the denoised frame may be deblock filtered to generate a denoised and deblocked frame. The denoised and deblocked frame may be of presented to a user or encoded to generate a bitstream.

Furthermore, process 2600 may be applied to video frames, as discussed, or to top and/or bottom fields of interlaced video. For example, prior to operation 2601, video frame(s) of interlaced video may be deinterlaced into top and bottom fields. The top and bottom fields may be processed (separately) as discussed and, subsequent to operation 2606, the denoised top and bottom fields may be interlaced to generate denoised interlaced video.

In the context of process 2600, discussion focused on the use of two reference frames. However, any number of reference frames (e.g., one, three, four, six, eight, or more) may be used. In an embodiment, process 2600 further includes determining, for the target block, a third motion compensated block from a third reference frame and a fourth motion compensated block from a fourth reference frame and determining, for the target block, a plurality of second reference blocks, each second reference block comprising a block of the third or fourth reference frame overlapping the target block when motion compensated is performed from a corresponding one of the second blocks such that determining whether the target block is motion compensable and, when the target block is motion compensable, generating the denoised block corresponding to the target block are further based on the third and fourth motion compensated blocks and the second reference blocks and such that the first reference frame is temporally prior to the video frame, the third reference frame is temporally prior to the first reference frame, the second reference frame is temporally subsequent to the video frame, and the fourth reference frame is temporally subsequent to the third reference frame.

Process 2600 may be performed in series or at least partially in parallel for any number of blocks, video frames, video sequences, or the like. Process 2600 may provide improved video denoising.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 28:
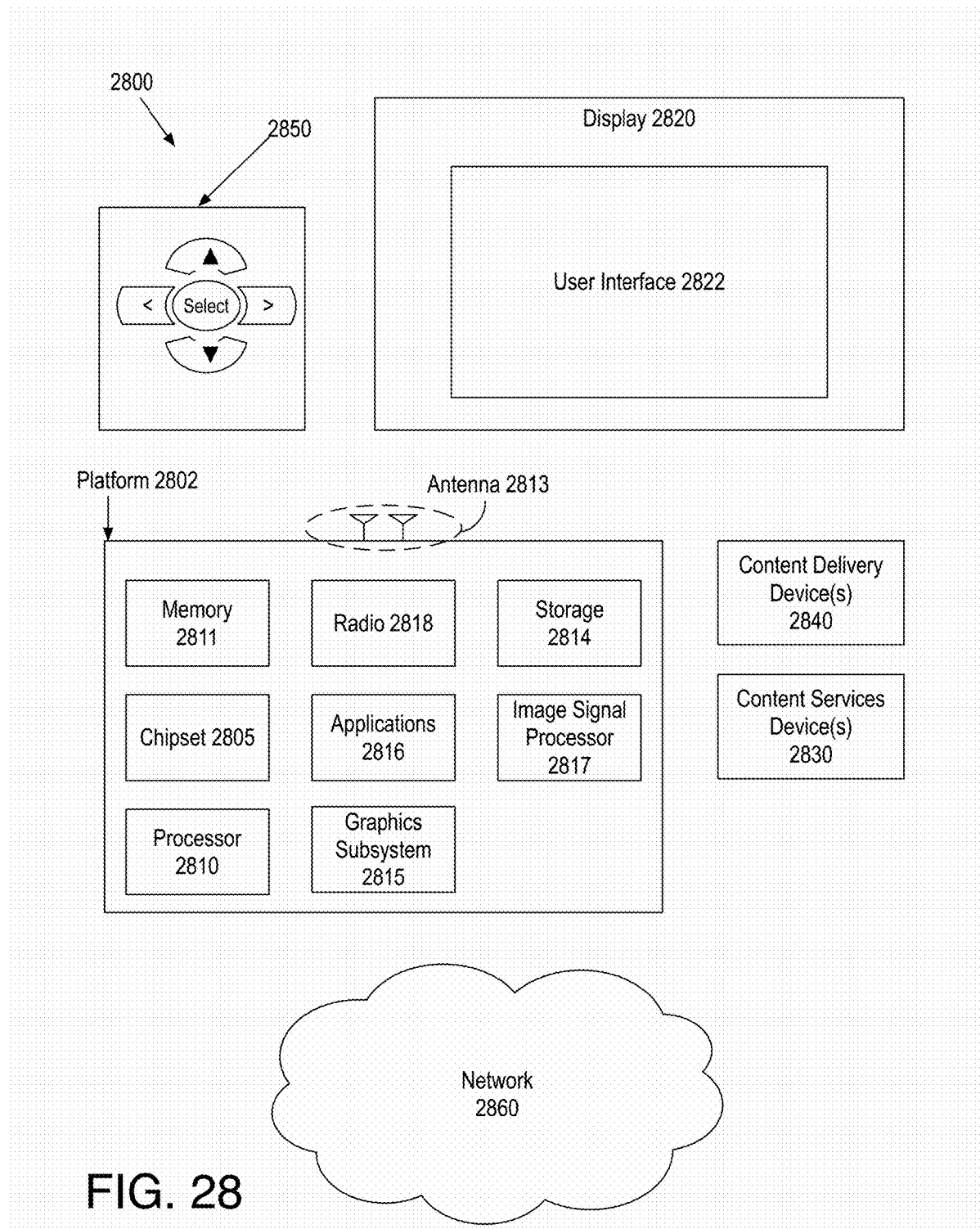
FIG. 28 is an illustrative diagram of an example system.

FIG. 28 is an illustrative diagram of an example system 2800, arranged in accordance with at least some implementations of the present disclosure. In various implementations, system 2800 may be a mobile device system although system 2800 is not limited to this context. For example, system 2800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2800 includes a platform 2802 coupled to a display 2820. Platform 2802 may receive content from a content device such as content services device(s) 2830 or content delivery device(s) 2840 or other content sources such as image sensors 2819. For example, platform 2802 may receive image data as discussed herein from image sensors 2819 or any other content source. A navigation controller 2850 including one or more navigation features may be used to interact with, for example, platform 2802 and/or display 2820. Each of these components is described in greater detail below.

In various implementations, platform 2802 may include any combination of a chipset 2805, processor 2810, memory 2811, antenna 2813, storage 2814, graphics subsystem 2815, applications 2816, image signal processor 2817 and/or radio 2818. Chipset 2805 may provide intercommunication among processor 2810, memory 2811, storage 2814, graphics subsystem 2815, applications 2816, image signal processor 2817 and/or radio 2818. For example, chipset 2805 may include a storage adapter (not depicted) capable of providing intercommunication with storage 2814.

Processor 2810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2810 may be dual-core processor(s), dual-core mobile processor(s), and so forth.

Memory 2811 may be implemented as a volatile memory device such as, but not limited to, a Random Access Memory (RAM), Dynamic Random Access Memory (DRAM), or Static RAM (SRAM).

Storage 2814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2814 may include technology to increase the storage performance enhanced protection for valuable digital media when multiple hard drives are included, for example.

Image signal processor 2817 may be implemented as a specialized digital signal processor or the like used for image processing. In some examples, image signal processor 2817 may be implemented based on a single instruction multiple data or multiple instruction multiple data architecture or the like. In some examples, image signal processor 2817 may be characterized as a media processor. As discussed herein, image signal processor 2817 may be implemented based on a system on a chip architecture and/or based on a multi-core architecture.

Graphics subsystem 2815 may perform processing of images such as still or video for display. Graphics subsystem 2815 may be a graphics processing unit (GPU) or a visual processing unit (VPU), for example. An analog or digital interface may be used to communicatively couple graphics subsystem 2815 and display 2820. For example, the interface may be any of a High-Definition Multimedia Interface, DisplayPort, wireless HDMI, and/or wireless HD compliant techniques. Graphics subsystem 2815 may be integrated into processor 2810 or chipset 2805. In some implementations, graphics subsystem 2815 may be a stand-alone device communicatively coupled to chipset 2805.

The image and/or video processing techniques described herein may be implemented in various hardware architectures. For example, image and/or video functionality may be integrated within a chipset. Alternatively, a discrete graphics and/or video processor may be used. As still another implementation, the image and/or video functions may be provided by a general purpose processor, including a multi-core processor. In further embodiments, the functions may be implemented in a consumer electronics device.

Radio 2818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2818 may operate in accordance with one or more applicable standards in any version.

In various implementations, display 2820 may include any television type monitor or display. Display 2820 may include, for example, a computer display screen, touch screen display, video monitor, television-like device, and/or a television. Display 2820 may be digital and/or analog. In various implementations, display 2820 may be a holographic display. Also, display 2820 may be a transparent surface that may receive a visual projection. Such projections may convey various forms of information, images, and/or objects. For example, such projections may be a visual overlay for a mobile augmented reality (MAR) application. Under the control of one or more software applications 2816, platform 2802 may display user interface 2822 on display 2820.

In various implementations, content services device(s) 2830 may be hosted by any national, international and/or independent service and thus accessible to platform 2802 via the Internet, for example. Content services device(s) 2830 may be coupled to platform 2802 and/or to display 2820. Platform 2802 and/or content services device(s) 2830 may be coupled to a network 2860 to communicate (e.g., send and/or receive) media information to and from network 2860. Content delivery device(s) 2840 also may be coupled to platform 2802 and/or to display 2820.

Image sensors 2819 may include any suitable image sensors that may provide image data based on a scene. For example, image sensors 2819 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 2819 may include any device that may detect information of a scene to generate image data.

In various implementations, content services device(s) 2830 may include a cable television box, personal computer, network, telephone, Internet enabled devices or appliance capable of delivering digital information and/or content, and any other similar device capable of uni-directionally or bi-directionally communicating content between content providers and platform 2802 and/display 2820, via network 2860 or directly. It will be appreciated that the content may be communicated uni-directionally and/or bi-directionally to and from any one of the components in system 2800 and a content provider via network 2860. Examples of content may include any media information including, for example, video, music, medical and gaming information, and so forth.

Content services device(s) 2830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2802 may receive control signals from navigation controller 2850 having one or more navigation features. The navigation features of navigation controller 2850 may be used to interact with user interface 2822, for example. In various embodiments, navigation controller 2850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 2850 may be replicated on a display (e.g., display 2820) by movements of a pointer, cursor, focus ring, or other visual indicators displayed on the display. For example, under the control of software applications 2816, the navigation features located on navigation controller 2850 may be mapped to virtual navigation features displayed on user interface 2822, for example. In various embodiments, navigation controller 2850 may not be a separate component but may be integrated into platform 2802 and/or display 2820. The present disclosure, however, is not limited to the elements or in the context shown or described herein.

In various implementations, drivers (not shown) may include technology to enable users to instantly turn on and off platform 2802 like a television with the touch of a button after initial boot-up, when enabled, for example. Program logic may allow platform 2802 to stream content to media adaptors or other content services device(s) 2830 or content delivery device(s) 2840 even when the platform is turned "off." In addition, chipset 2805 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 2800 may be integrated. For example, platform 2802 and content services device(s) 2830 may be integrated, or platform 2802 and content delivery device(s) 2840 may be integrated, or platform 2802, content services device(s) 2830, and content delivery device(s) 2840 may be integrated, for example. In various embodiments, platform 2802 and display 2820 may be an integrated unit. Display 2820 and content service device(s) 2830 may be integrated, or display 2820 and content delivery device(s) 2840 may be integrated, for example. These examples are not meant to limit the present disclosure.

In various embodiments, system 2800 may be implemented as a wireless system, a wired system, or a combination of both. When implemented as a wireless system, system 2800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 28.

Figure 29:
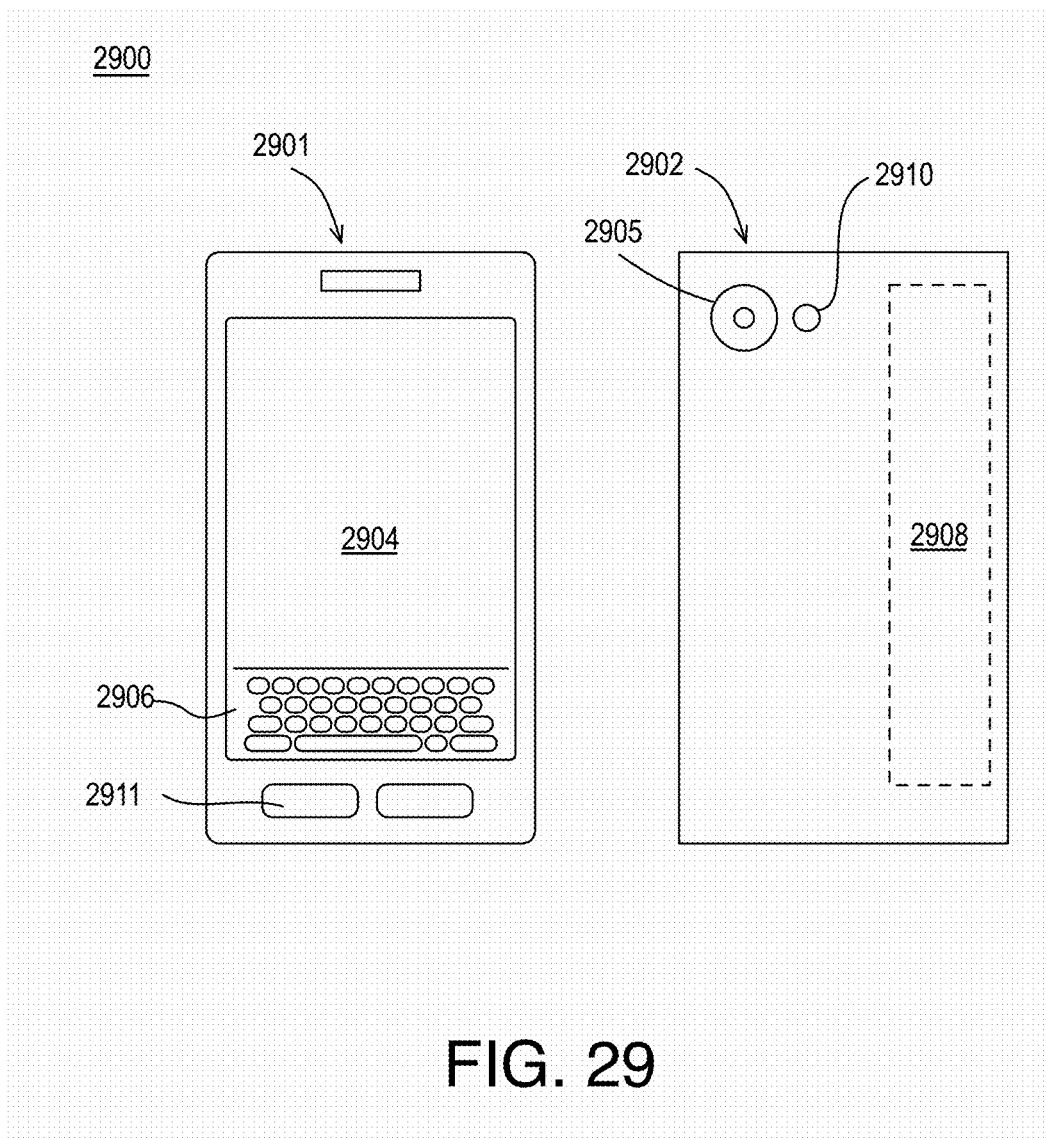
FIG. 29 illustrates an example small form factor device, all arranged in accordance with at least some implementations of the present disclosure.

As described above, system 2800 may be embodied in varying physical styles or form factors. FIG. 29 illustrates an example small form factor device 2900, arranged in accordance with at least some implementations of the present disclosure. In some examples, system 2800 may be implemented via device 2900. In various embodiments, for example, device 2900 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 29, device 2900 may include a housing with a front 2901 and a back 2902. Device 2900 includes a display 2904, an input/output (I/O) device 2906, and an integrated antenna 2908. Device 2900 also may include navigation features 2911. I/O device 2906 may include any suitable I/O device for entering information into a mobile computing device. Examples for I/O device 2906 may include an alphanumeric keyboard, a numeric keypad, a touch pad, input keys, buttons, switches, microphones, speakers, voice recognition device and software, and so forth. Information also may be entered into device 2900 by way of microphone (not shown), or may be digitized by a voice recognition device. As shown, device 2900 may include a camera 2905 (e.g., including a lens, an aperture, and an imaging sensor) and a flash 2910 integrated into back 2902 (or elsewhere) of device 2900. In other examples, camera 2905 and/or flash 2910 may be integrated into front 2901 of device 2900 and/or additional cameras (e.g., such that device 2900 has front and back cameras) may be provided.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer implemented method for reducing noise in video comprises receiving a video frame having a target block and two or more second blocks that neighbor or overlap the target block, performing motion estimation and compensation to determine, for the target block, a first motion compensated block from a first reference frame and a second motion compensated block from a second reference frame and to determine, for the target block, a plurality of reference blocks, each reference block comprising a block of the first or second reference frame overlapping a translation of the target block to the first or second reference frame when motion compensation is performed on a corresponding one of the second blocks, determining whether the target block is motion compensable based at least on motion between the target block and the first and second motion compensated blocks and comparisons of the target block to the first and second motion compensated blocks, when the target block is motion compensable, generating a denoised block corresponding to the target block based on the target block, the first motion compensated block, the second motion compensated blocks, and the reference blocks and when the target block is not motion compensable, generating the denoised block corresponding to the target block based on a spatial filtering of the target block, and outputting a denoised video frame comprising the denoised block.

Further to the first embodiments, each of the reference blocks comprises pixel values of the first or second reference frame overlapped by the target block when the target block is translated to the first or second reference frame by a motion vector of the corresponding one of the second blocks determined by the motion estimation.

Further to the first embodiments, generating the denoised block corresponding to the target block based on the target block, the first motion compensated block, the second motion compensated blocks, and the reference blocks comprises, when motion between the target block and the first and second motion compensated blocks and between the second blocks and the reference blocks is small motion, performing pixel wise median filtering based on the target block, a first average block of the first motion compensated block and reference blocks from the first reference frame, and a second average block of the second motion compensated block and reference blocks from the second reference frame to generate a median filtered block and determining a weighted average of the target block and the median filtered block to generate the denoised block and, when motion between the target block and the first and second motion compensated blocks and between the second blocks and the reference blocks is not small motion, determining a weighted average of the target block, the first average block, and the second average block.

Further to the first embodiments, generating the denoised block corresponding to the target block based on the target block, the first motion compensated block, the second motion compensated blocks, and the reference blocks comprises, when motion between the target block and the first and second motion compensated blocks and between the second blocks and the reference blocks is small motion, performing pixel wise median filtering based on the target block, a first average block of the first motion compensated block and reference blocks from the first reference frame, and a second average block of the second motion compensated block and reference blocks from the second reference frame to generate a median filtered block and determining a weighted average of the target block and the median filtered block to generate the denoised block and, when motion between the target block and the first and second motion compensated blocks and between the second blocks and the reference blocks is not small motion, determining a weighted average of the target block, the first average block, and the second average block, averaging magnitudes of motion vectors between the target block and the first motion compensated block, the target block and the second motion compensated block, and the second blocks and the reference blocks to determine an average motion vector size, and comparing the average motion vector size to a threshold to determine whether the motion between the target block and the first and second motion compensated blocks and between the second blocks and the reference blocks is small motion or not small motion.

Further to the first embodiments, generating the denoised block corresponding to the target block comprises a weighted averaging of the target block, a first reference block, and a second reference block and the method further comprises determining weights for the weighted averaging by determining an adaptive threshold based on a filter strength, a motion vector size between the target block and the first motion compensated block, and a texture of the target block, generating a similarity value between the target block and a selected one of the first or second reference blocks based at least in part on the adaptive threshold, and determining a weight corresponding to the selected one of the first or second reference blocks based on the similarity value.

Further to the first embodiments, generating the denoised block corresponding to the target block comprises a weighted averaging of the target block, a first reference block, and a second reference block and the method further comprises determining weights for the weighted averaging by determining an adaptive threshold based on a filter strength, a motion vector size between the target block and the first motion compensated block, and a texture of the target block, generating a similarity value between the target block and a selected one of the first or second reference blocks based at least in part on the adaptive threshold, and determining a weight corresponding to the selected one of the first or second reference blocks based on the similarity value such that the adaptive threshold comprises a square of the filter strength over a square root of a value comprising the motion vector size.

Further to the first embodiments, generating the denoised block corresponding to the target block comprises a weighted averaging of the target block, a first reference block, and a second reference block and the method further comprises determining weights for the weighted averaging by determining an adaptive threshold based on a filter strength, a motion vector size between the target block and the first motion compensated block, and a texture of the target block, generating a similarity value between the target block and a selected one of the first or second reference blocks based at least in part on the adaptive threshold, and determining a weight corresponding to the selected one of the first or second reference blocks based on the similarity value such that the similarity value comprises a difference between a square of the adaptive threshold and a pixel wise sum of squares of differences between the target block and the selected one of the first or second reference blocks.

Further to the first embodiments, generating the denoised block corresponding to the target block comprises a weighted averaging of the target block, a first reference block, and a second reference block and the method further comprises determining weights for the weighted averaging by determining an adaptive threshold based on a filter strength, a motion vector size between the target block and the first motion compensated block, and a texture of the target block, generating a similarity value between the target block and a selected one of the first or second reference blocks based at least in part on the adaptive threshold, and determining a weight corresponding to the selected one of the first or second reference blocks based on the similarity value such that a weight corresponding to the target block comprises a difference between a constant and a sum of the weights of the first and second reference blocks.

Further to the first embodiments, generating the denoised block corresponding to the target block comprises a weighted averaging of the target block, a first reference block, and a second reference block and the method further comprises determining weights for the weighted averaging by determining an adaptive threshold based on a filter strength, a motion vector size between the target block and the first motion compensated block, and a texture of the target block, generating a similarity value between the target block and a selected one of the first or second reference blocks based at least in part on the adaptive threshold, and determining a weight corresponding to the selected one of the first or second reference blocks based on the similarity value such that the adaptive threshold comprises a square of the filter strength over a square root of a value comprising the motion vector size, the similarity value comprises a difference between a square of the adaptive threshold and a pixel wise sum of squares of differences between the target block and the selected one of the first or second reference blocks, and/or a weight corresponding to the target block comprises a difference between a constant and a sum of the weights of the first and second reference blocks.

Further to the first embodiments, performing motion estimation and compensation comprises performing overlapping motion estimation based on the video frame and the first reference video frame to determine a motion vector between the target block and the first motion compensated block and a second motion vector between one of the second blocks and a motion estimation block of the first reference frame and selecting a portion of the motion estimation block overlapping a translation of the target block to the first reference frame as one of the reference blocks.

Further to the first embodiments, performing motion estimation and compensation comprises performing non-overlapping motion estimation based on the video frame and the first reference video frame to determine a first motion vector between the target block and the first motion compensated block and a second motion vector between one of the second blocks and a motion estimation block of the first reference frame and extending the motion estimation block in the first reference frame to overlap overlapping a translation of the target block to the first reference frame and selecting the extended portion of the first reference frame as one of the reference blocks.

Further to the first embodiments, the method further comprises determining, for the target block, a third motion compensated block from a third reference frame and a fourth motion compensated block from a fourth reference frame and determining, for the target block, a plurality of second reference blocks, each second reference block comprising a block of the third or fourth reference frame overlapping the target block when motion compensated is performed from a corresponding one of the second blocks such that determining whether the target block is motion compensable and, when the target block is motion compensable, generating the denoised block corresponding to the target block are further based on the third and fourth motion compensated blocks and the second reference blocks and such that the first reference frame is temporally prior to the video frame, the third reference frame is temporally prior to the first reference frame, the second reference frame is temporally subsequent to the video frame, and the fourth reference frame is temporally subsequent to the third reference frame.

Further to the first embodiments, the method further comprises deblock filtering the denoised frame to generate a denoised and deblocked frame and at least one of presenting the denoised and deblocked frame to a user or encoding the denoised and deblocked frame to generate a bitstream.

Further to the first embodiments, the video frame and the reference frame are top or bottom fields of an interlaced video frame.

In one or more second embodiments, a system for reducing noise in video comprises a memory configured to store a video frame having a target block and two or more second blocks that neighbor or overlap the target block and a processor coupled to the memory, the processor to perform motion estimation and compensation to determine, for the target block, a first motion compensated block from a first reference frame and a second motion compensated block from a second reference frame and to determine, for the target block, a plurality of reference blocks, each reference block comprising a block of the first or second reference frame overlapping a translation of the target block to the first or second reference frame when motion compensation is performed on a corresponding one of the second blocks, to determine whether the target block is motion compensable based at least on motion between the target block and the first and second motion compensated blocks and comparisons of the target block to the first and second motion compensated blocks, to, when the target block is motion compensable, generate a denoised block corresponding to the target block based on the target block, the first motion compensated block, the second motion compensated blocks, and the reference blocks and to, when the target block is not motion compensable, generate the denoised block corresponding to the target block based on a spatial filtering of the target block, and to output a denoised video frame comprising the denoised block.

Further to the second embodiments, each of the reference blocks comprises pixel values of the first or second reference frame overlapped by the target block when the target block is translated to the first or second reference frame by a motion vector of the corresponding one of the second blocks determined by the motion estimation.

Further to the second embodiments, the processor to generate the denoised block corresponding to the target block based on the target block, the first motion compensated block, the second motion compensated blocks, and the reference blocks comprises the processor to, when motion between the target block and the first and second motion compensated blocks and between the second blocks and the reference blocks is small motion, perform pixel wise median filtering based on the target block, a first average block of the first motion compensated block and reference blocks from the first reference frame, and a second average block of the second motion compensated block and reference blocks from the second reference frame to generate a median filtered block and determine a weighted average of the target block and the median filtered block to generate the denoised block and, when motion between the target block and the first and second motion compensated blocks and between the second blocks and the reference blocks is not small motion, determine a weighted average of the target block, the first average block, and the second average block.

Further to the second embodiments, the processor to generate the denoised block corresponding to the target block based on the target block, the first motion compensated block, the second motion compensated blocks, and the reference blocks comprises the processor to, when motion between the target block and the first and second motion compensated blocks and between the second blocks and the reference blocks is small motion, perform pixel wise median filtering based on the target block, a first average block of the first motion compensated block and reference blocks from the first reference frame, and a second average block of the second motion compensated block and reference blocks from the second reference frame to generate a median filtered block and determine a weighted average of the target block and the median filtered block to generate the denoised block and, when motion between the target block and the first and second motion compensated blocks and between the second blocks and the reference blocks is not small motion, determine a weighted average of the target block, the first average block, and the second average block, and the processor is further to average magnitudes of motion vectors between the target block and the first motion compensated block, the target block and the second motion compensated block, and the second blocks and the reference blocks to determine an average motion vector size and compare the average motion vector size to a threshold to determine whether the motion between the target block and the first and second motion compensated blocks and between the second blocks and the reference blocks is small motion or not small motion.

Further to the second embodiments, the processor to generate the denoised block corresponding to the target block comprises the processor to weighted average the target block, a first reference block, and a second reference block and the processor to determine weights for the weighted averaging comprises the processor to determine an adaptive threshold based on a filter strength, a motion vector size between the target block and the first motion compensated block, and a texture of the target block, generate a similarity value between the target block and a selected one of the first or second reference blocks based at least in part on the adaptive threshold, and determine a weight corresponding to the selected one of the first or second reference blocks based on the similarity value.

Further to the second embodiments, the processor to generate the denoised block corresponding to the target block comprises the processor to weighted average the target block, a first reference block, and a second reference block and the processor to determine weights for the weighted averaging comprises the processor to determine an adaptive threshold based on a filter strength, a motion vector size between the target block and the first motion compensated block, and a texture of the target block, generate a similarity value between the target block and a selected one of the first or second reference blocks based at least in part on the adaptive threshold, and determine a weight corresponding to the selected one of the first or second reference blocks based on the similarity value such that the adaptive threshold comprises a square of the filter strength over a square root of a value comprising the motion vector size, the similarity value comprises a difference between a square of the adaptive threshold and a pixel wise sum of squares of differences between the target block and the selected one of the first or second reference blocks, or a weight corresponding to the target block comprises a difference between a constant and a sum of the weights of the first and second reference blocks.

Further to the second embodiments, the processor to perform motion estimation and compensation comprises the processor to perform overlapping motion estimation based on the video frame and the first reference video frame to determine a motion vector between the target block and the first motion compensated block and a second motion vector between one of the second blocks and a motion estimation block of the first reference frame and to select a portion of the motion estimation block overlapping a translation of the target block to the first reference frame as one of the reference blocks.

Further to the second embodiments, the processor to perform motion estimation and compensation comprises the processor to perform non-overlapping motion estimation based on the video frame and the first reference video frame to determine a first motion vector between the target block and the first motion compensated block and a second motion vector between one of the second blocks and a motion estimation block of the first reference frame and to extend the motion estimation block in the first reference frame to overlap overlapping a translation of the target block to the first reference frame and select the extended portion of the first reference frame as one of the reference blocks.

Further to the second embodiments, the processor is further to determine, for the target block, a third motion compensated block from a third reference frame and a fourth motion compensated block from a fourth reference frame and to determine, for the target block, a plurality of second reference blocks, each second reference block comprising a block of the third or fourth reference frame overlapping the target block when motion compensated is performed from a corresponding one of the second blocks, wherein to determine whether the target block is motion compensable and, when the target block is motion compensable, to generate the denoised block corresponding to the target block are further based on the third and fourth motion compensated blocks and the second reference blocks, and wherein the first reference frame is temporally prior to the video frame, the third reference frame is temporally prior to the first reference frame, the second reference frame is temporally subsequent to the video frame, and the fourth reference frame is temporally subsequent to the third reference frame.

Further to the second embodiments, the processor is further to deblock filter the denoised frame to generate a denoised and deblocked frame and to present the denoised and deblocked frame to a user or encode the denoised and deblocked frame to generate a bitstream.

Further to the second embodiments, the video frame and the reference frame are top or bottom fields of an interlaced video frame.

In one or more third embodiments, a system comprises means for receiving a video frame having a target block and two or more second blocks that neighbor or overlap the target block, means for performing motion estimation and compensation to determine, for the target block, a first motion compensated block from a first reference frame and a second motion compensated block from a second reference frame and to determine, for the target block, a plurality of reference blocks, each reference block comprising a block of the first or second reference frame overlapping a translation of the target block to the first or second reference frame when motion compensation is performed on a corresponding one of the second blocks, means for determining whether the target block is motion compensable based at least on motion between the target block and the first and second motion compensated blocks and comparisons of the target block to the first and second motion compensated blocks, means for generating, when the target block is motion compensable, a denoised block corresponding to the target block based on the target block, the first motion compensated block, the second motion compensated blocks, and the reference blocks and means for generating, when the target block is not motion compensable, the denoised block corresponding to the target block based on a spatial filtering of the target block, and means for outputting a denoised video frame comprising the denoised block.

Further to the third embodiments, each of the reference blocks comprises pixel values of the first or second reference frame overlapped by the target block when the target block is translated to the first or second reference frame by a motion vector of the corresponding one of the second blocks determined by the motion estimation.

Further to the third embodiments, the means for generating the denoised block corresponding to the target block based on the target block, the first motion compensated block, the second motion compensated blocks, and the reference blocks comprise means for performing, when motion between the target block and the first and second motion compensated blocks and between the second blocks and the reference blocks is small motion, pixel wise median filtering based on the target block, a first average block of the first motion compensated block and reference blocks from the first reference frame, and a second average block of the second motion compensated block and reference blocks from the second reference frame to generate a median filtered block and means for determining a weighted average of the target block and the median filtered block to generate the denoised block and means for determining, when motion between the target block and the first and second motion compensated blocks and between the second blocks and the reference blocks is not small motion, a weighted average of the target block, the first average block, and the second average block.

Further to the third embodiments, the means for generating the denoised block corresponding to the target block based on the target block, the first motion compensated block, the second motion compensated blocks, and the reference blocks comprise means for performing, when motion between the target block and the first and second motion compensated blocks and between the second blocks and the reference blocks is small motion, pixel wise median filtering based on the target block, a first average block of the first motion compensated block and reference blocks from the first reference frame, and a second average block of the second motion compensated block and reference blocks from the second reference frame to generate a median filtered block and means for determining a weighted average of the target block and the median filtered block to generate the denoised block and means for determining, when motion between the target block and the first and second motion compensated blocks and between the second blocks and the reference blocks is not small motion, a weighted average of the target block, the first average block, and the second average block and the system further comprises means for averaging magnitudes of motion vectors between the target block and the first motion compensated block, the target block and the second motion compensated block, and the second blocks and the reference blocks to determine an average motion vector size and means for comparing the average motion vector size to a threshold to determine whether the motion between the target block and the first and second motion compensated blocks and between the second blocks and the reference blocks is small motion or not small motion.

Further to the third embodiments, the means for generating the denoised block corresponding to the target block comprise means for determining a weighted averaging of the target block, a first reference block, and a second reference block and the system further comprises means for determining weights for the weighted averaging by determining an adaptive threshold based on a filter strength, a motion vector size between the target block and the first motion compensated block, and a texture of the target block, generating a similarity value between the target block and a selected one of the first or second reference blocks based at least in part on the adaptive threshold, and determining a weight corresponding to the selected one of the first or second reference blocks based on the similarity value.

Further to the third embodiments, the means for generating the denoised block corresponding to the target block comprise means for determining a weighted averaging of the target block, a first reference block, and a second reference block and the system further comprises means for determining weights for the weighted averaging by determining an adaptive threshold based on a filter strength, a motion vector size between the target block and the first motion compensated block, and a texture of the target block, generating a similarity value between the target block and a selected one of the first or second reference blocks based at least in part on the adaptive threshold, and determining a weight corresponding to the selected one of the first or second reference blocks based on the similarity value such that the adaptive threshold comprises a square of the filter strength over a square root of a value comprising the motion vector size, the similarity value comprises a difference between a square of the adaptive threshold and a pixel wise sum of squares of differences between the target block and the selected one of the first or second reference blocks, or a weight corresponding to the target block comprises a difference between a constant and a sum of the weights of the first and second reference blocks.

In one or more fourth embodiments, at least one machine readable medium comprises a plurality of instructions that, in response to being executed on a device, cause the device to reduce noise in video by receiving a video frame having a target block and two or more second blocks that neighbor or overlap the target block, performing motion estimation and compensation to determine, for the target block, a first motion compensated block from a first reference frame and a second motion compensated block from a second reference frame and to determine, for the target block, a plurality of reference blocks, each reference block comprising a block of the first or second reference frame overlapping a translation of the target block to the first or second reference frame when motion compensation is performed on a corresponding one of the second blocks, determining whether the target block is motion compensable based at least on motion between the target block and the first and second motion compensated blocks and comparisons of the target block to the first and second motion compensated blocks, when the target block is motion compensable, generating a denoised block corresponding to the target block based on the target block, the first motion compensated block, the second motion compensated blocks, and the reference blocks and when the target block is not motion compensable, generating the denoised block corresponding to the target block based on a spatial filtering of the target block, and outputting a denoised video frame comprising the denoised block.

Further to the fourth embodiments, each of the reference blocks comprises pixel values of the first or second reference frame overlapped by the target block when the target block is translated to the first or second reference frame by a motion vector of the corresponding one of the second blocks determined by the motion estimation.

Further to the fourth embodiments, generating the denoised block corresponding to the target block based on the target block, the first motion compensated block, the second motion compensated blocks, and the reference blocks comprises, when motion between the target block and the first and second motion compensated blocks and between the second blocks and the reference blocks is small motion, performing pixel wise median filtering based on the target block, a first average block of the first motion compensated block and reference blocks from the first reference frame, and a second average block of the second motion compensated block and reference blocks from the second reference frame to generate a median filtered block and determining a weighted average of the target block and the median filtered block to generate the denoised block and, when motion between the target block and the first and second motion compensated blocks and between the second blocks and the reference blocks is not small motion, determining a weighted average of the target block, the first average block, and the second average block.

Further to the fourth embodiments, generating the denoised block corresponding to the target block based on the target block, the first motion compensated block, the second motion compensated blocks, and the reference blocks comprises, when motion between the target block and the first and second motion compensated blocks and between the second blocks and the reference blocks is small motion, performing pixel wise median filtering based on the target block, a first average block of the first motion compensated block and reference blocks from the first reference frame, and a second average block of the second motion compensated block and reference blocks from the second reference frame to generate a median filtered block and determining a weighted average of the target block and the median filtered block to generate the denoised block and, when motion between the target block and the first and second motion compensated blocks and between the second blocks and the reference blocks is not small motion, determining a weighted average of the target block, the first average block, and the second average block and the machine readable medium comprising further instructions that, in response to being executed on the device, cause the device to reduce noise in video by averaging magnitudes of motion vectors between the target block and the first motion compensated block, the target block and the second motion compensated block, and the second blocks and the reference blocks to determine an average motion vector size and comparing the average motion vector size to a threshold to determine whether the motion between the target block and the first and second motion compensated blocks and between the second blocks and the reference blocks is small motion or not small motion.

Further to the fourth embodiments, generating the denoised block corresponding to the target block comprises a weighted averaging of the target block, a first reference block, and a second reference block and the machine readable medium comprising further instructions that, in response to being executed on the device, cause the device to reduce noise in video by determining an adaptive threshold based on a filter strength, a motion vector size between the target block and the first motion compensated block, and a texture of the target block, generating a similarity value between the target block and a selected one of the first or second reference blocks based at least in part on the adaptive threshold, and determining a weight corresponding to the selected one of the first or second reference blocks based on the similarity value.

Further to the fourth embodiments, generating the denoised block corresponding to the target block comprises a weighted averaging of the target block, a first reference block, and a second reference block and the machine readable medium comprising further instructions that, in response to being executed on the device, cause the device to reduce noise in video by determining an adaptive threshold based on a filter strength, a motion vector size between the target block and the first motion compensated block, and a texture of the target block, generating a similarity value between the target block and a selected one of the first or second reference blocks based at least in part on the adaptive threshold, and determining a weight corresponding to the selected one of the first or second reference blocks based on the similarity value such that the adaptive threshold comprises a square of the filter strength over a square root of a value comprising the motion vector size, the similarity value comprises a difference between a square of the adaptive threshold and a pixel wise sum of squares of differences between the target block and the selected one of the first or second reference blocks, or a weight corresponding to the target block comprises a difference between a constant and a sum of the weights of the first and second reference blocks.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer implemented method for reducing noise in video comprising:
    receiving a video frame having a target block and two or more second blocks that neighbor or overlap the target block;
    performing motion estimation and compensation to determine, for the target block, a first motion compensated block from a first reference frame and a second motion compensated block from a second reference frame and to determine, for the target block, a plurality of reference blocks, each reference block comprising a block of the first or second reference frame that is overlapped when a motion vector of the two or more second blocks is used to translate the target block to the first or second reference frame;
    when the target block is motion compensable, generating a denoised block corresponding to the target block based on the target block, the first motion compensated block, the second motion compensated blocks, and the reference blocks by:
        when motion between the target block and the first and second motion compensated blocks and between the second blocks and the reference blocks is small motion, performing pixel wise median filtering based on the target block, a first average block of the first motion compensated block and reference blocks from the first reference frame, and a second average block of the second motion compensated block and reference blocks from the second reference frame to generate a median filtered block and determining a weighted average of the target block and the median filtered block to generate the denoised block; and
        when motion between the target block and the first and second motion compensated blocks and between the second blocks and the reference blocks is not small motion, determining a weighted average of the target block, the first average block, and the second average block; and
    outputting a denoised video frame comprising the denoised block.

2. The method of claim 1, further comprising:
    averaging magnitudes of motion vectors between the target block and the first motion compensated block, the target block and the second motion compensated block, and the second blocks and the reference blocks to determine an average motion vector size; and
    comparing the average motion vector size to a threshold to determine whether the motion between the target block and the first and second motion compensated blocks and between the second blocks and the reference blocks is small motion or not small motion.

3. The method of claim 1, wherein performing motion estimation and compensation comprises:
    performing overlapping motion estimation based on the video frame and the first reference video frame to determine a first motion vector between the target block and the first motion compensated block and a second motion vector between one of the second blocks and a motion estimation block of the first reference frame; and
    selecting a portion of the motion estimation block overlapping a translation of the target block to the first reference frame as one of the reference blocks.

4. The method of claim 1, wherein performing motion estimation and compensation comprises:
    performing non-overlapping motion estimation based on the video frame and the first reference video frame to determine a first motion vector between the target block and the first motion compensated block and a second motion vector between one of the second blocks and a motion estimation block of the first reference frame; and
    extending the motion estimation block in the first reference frame to overlap a translation of the target block to the first reference frame and selecting the extended portion of the first reference frame as one of the reference blocks.

5. The method of claim 1, further comprising:
    deblock filtering the denoised frame to generate a denoised and deblocked frame and at least one of presenting the denoised and deblocked frame to a user or encoding the denoised and deblocked frame to generate a bitstream.

6. The method of claim 1, wherein the video frame and the reference frame are top or bottom fields of an interlaced video frame.

7. The method of claim 1, further comprising:
    determining whether the target block is motion compensable based at least on motion between the target block and the first and second motion compensated blocks and comparisons of the target block to the first and second motion compensated blocks; and
    when the target block is not motion compensable, generating the denoised block corresponding to the target block based on a spatial filtering of the target block.

8. A system for reducing noise in video comprising:
    a memory configured to store a video frame having a target block and two or more second blocks that neighbor or overlap the target block; and
    a processor coupled to the memory, the processor to:
        perform motion estimation and compensation to determine, for the target block, a first motion compensated block from a first reference frame and a second motion compensated block from a second reference frame and to determine, for the target block, a plurality of reference blocks, each reference block comprising a block of the first or second reference frame that is overlapped when a motion vector of the two or more second blocks is used to translate the target block to the first or second reference frame,
when the target block is motion compensable, generate a denoised block corresponding to the target block based on the target block, the first motion compensated block, the second motion compensated blocks, and the reference blocks by being configured to:
when motion between the target block and the first and second motion compensated blocks and between the second blocks and the reference blocks is small motion, perform pixel wise median filtering based on the target block, a first average block of the first motion compensated block and reference blocks from the first reference frame, and a second average block of the second motion compensated block and reference blocks from the second reference frame to generate a median filtered block and determine a weighted average of the target block and the median filtered block to generate the denoised block; and
when motion between the target block and the first and second motion compensated blocks and between the second blocks and the reference blocks is not small motion, determine a weighted average of the target block, the first average block, and the second average block; and
output a denoised video frame comprising the denoised block.

9. The system of claim 8, the processor further to:
average magnitudes of motion vectors between the target block and the first motion compensated block, the target block and the second motion compensated block, and the second blocks and the reference blocks to determine an average motion vector size; and
compare the average motion vector size to a threshold to determine whether the motion between the target block and the first and second motion compensated blocks and between the second blocks and the reference blocks is small motion or not small motion.

10. The system of claim 8, the processor further to:
determine whether the target block is motion compensable based at least on motion between the target block and the first and second motion compensated blocks and comparisons of the target block to the first and second motion compensated blocks; and
when the target block is not motion compensable, generate the denoised block corresponding to the target block based on a spatial filtering of the target block.

11. At least one non-transitory machine readable medium comprising a plurality of instructions that, in response to being executed on a device, cause the device to reduce noise in video by:
receiving a video frame having a target block and two or more second blocks that neighbor or overlap the target block;
performing motion estimation and compensation to determine, for the target block, a first motion compensated block from a first reference frame and a second motion compensated block from a second reference frame and to determine, for the target block, a plurality of reference blocks, each reference block comprising a block of the first or second reference frame that is overlapped when a motion vector of the two or more second blocks is used to translate the target block to the first or second reference frame;
when the target block is motion compensable, generating a denoised block corresponding to the target block based on the target block, the first motion compensated block, the second motion compensated blocks, and the reference blocks by:
when motion between the target block and the first and second motion compensated blocks and between the second blocks and the reference blocks is small motion, performing pixel wise median filtering based on the target block, a first average block of the first motion compensated block and reference blocks from the first reference frame, and a second average block of the second motion compensated block and reference blocks from the second reference frame to generate a median filtered block and determining a weighted average of the target block and the median filtered block to generate the denoised block; and
when motion between the target block and the first and second motion compensated blocks and between the second blocks and the reference blocks is not small motion, determining a weighted average of the target block, the first average block, and the second average block; and
outputting a denoised video frame comprising the denoised block.

12. The non-transitory machine readable medium of claim 11, the machine readable medium comprising further instructions that, in response to being executed on the device, cause the device to reduce noise in video by:
averaging magnitudes of motion vectors between the target block and the first motion compensated block, the target block and the second motion compensated block, and the second blocks and the reference blocks to determine an average motion vector size; and
comparing the average motion vector size to a threshold to determine whether the motion between the target block and the first and second motion compensated blocks and between the second blocks and the reference blocks is small motion or not small motion.

13. The non-transitory machine readable medium of claim 11, the machine readable medium comprising further instructions that, in response to being executed on the device, cause the device to reduce noise in video by:
determining whether the target block is motion compensable based at least on motion between the target block and the first and second motion compensated blocks and comparisons of the target block to the first and second motion compensated blocks; and
when the target block is not motion compensable, generating the denoised block corresponding to the target block based on a spatial filtering of the target block.

* * * * *